Oct. 3, 1944.   R. E. PAGE   2,359,670
RECORD CONTROLLED MACHINE
Filed Dec. 24, 1936   20 Sheets-Sheet 1

Oct. 3, 1944. R. E. PAGE 2,359,670
RECORD CONTROLLED MACHINE
Filed Dec. 24, 1936 20 Sheets-Sheet 2
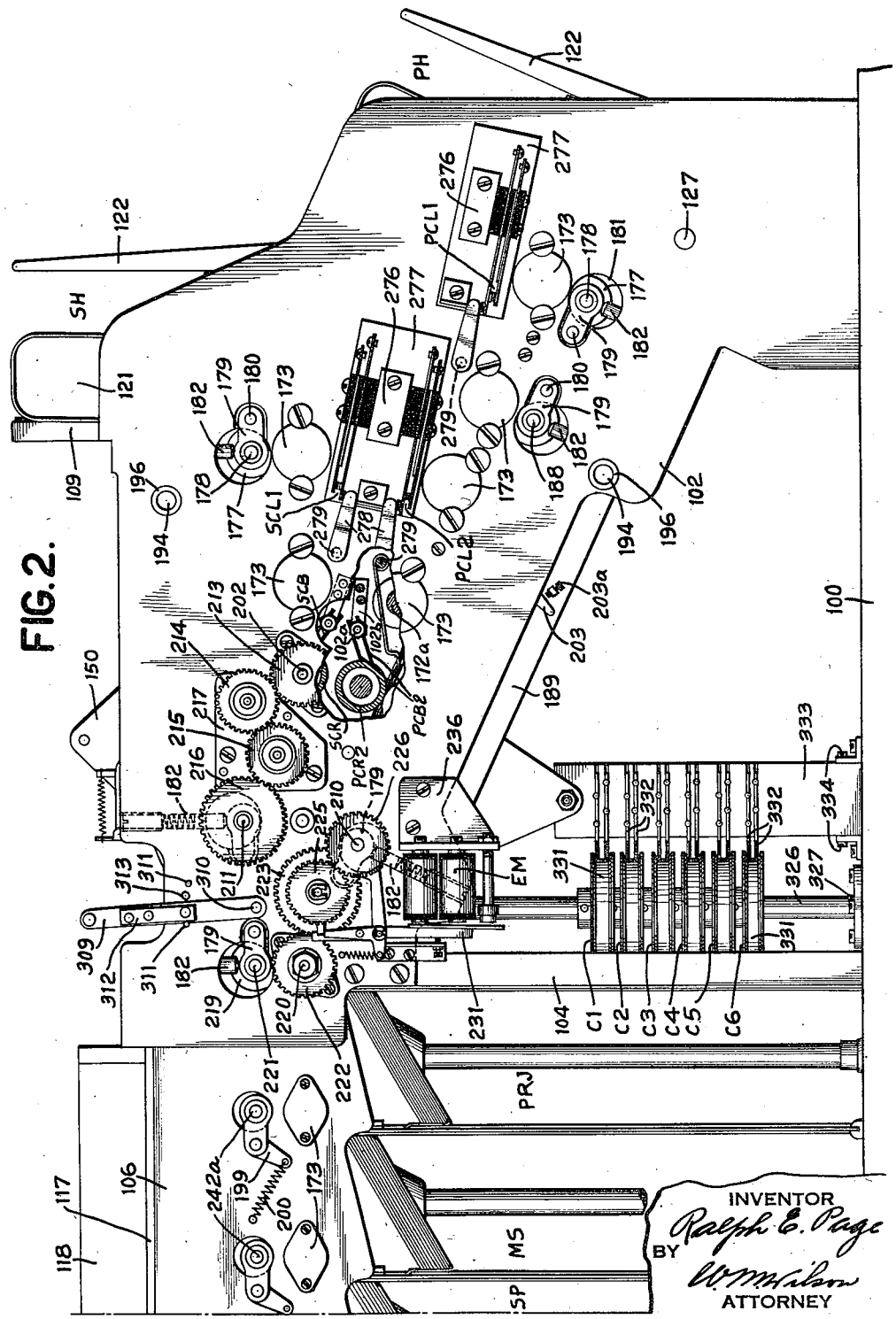

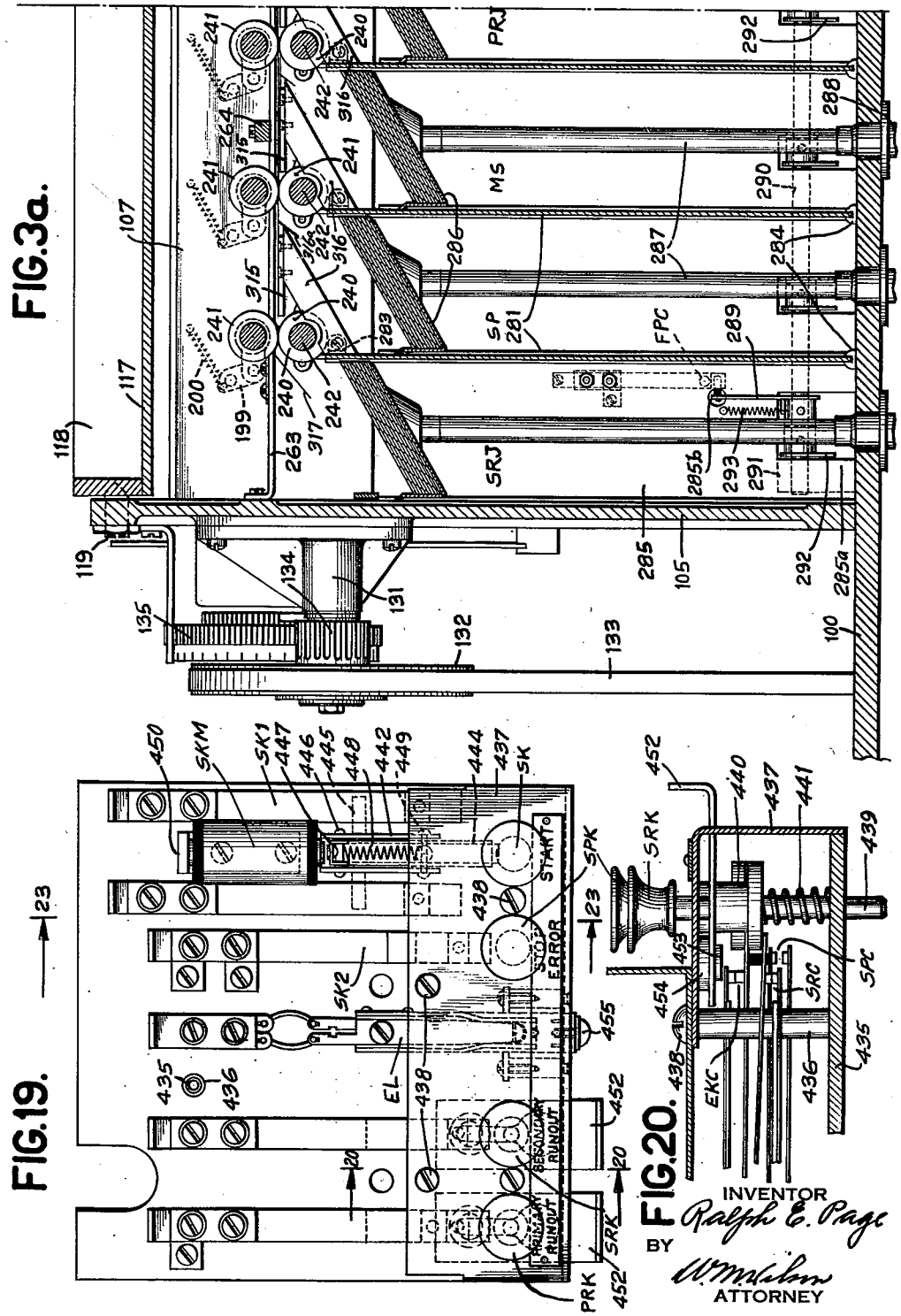

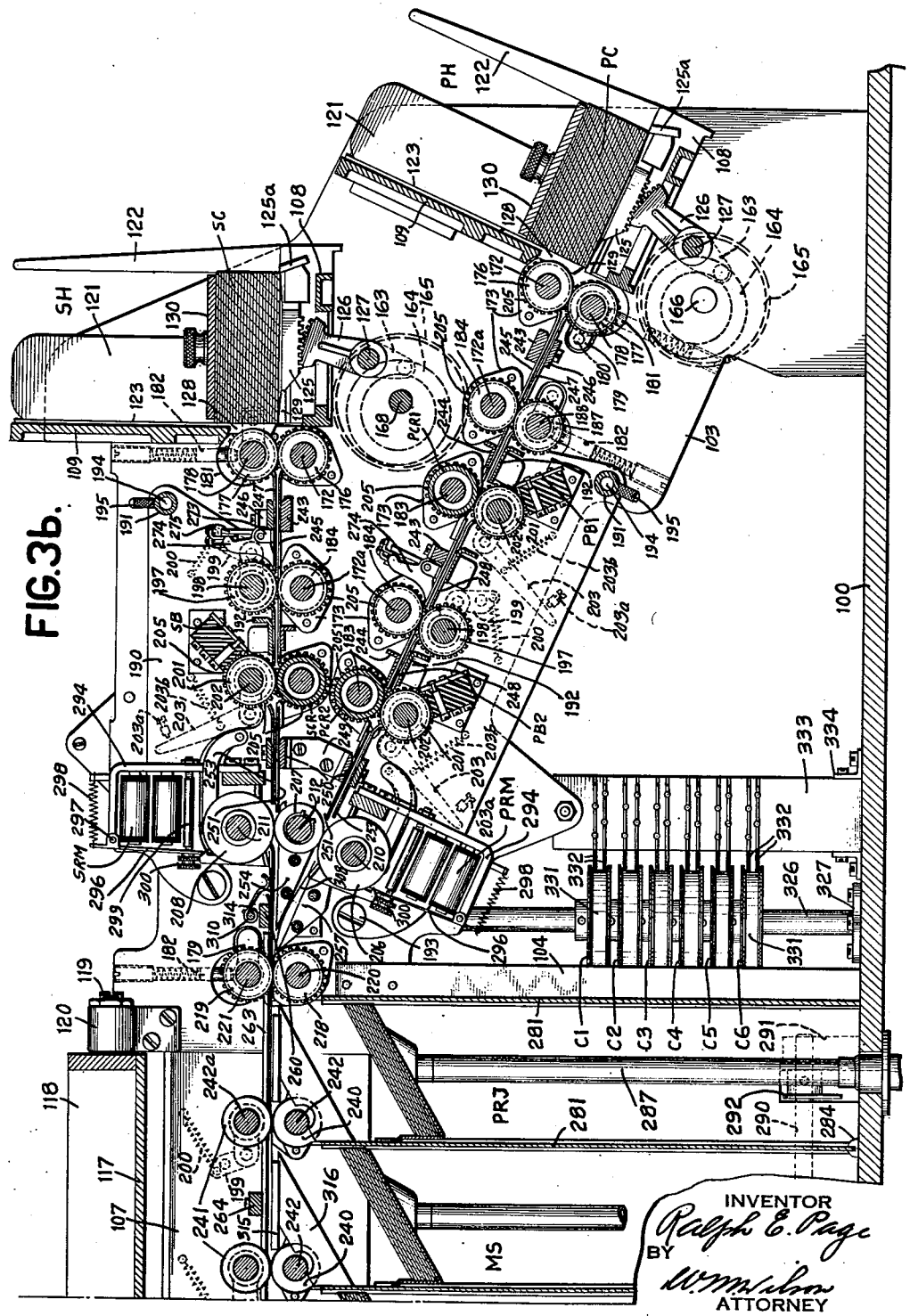

Oct. 3, 1944.　　　　R. E. PAGE　　　　2,359,670
RECORD CONTROLLED MACHINE
Filed Dec. 24, 1936　　　20 Sheets-Sheet 6

INVENTOR
Ralph E. Page
BY
W. M. Wilson
ATTORNEY

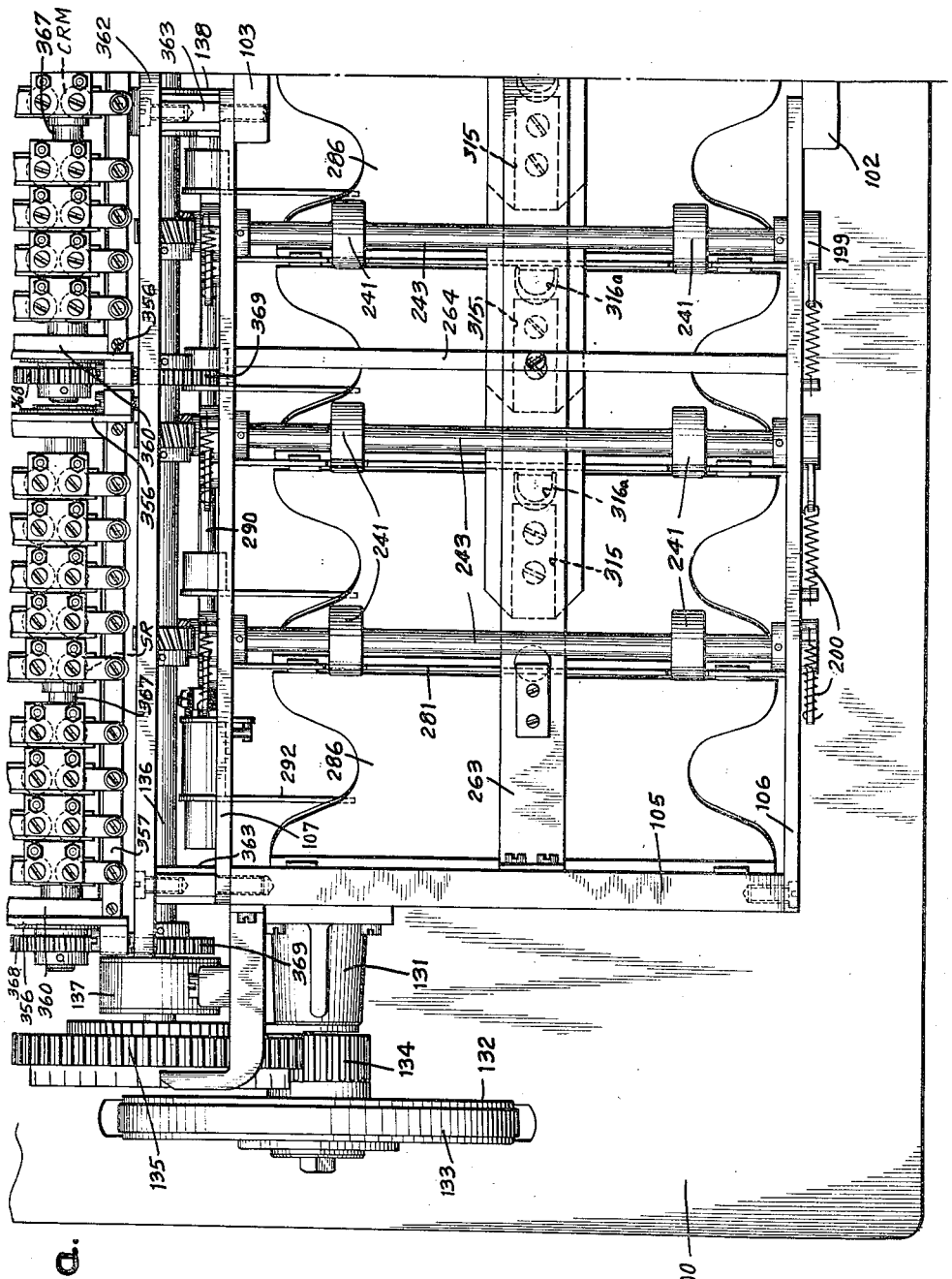

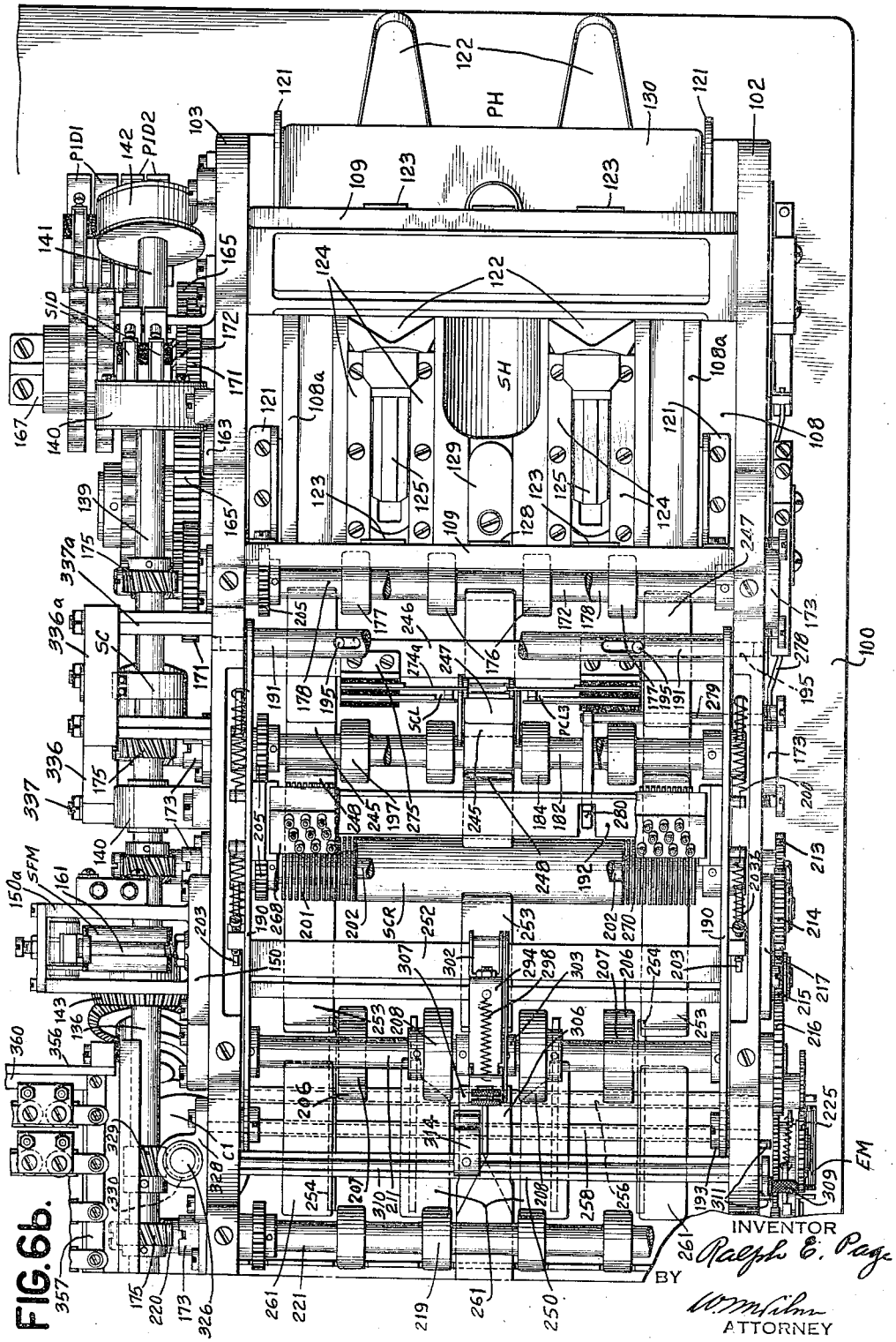

Oct. 3, 1944.  R. E. PAGE  2,359,670
RECORD CONTROLLED MACHINE
Filed Dec. 24, 1936  20 Sheets-Sheet 9

INVENTOR
Ralph E. Page
BY
ATTORNEY

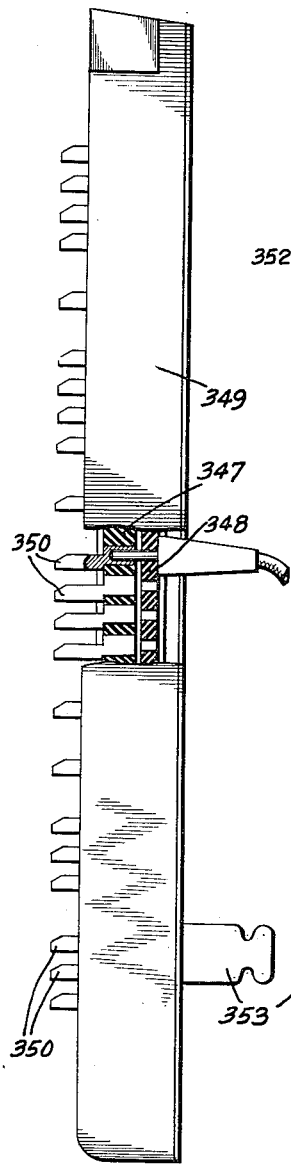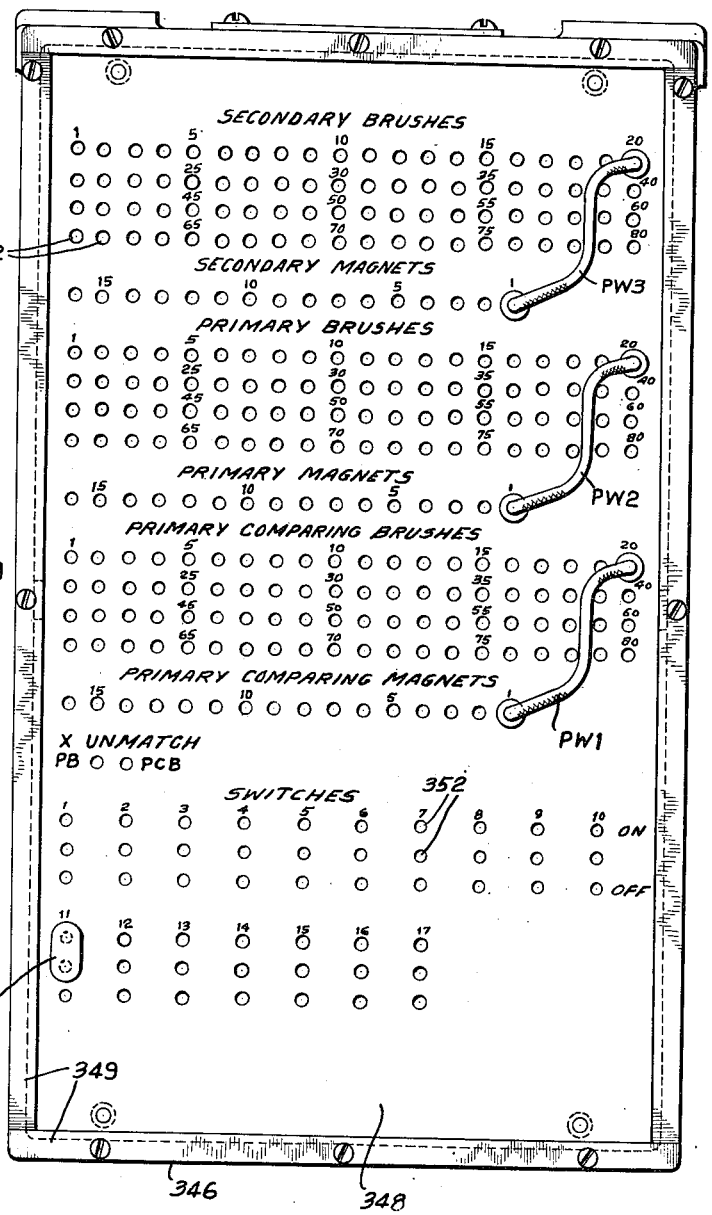

Oct. 3, 1944.   R. E. PAGE   2,359,670
RECORD CONTROLLED MACHINE
Filed Dec. 24, 1936   20 Sheets-Sheet 11

INVENTOR
Ralph E. Page
BY
ATTORNEY

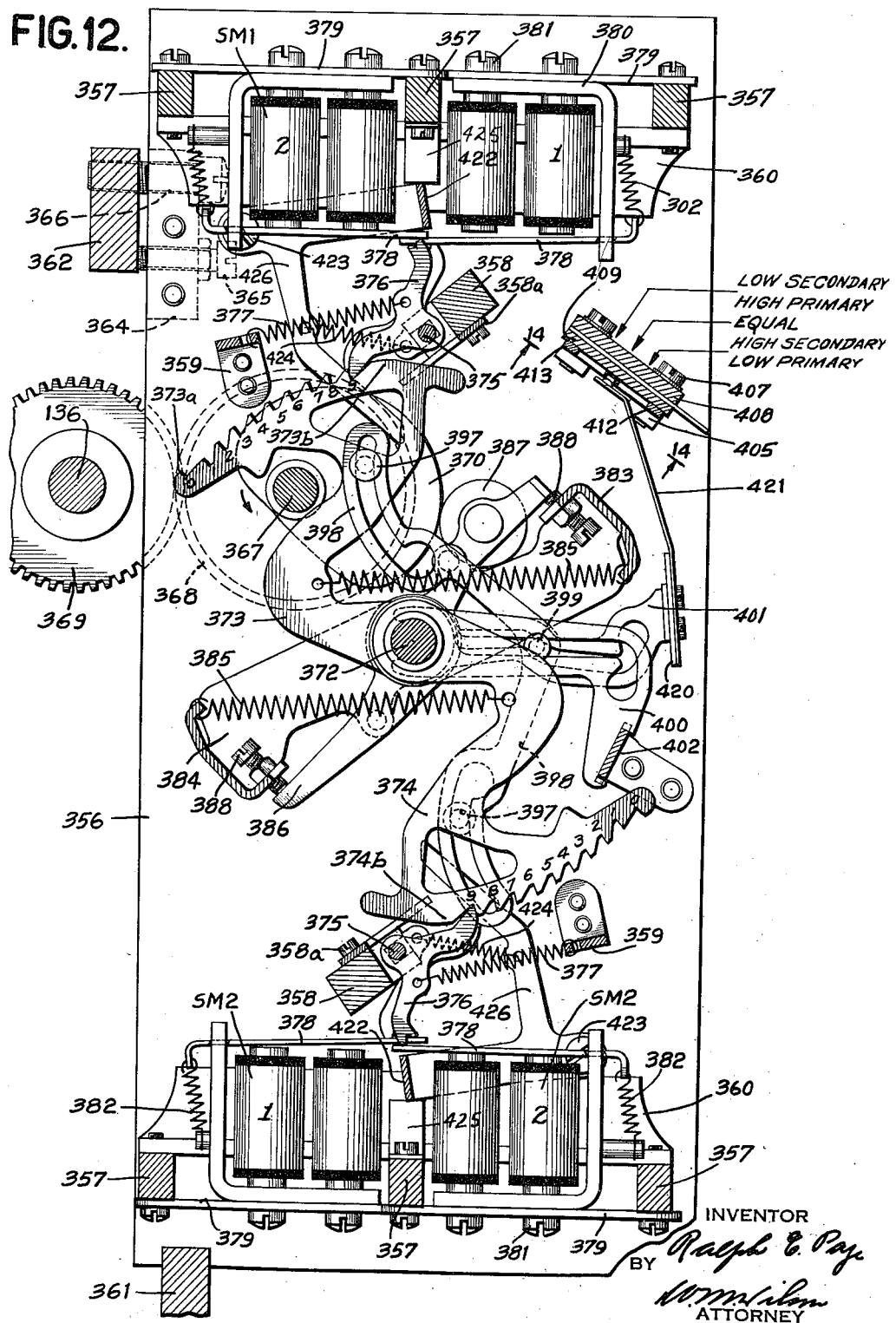

Oct. 3, 1944. R. E. PAGE 2,359,670
RECORD CONTROLLED MACHINE
Filed Dec. 24, 1936 20 Sheets-Sheet 13

Oct. 3, 1944.  R. E. PAGE  2,359,670
RECORD CONTROLLED MACHINE
Filed Dec. 24, 1936  20 Sheets-Sheet 14
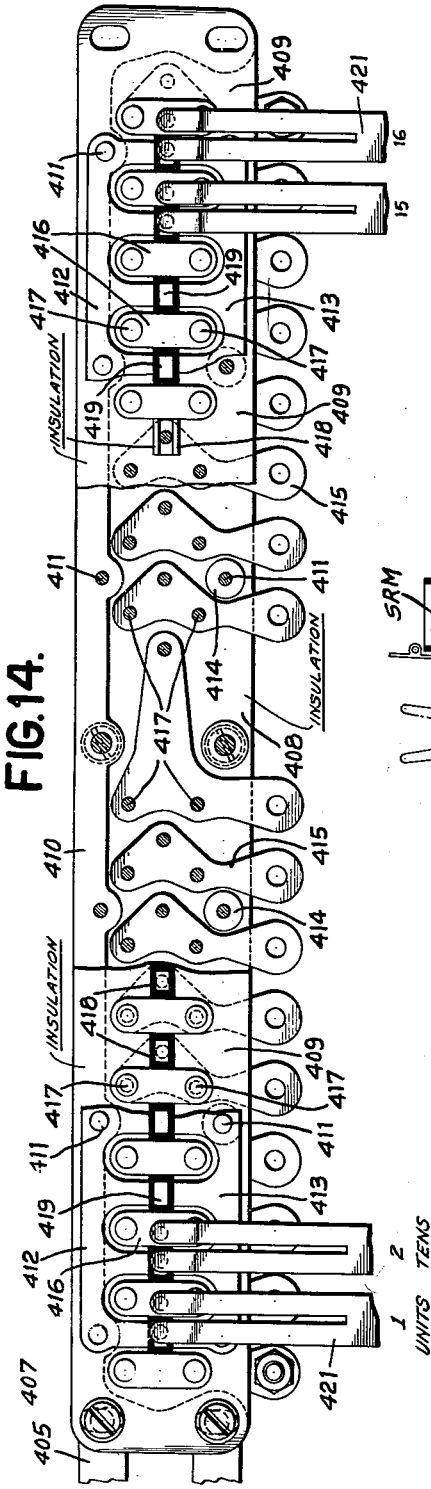
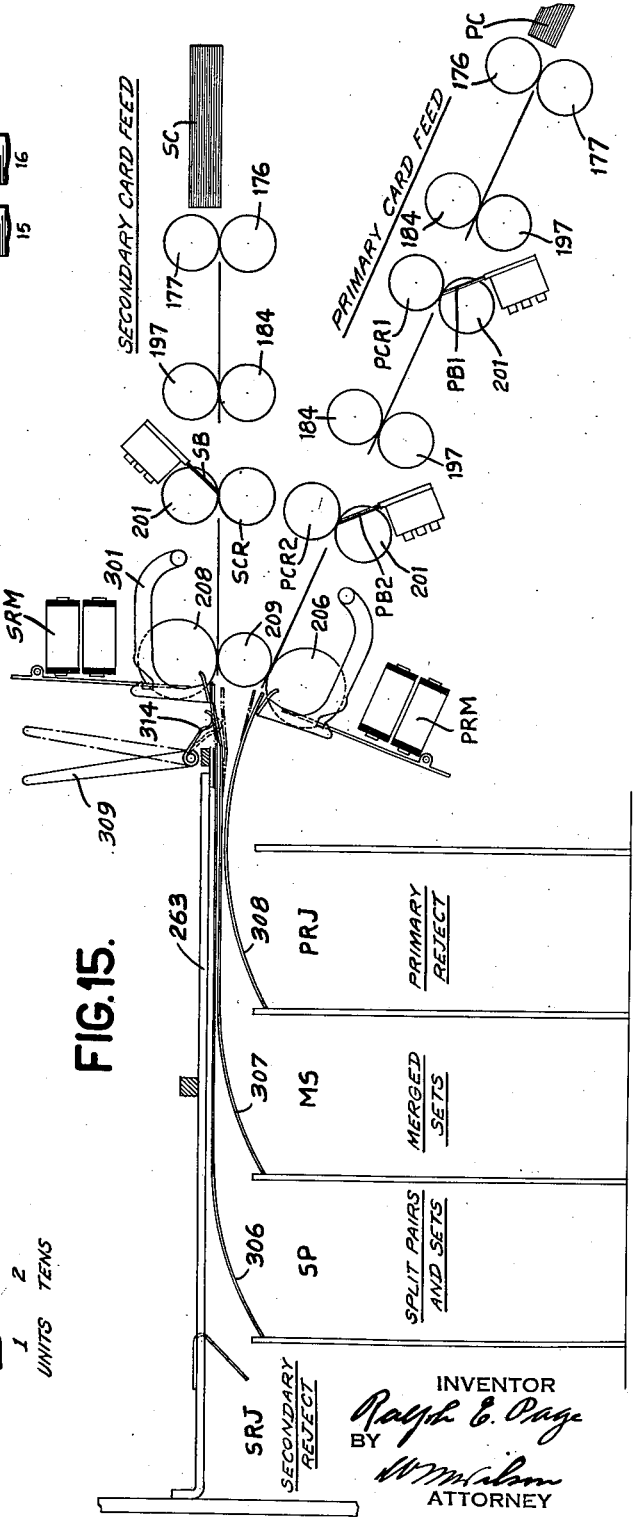

Oct. 3, 1944.   R. E. PAGE   2,359,670
RECORD CONTROLLED MACHINE
Filed Dec. 24, 1936   20 Sheets-Sheet 15

Oct. 3, 1944.  R. E. PAGE  2,359,670
RECORD CONTROLLED MACHINE
Filed Dec. 24, 1936   20 Sheets-Sheet 16

INVENTOR
Ralph E. Page
BY
ATTORNEY

Oct. 3, 1944.    R. E. PAGE    2,359,670
RECORD CONTROLLED MACHINE
Filed Dec. 24, 1936    20 Sheets-Sheet 17

INVENTOR
Ralph E. Page
BY
ATTORNEY

Oct. 3, 1944.  R. E. PAGE  2,359,670
RECORD CONTROLLED MACHINE
Filed Dec. 24, 1936  20 Sheets-Sheet 18

INVENTOR
Ralph E. Page
BY
ATTORNEY

FIG. 18a.

| OPER NO. | TYPE OF OPERATION | EXAMPLE OF APPLICATION | PRIMARY SET OF CARDS (MAIN FILE) | | | | | SECONDARY SET OF CARDS | | | | |
|---|---|---|---|---|---|---|---|---|---|---|---|---|
| | | | ONLY ONE CARD PER CONTROL No. | VARIABLE No CARDS PER CONTROL No. | FIXED No. OF CARDS PER CONT. | ALL CONTR. NUMBERS REPRESENT | CARDS IN NUMERICAL SEQUENCE | ONLY ONE CARD PER CONTROL No. | VARIABLE No CARDS PER CONTROL No. | FIXED No. OF CARDS PER CONTROL | ALL CONTROL NUMBERS REPRESENT | CARDS IN NUMERICAL SEQUENCE |
| 1 | FILING NEW CARDS INTO MAIN FILE OF BALANCE & DETAIL CARDS | FOR DAILY FILING IN CONNECTION WITH STOCK CONTROL FILES ETC. | | YES | | YES | YES | | YES | | NO | YES |
| 2 | SEPARATING INACTIVE BALANCE CARDS FROM FILE OF BALANCE & DETAIL CARDS FOLLOWING OPER #1 | FOR FINAL FILING IN CONNECTION WITH STOCK CONTROL CHANGE REPORT WHERE NON MOVING ITEMS ARE NOT DESIRED | | YES | | | YES | ALL CARDS IN PRIMARY HOPPER — NOT USED | | | | |
| 3 | ASSOCIATING DETAIL CARDS WITH PROPER RATING, MASTER INDICATION ETC. CARDS | FOR SORTING IN CUSTOM CODE CARDS IN SALES ANALYSIS | YES | | YES ONE | YES | YES | | YES | | NO | YES |
| 4 | MERGING TWO SETS OF SIMILAR PACKS OF CARDS | FOR FILING NEW MOVEMENT IN R.R. CAR RECORDS | | YES | | NO | YES | | YES | | NO | YES |
| 5 | MERGING TWO PARTS OF A SERIALLY NUMBERED FILE | FOR REFILING OF BALANCE CODE RATE ETC. CARDS | YES | | YES ONE | NO | YES | YES | | YES ONE | NO | YES |
| | | | IF THERE ARE LIKE CARDS IN BOTH FILES PRIMARY CARD CAN BE REJECTED BY CLOSING SWITCH #7. | | | | | | | | | |
| 6 | REFILING ADDRESS & NAME CARDS AFTER USE | FOR BILLING STATEMENTS ETC. | | YES 2 OR 3 | | NO | YES | | YES 2 OR 3 | | NO | YES |
| 7 | ASSOCIATING ADDRESS CARD WITH PACK OF DETAIL CARDS | PREPARATORY TO BILLING ETC. | | YES 2 OR 3 | YES | YES | | | YES | | NO | YES |
| 8 | PULLING CARDS FROM ONE SET BY MEANS OF ANOTHER SET | APPLYING CASH IN ACCOUNTS RECEIVABLE ETC. | YES ACCT. & INVOICE NO. | | | YES | YES | | YES | | NO | YES |
| 9 | MULTIPLE COLUMN SELECTION FROM PACK OF CARDS USING "FINDING CARD" | FOR LOCATING CARD IN TABULATING DEPT. ETC. | FOR MULTIPLE CARDS IN EITHER OR BOTH SETS | | | | | | | | | |
| | | | | YES | | YES | NO | TAB CARDS | | | | |
| 10 | REPLACING CARDS IN PRIMARY FILE WITH CARDS FROM SECONDARY FILE | IN INSURANCE WORK REPLACING OLD CARD BY A NEW ONE | YES | | YES ONE | YES | YES | YES | | YES ONE | NO | YES |
| 11 | COLLATING UNPUNCHED CARDS | PREPARING CARDS FOR KEY PUNCHING BY ALTERNATE COLORS OR FORMS | YES | | YES | YES | | YES | | | NO | YES |
| | | | FIRST FORM PLACED IN PRIMARY SIDE | | | | | OTHER FORM PLACED IN SECONDARY | | | | |
| 12 | REMOVING LAST CARD OF EACH GROUP & SINGLE CARDS | | | YES | | | YES | NOT USED | | | | |
| | | | ALL CARDS IN PRIMARY SIDE | | | | | | | | | |
| 13 | CHECKING SORT | AFTER ALL SORTING OPERATIONS | | YES | | | YES | TAB CARDS | | | | |
| | | | ALL CARDS IN PRIMARY SIDE | | | | | | | | | |
| 14 | 2 BLANK CARD INSERTION | | ALL CARDS IN PRIMARY SIDE | | | | | BLANK CARDS | | | | |

INVENTOR
Ralph E. Page
BY
ATTORNEY

Oct. 3, 1944.  R. E. PAGE  2,359,670
RECORD CONTROLLED MACHINE
Filed Dec. 24, 1936  20 Sheets-Sheet 20

FIG. 18b.

| PRJ<br>PRIMARY<br>REJECTS | POCKETS<br>MS<br>MATCHED PRIMARY<br>OR<br>MERGED SETS | SP<br>MATCHED SECONDARY<br>(SPLIT PAIRS) | SRJ<br>SECONDARY<br>REJECTS | SWITCH SETTINGS — CLOSED SWITCHES | OP. No. |
|---|---|---|---|---|---|
| NOT USED | PRIMARY SET & ADDED SECONDARY CARDS | NOT USED | CARDS IN ERROR ONLY | 2 3   5   8 10 12       17 | 1 |
| SINGLE PRIMARY CARDS | REST OF FILE | NOT USED | NOT USED | "X PUNCHED" 12 / CONTROL PUNCHED 9  11 12 | 2 |
| UNMATCHED PRIMARY CARDS | MATCHED PRIMARY & SECONDARY CARDS | NOT USED | CARDS IN ERROR OR UNMATCHED | 1 2   4     8 10 12 | 3 |
| NOT USED | MERGED PRIMARY & SECONDARY SETS | NOT USED | NOT USED | 3   5   8 10 12   17 | 4 |
| NOT USED | MERGED PRIMARY & SECONDARY CARDS | NOT USED | NOT USED | 3 4     8 10 12<br>3 4   7 8 10 12 | 5 |
| NOT USED | MERGED PRIMARY & SECONDARY CARDS | NOT USED | NOT USED | 3   5   8 10 12   17 | 6 |
| UNMATCHED PRIMARY CARDS | MERGED PRIMARY & SECONDARY CARD ADDRESS CARDS FIRST | NOT USED | CARDS IN ERROR OR NEW ACCT'S ONLY | 1 2 3   5   8 10 12   17 | 7 |
| UNMATCHED PRIMARY CARDS NEW MAIN FILE | MATCHED PRIMARY CARDS | MATCHED SECONDARY CARDS | CARDS IN ERROR ONLY | 1 2 3 4     8 10 12<br>1 2 3   5   8 10 12   17 | 8 |
| FINDER CARD & SELECTED PRIMARY FILE | REMAINDER OF FILE & TAB CARD IN PLACE OF SEL. PRIMARY CARD | NOT USED | NOT USED |       4   7   10   13 14 | 9 |
| MATCHED PRIMARY CARDS<br>MATCHED PRIMARY CARDS | MERGED PRIMARY & SECONDARY CARDS<br>MERGED PRIMARY & SECONDARY CARDS | NOT USED<br>NOT USED | NOT USED<br>NOT USED | 3 4   6 7 8 10 12<br>3   5   7 8 10 12     17 | 10 |
| NOT USED | ONE CARD OF EACH KIND ALTERNATELY | NOT USED | NOT USED | 10 | 11 |
| LAST CARD OF EACH GROUP & SINGLE CARDS | REMAINDER OF FILE | NOT USED | NOT USED | 9   12 | 12 |
| ALL CARDS IN MATCHED PRIMARY STACKER<br>TAB CARDS INSERTED WHERE STEP DOWN IN FILE | | | | 4         16 17 | 13 |
|  |  |  |  | 4 5   10   15 | 14 |

INVENTOR
Ralph E. Page
BY
ATTORNEY

Patented Oct. 3, 1944

2,359,670

UNITED STATES PATENT OFFICE 2,359,670

RECORD CONTROLLED MACHINE

Ralph Eugene Page, Binghamton, N. Y., assignor to International Business Machines Corporation, New York, N. Y., a corporation of New York Application December 24, 1936, Serial No. 117,493

67 Claims. (Cl. 209—110)

The present invention relates to record-controlled machines in general, such as machines adapted to be controlled by perforated accounting and statistical record cards like those used in the well known Hollerith and Powers tabulating machines.

The broad object of the invention is to provide a machine which is capable of performing a large variety of operations under control of perforated record cards and adaptable to many problems which hitherto required manual labor to perform or, as an alternative, required a number of special machines, each having limited applicability.

In the use of perforated records for compiling accounting and statistical data and recording accounting and statistical operations or transactions, there are many problems such as filing cards, removing cards from the files, matching related cards or related sets of cards and either refiling them or removing all the related cards from the files, and similar operations which hitherto required in many cases a large staff of clerks and numerous special devices or machines even to get the benefits of the perforated card method. As an example, it is frequently necessary, when a given commercial transaction is completed, to bring together the perforated record card or cards representing the completion of the transaction and the related cards representing the earlier steps in the transaction and then to remove the latter cards from the files for preparing statements and/or filing in the storage files. Other very common problems are the matching of pairs of cards or sets of cards belonging to the same transaction and the insertion of special cards, such as blank cards, heading cards, address cards, balance cards, and master cards in their proper places as a preliminary to tabulation of data recorded in the cards by means of a tabulating machine.

The broad object of the present invention may be restated as to provide a single machine which is flexible enough to mechanically perform a large number of different types of card selecting, associating, and disassociating operations which formerly had to be performed manually or required a large number of special machines or special devices for attachment to existing machines.

In the prior art there exists a large number of machines which to some extent are able to perform some of the operations of which the machine described herein is capable, but the machines of the prior art are in almost every case, either special machines or devices capable of performing only one special operation, or are so inflexible as to be applicable to only a few problems in each case. None of the machines of the prior art can be said to approach in degree of flexibility of operation and applicability record controlled machines like the well known "International" electric accounting machine.

Another object, therefore, is to provide a machine for selecting, associating, and disassociating related records which has a degree of flexibility approaching or equal to that of the tabulating machines to which it will usually be subsidiary equipment.

An object is to provide record analyzing mechanism for record-controlled machines which is flexible in its applicability to problems encountered in the use of the perforated card system of compiling accounting and statistical data and recording data.

Another object is to provide mechanism for simultaneously effecting a multiple comparison of data recorded on a plurality of records and selectively disposing of the records to a plurality of record receiving stations in accordance with the nature of the multiple comparison.

Various other objects, advantages, and features of the invention will be given in the following description and claims or will be apparent from a study of the description, claims, and the accompanying drawings.

Fig. 2 is a front elevation of the card feeding and sensing section of the machine with the front cover removed.

Figs. 3a and 3b together comprise a vertical longitudinal section.

Figure 4:
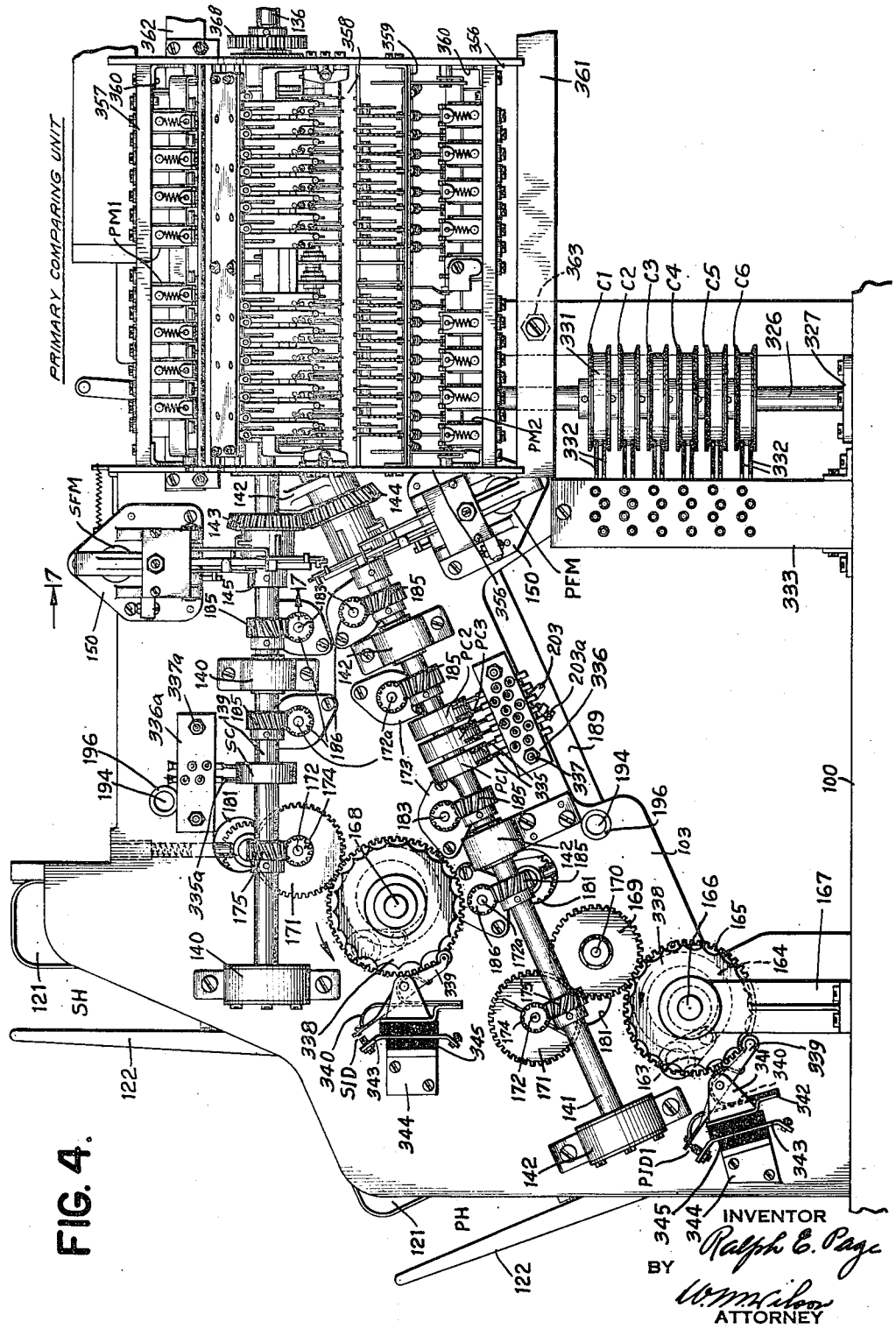

Fig. 4 is a rear elevation of the card feeding and sensing section of the machine with the rear cover removed.

Figure 5:
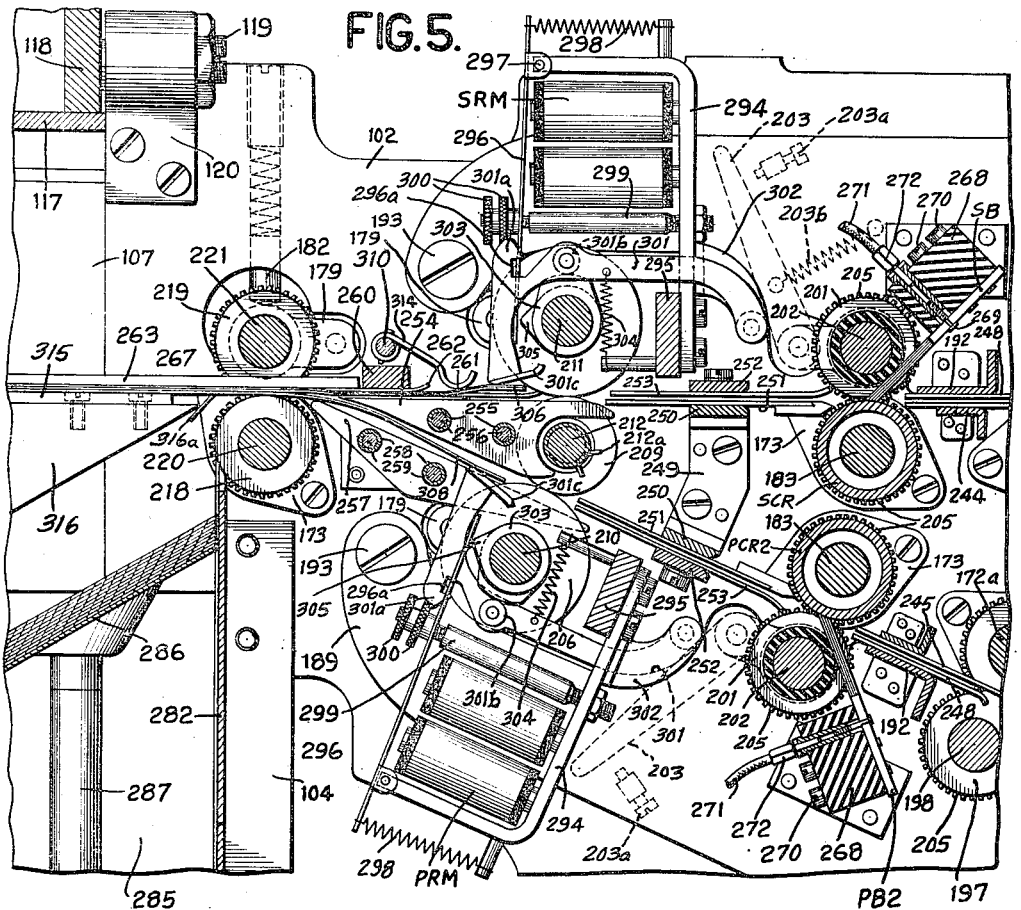

Fig. 5 is a large scale vertical section showing part of the card sensing and distributing mechanism.

Figs. 6a and 6b together comprise a plan view of the machine with the covers removed.

Figure 7:
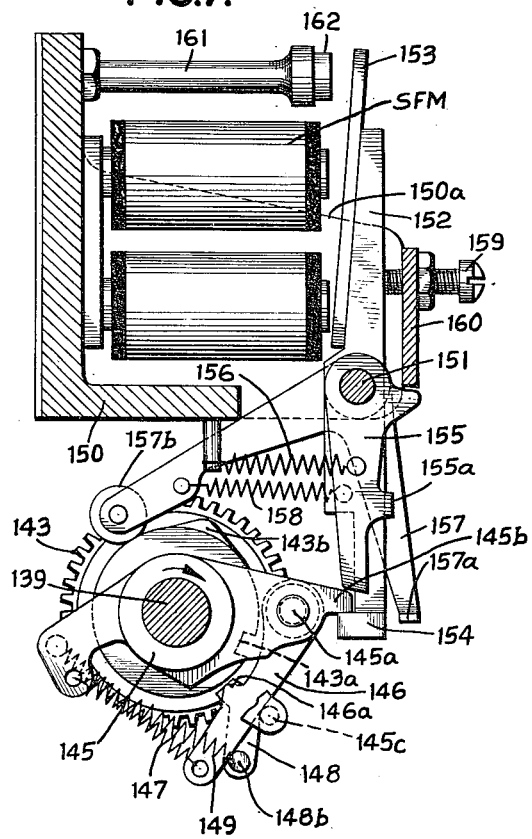

Fig. 7 is a large scale vertical section on the line 7—7 in Fig. 4.

Figure 8:
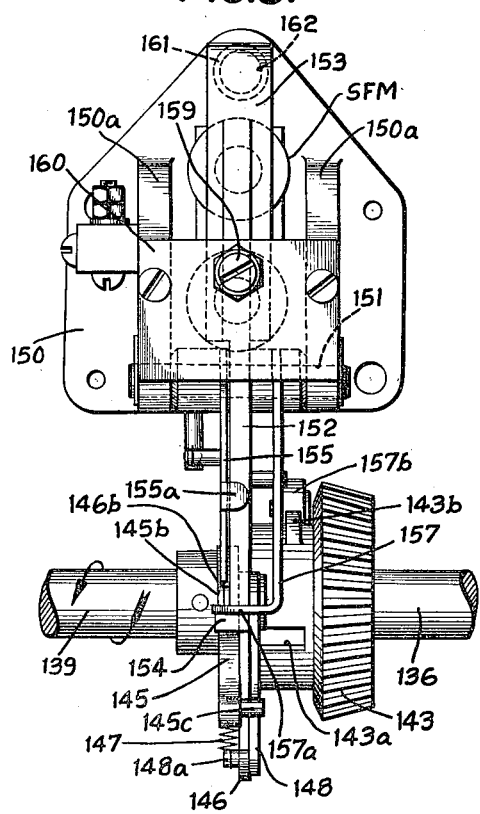

Fig. 8 is a rear elevation of the mechanism shown in section in Fig. 7.

Fig. 9 is a large scale front view of the removable plugboard.

Fig. 10 is a side view, partly in section, of the plugboard.

Figures 11, 23:
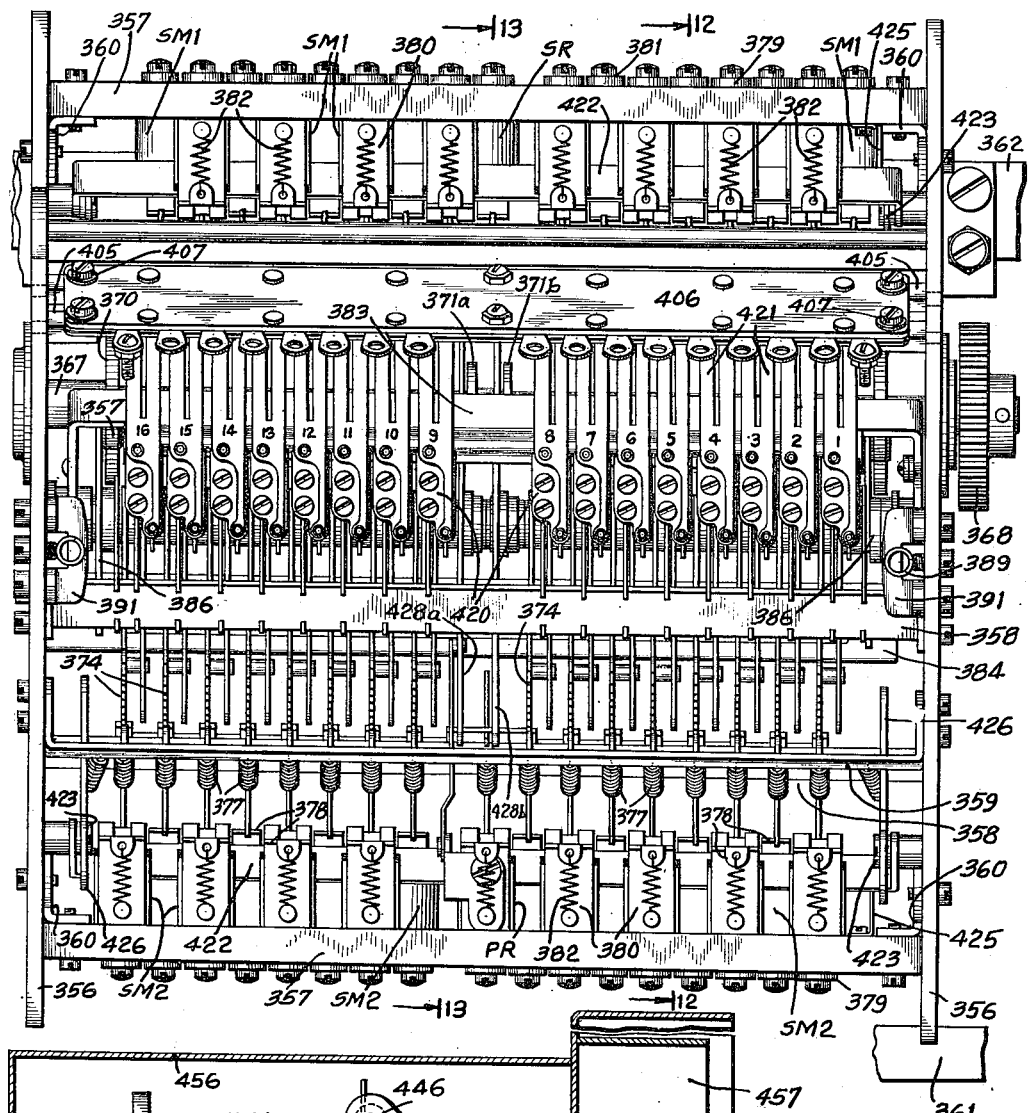

Fig. 11 is a large scale elevation of one of the comparing units as viewed from a point behind the machine.

Fig. 12 is a vertical section on the line 12—12 in Fig. 11.

Figure 13:
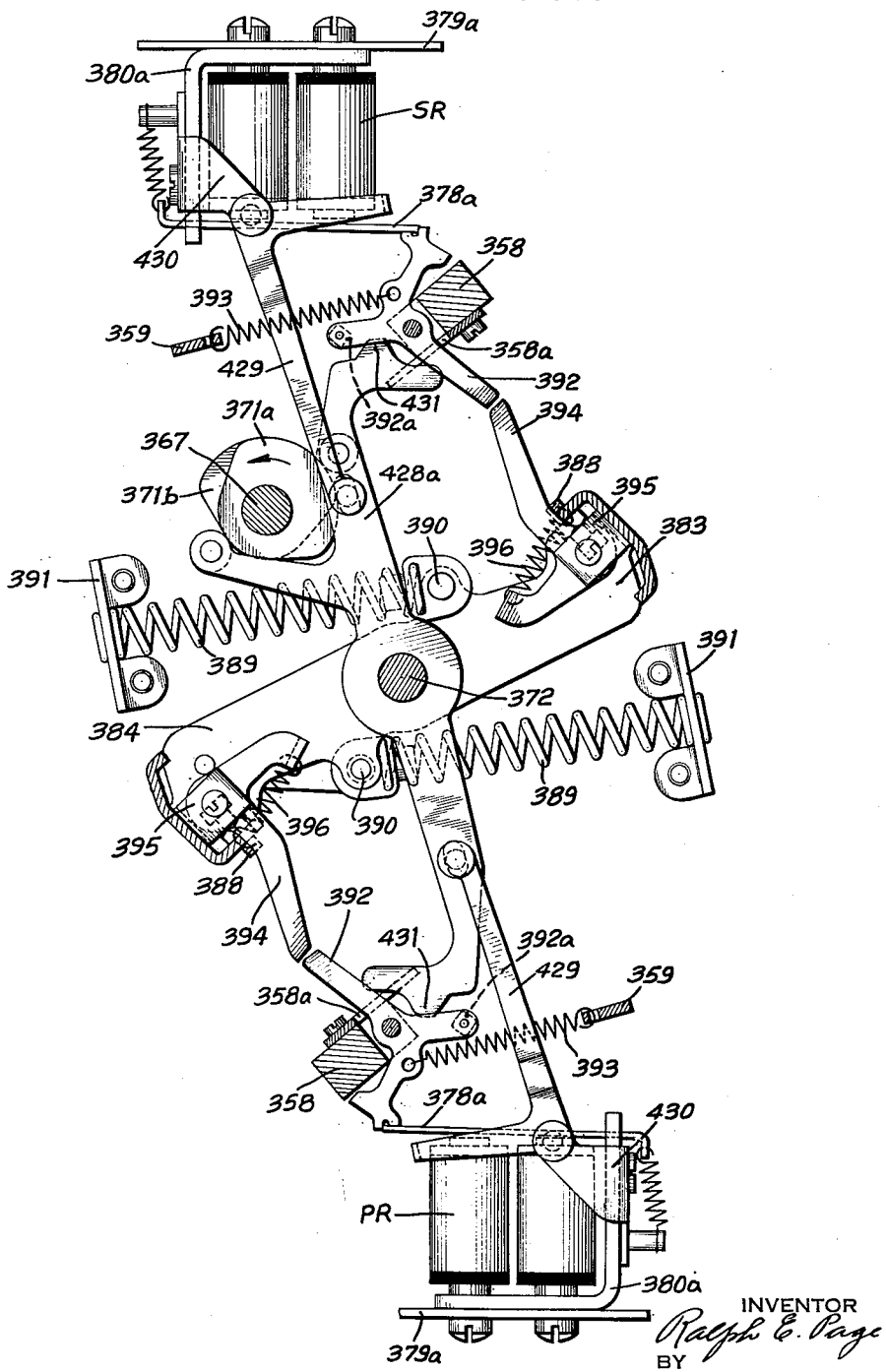

Fig. 13 is a vertical section on the line 13—13 in Fig. 11.

Fig. 14 is a large scale view of the analyzer switching unit as viewed in the direction of the arrows 14 in Fig. 12.

Fig. 15 is a diagram showing the positions taken by the cards at various stages in their movement.

Figure 16:
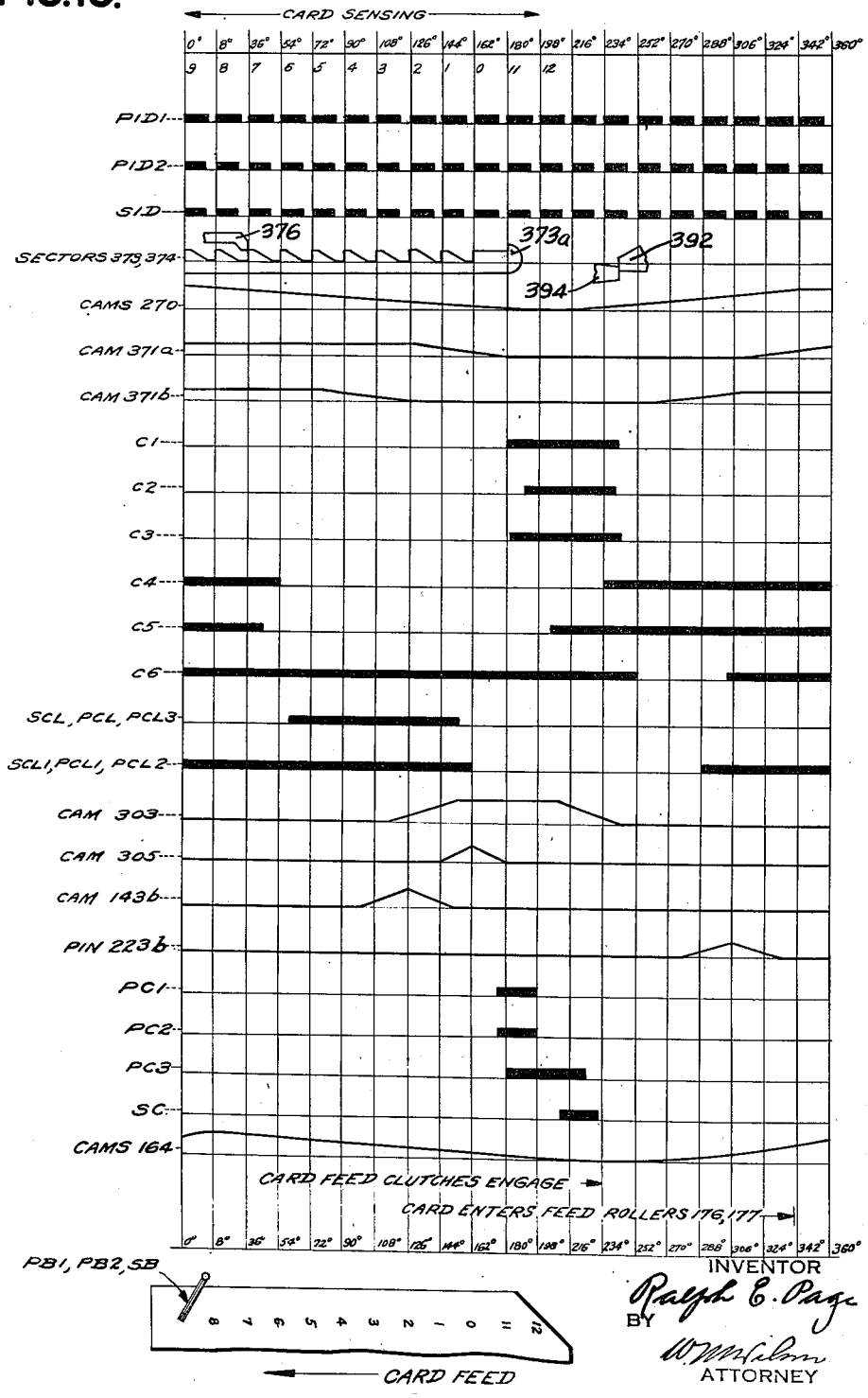

Fig. 16 is an electrical and mechanical time chart.

Figure 17A:
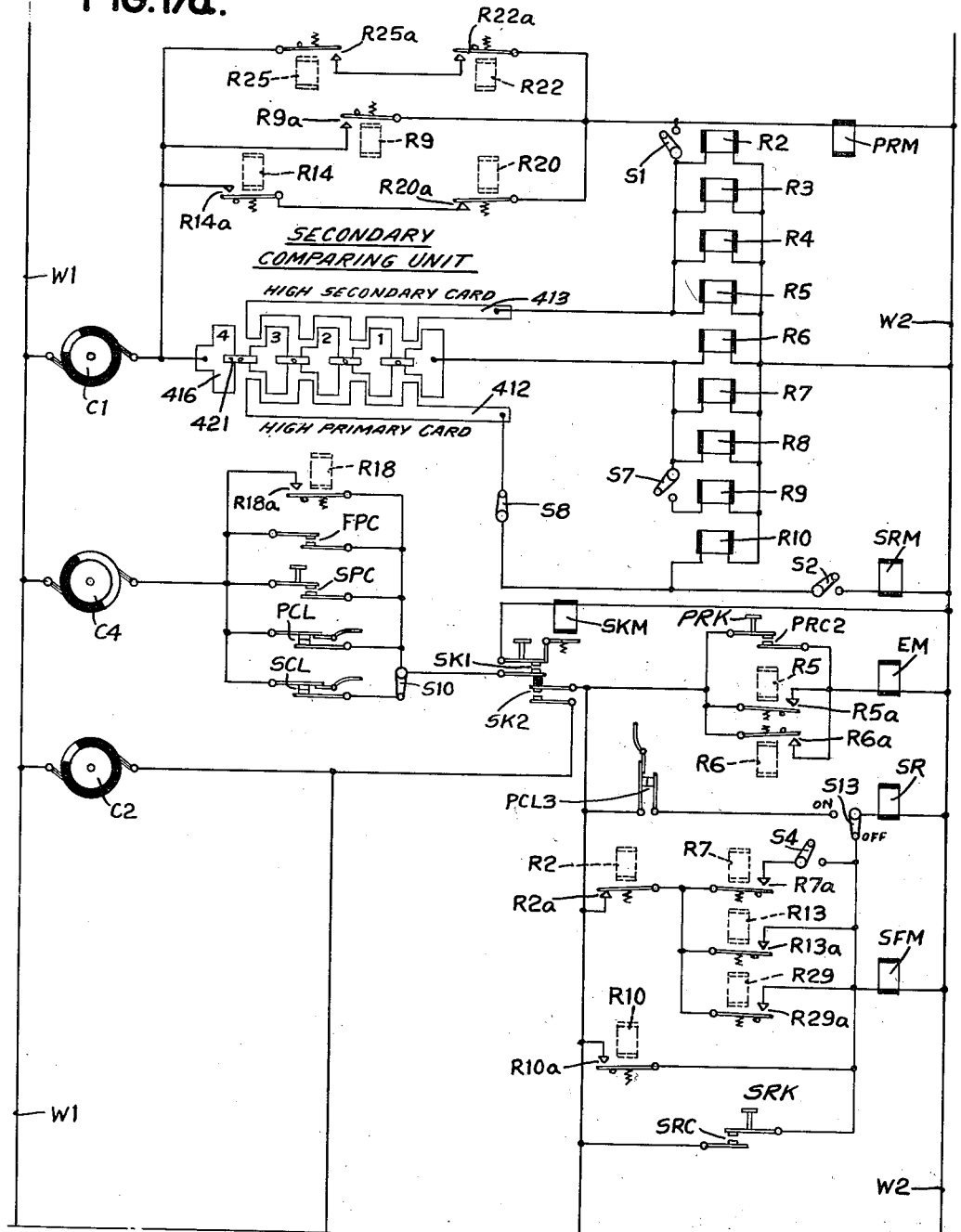
Figure 17B:
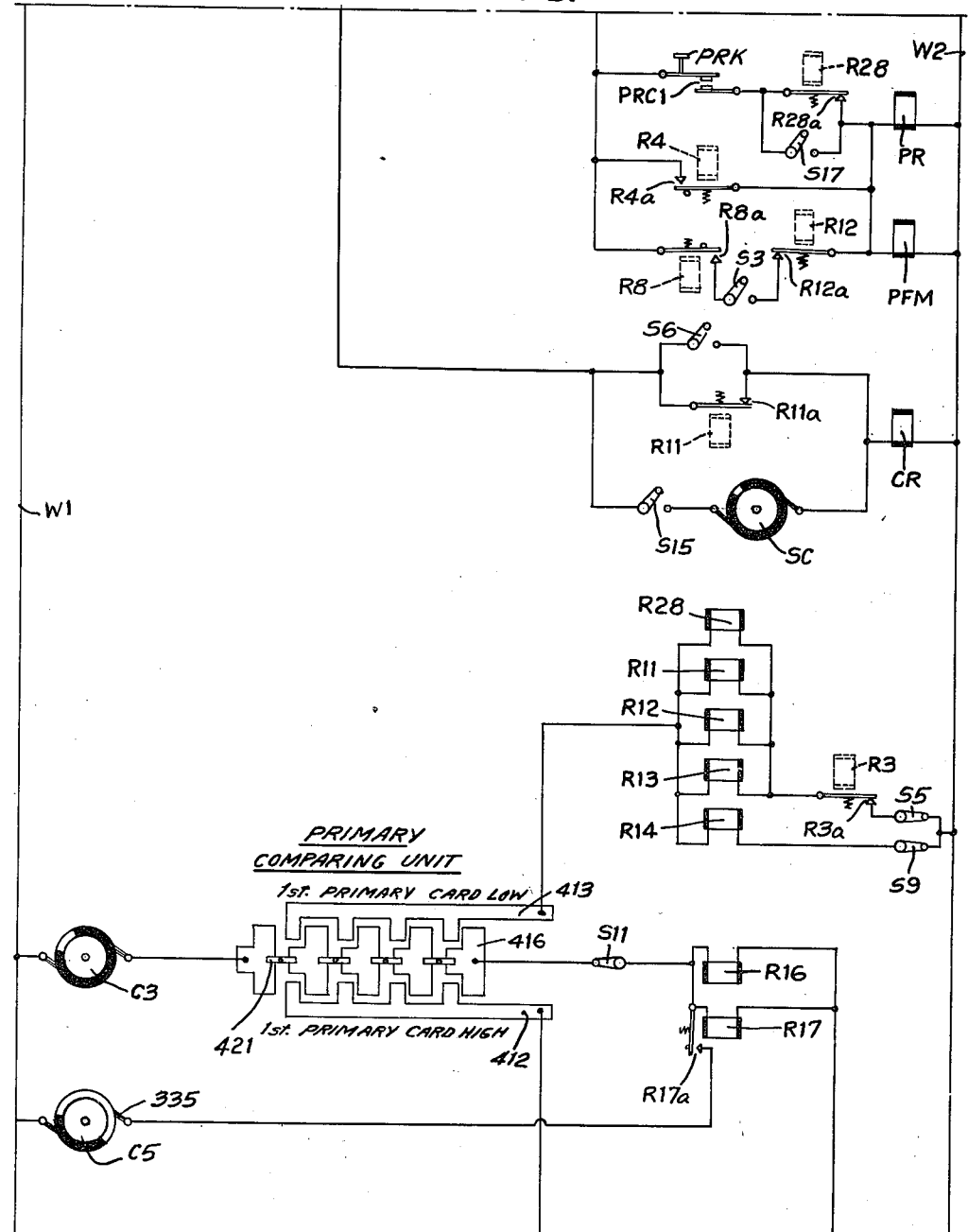
Figure 17C:
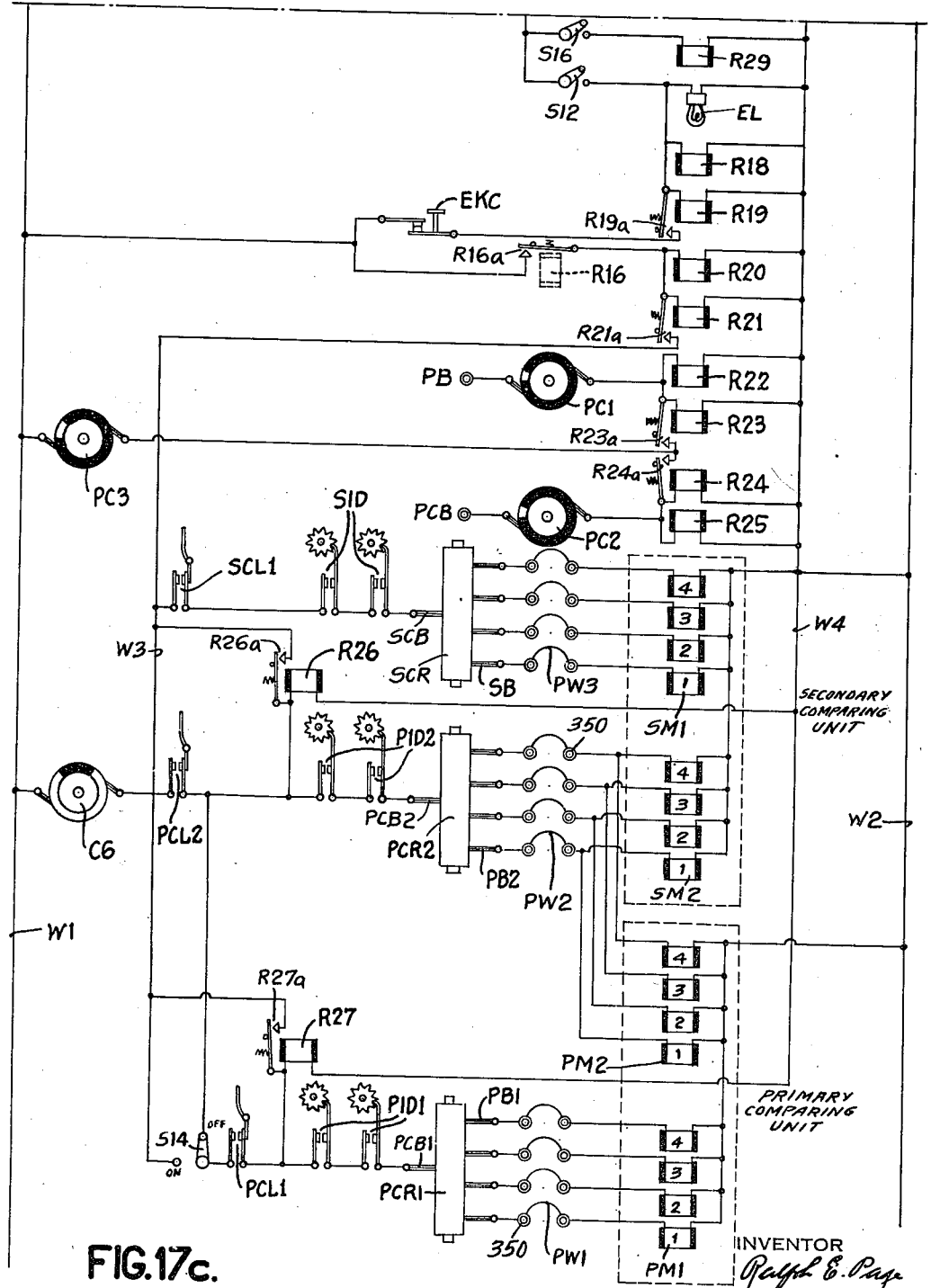

Figs. 17a, 17b, and 17c together form a wiring diagram.

Figs. 18a and 18b comprise a chart showing the settings of the switches for various types of operations and other information in tabular form, such as how the cards are arranged and how they are distributed to the pockets.

Fig. 19 is a plan view of the key controlled switch unit.

Fig. 20 is a vertical section on the line 20—20 in Fig. 19.

Figure 21:
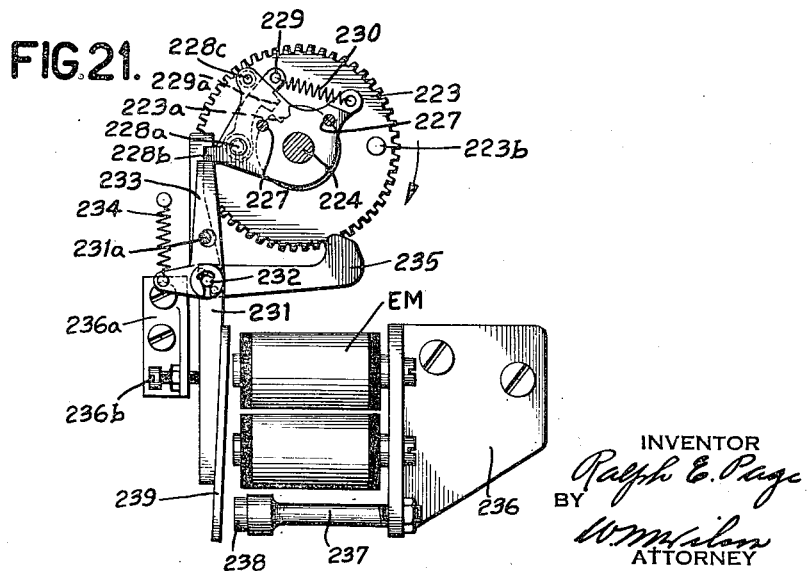

Fig. 21 is a large scale detail view of the eject clutch and its control magnet.

Figure 22:
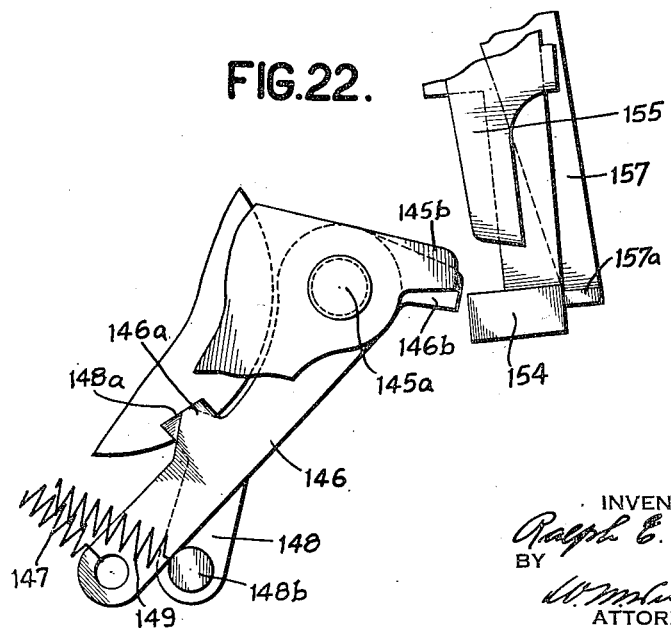

Fig. 22 is a large scale detail view of certain parts shown in Fig. 7.

Fig. 23 is a vertical section on line 23—23 in Fig. 19.

I. SYSTEM OF DESIGNATING ELECTRICAL PARTS OF MACHINE

In describing the invention it will be found convenient and will make the drawings more nearly self explanatory to designate the various controlling magnets and other electrical elements by means of capital letters derived as far as possible by taking the initial letters of the name of the magnet or other element; and where more than one of a kind is present, to distinguish them by means of numbers. Thus the relays and switches are designated R1, R2, etc. and S1, S2, etc. respectively. Other illustrations of this system of designation are the letters EM (eject magnet), PFM (primary card feed magnet), and SFM (secondary card feed magnet).

Due to the complexity of the wiring of the machine, the wiring diagram would become a maze of crossing wires difficult to follow if it were attempted to show each relay magnet opposite the contacts it controls. Accordingly the circuits in Figs. 17a, 17b, and 17c have been laid out so as to extend as directly as possible from one line wire to the other with the relay magnets separated from their contacts. In order to avoid confusion, the contacts associated with each magnet will be designated with the same letters and numbers as the magnets plus the letter a. Thus the contacts of relay R1 will be designated R1a. In addition, the relay magnets will be shown in dotted lines adjacent the contacts wherever the latter appear in solid lines.

II. FRAMEWORK AND CABINET WORK

Figure 1:
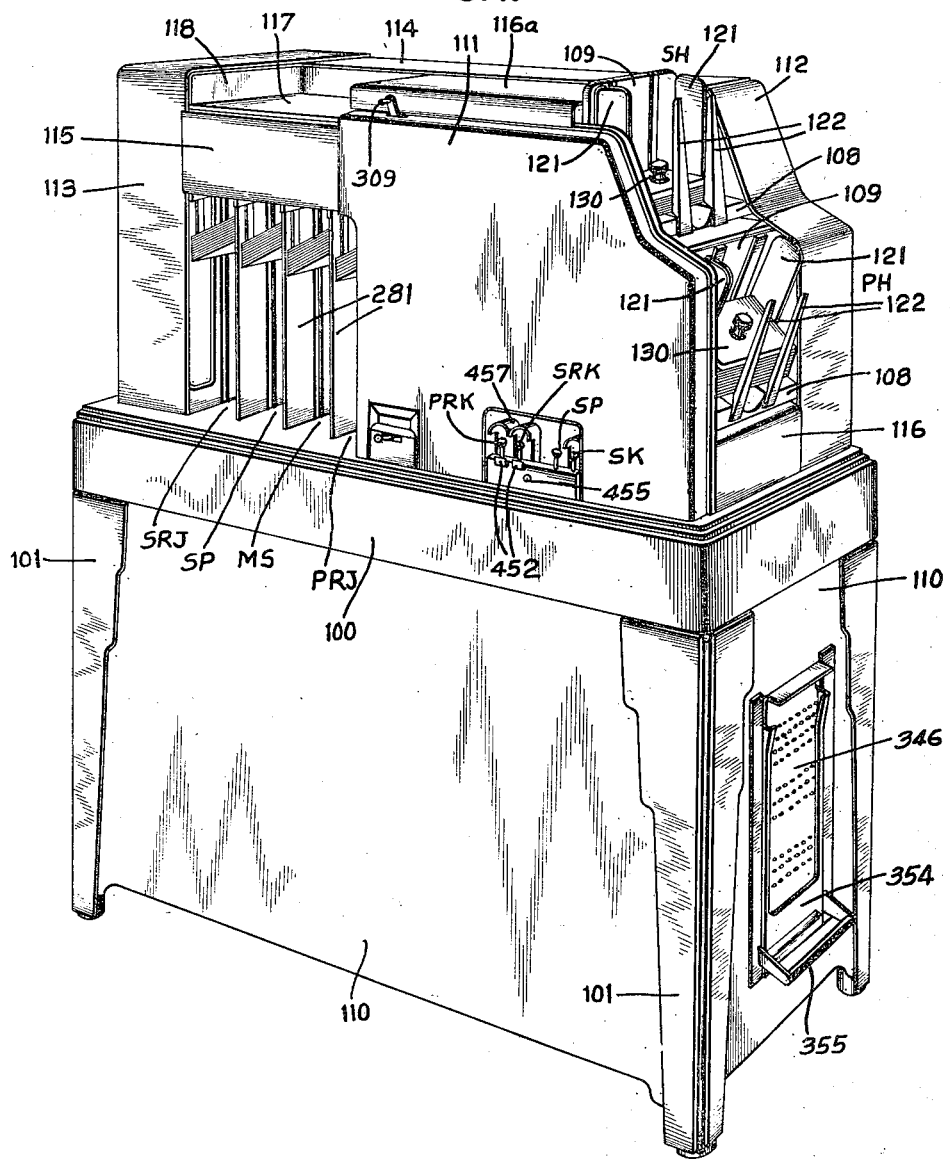
Fig. 1 is a perspective view of the machine with the various covers in place.

The main framework comprises a heavy oblong base casting 100 supported by four legs 101 secured to the base as shown in Fig. 1. Two frame castings 102, 103 are secured to the top surface of the base 100 along the front and rear edges nearest the right hand end of the base (see Figs. 2, 3b, 4 and 6b). The frame castings 102, 103, which are more or less alike but irregular in outline, extend upwardly and to the left. The left hand ends of both frame castings 102, 103 are secured to the upper ends of a pair of vertical bars 104 (Figs. 3b, 4, and 5) which are secured to base 100.

An end plate 105 (Figs. 3a and 6a) is secured to base 100 near the left hand end thereof and extends at right angles to the planes of frame castings 102, 103. Front and rear plates 106, 107 (Figs. 2, 3a, 3b and 6a) are secured to the front and rear vertical edges of plate 105, respectively, and to the frame castings 102, 103. Two pairs of frame castings 108, 109 (Figs. 1, 3b and 6b) join the frame castings 102, 103 and form part of the two card hoppers which will be described hereinafter.

The framework mounted on base 100 just described supports the card feeding, sensing, distributing and analyzing mechanism, and the card pockets and hoppers.

The legs 101 support a framework (not shown) below base 100 on which framework are mounted the driving motor and, where direct current is not available, a suitable motor generator. The relays, fuse box, a terminal board and other usual appurtenances of an electrically controlled machine are also wholly or partly supported by this framework or partly by the base. The space between legs 101 is enclosed by removable metal plates 110 to protect the relays and other parts mounted in the space between the legs from dust and tampering.

A number of separate pieces of sheet metal cabinet work are provided to protect the operator against shocks and to protect the machine against dust and tampering. The cabinet work comprises front and rear covers 111, 112 (Fig. 1) housing the moving parts and electrical equipment located outside of frames 102, 103; an end cover 113 for the driving belt, driven pulley, and the drive gears for the analyzing mechanism; a back plate 114 which extends to housings 112, 113 and also extends over the top of the analyzing mechanism; a front plate 115 protecting the bearings and other parts of the feed rollers located above the card pockets and in front of plate 106; an end plate 116; and a top cover 116a for the secondary card sensing mechanism and other parts in the vicinity of the sensing mechanism. The usual hinged glass shelf 117, with which sorting machines and other record controlled machines are commonly equipped, is provided above the card pockets. This consists of a sheet of plate glass secured in a frame 118 (Figs. 1, 2, 3a and 3b) pivoted on conical studs 119, one of which is threaded into a hole in plate 105 (Fig. 3a) while the other is similarly mounted on a bracket 120 secured to rear frame casting 103 (Figs. 3b and 5). The shelf 117 thus can be swung upwardly and rearwardly to remove cards which may become jammed in the distributing and feeding mechanism above the pockets.

III. CARD HOPPERS

The machine is provided with two separate card sensing and feeding mechanisms for control by two separate batches of perforated record cards, consequently two card hoppers are provided. The record cards used in this machine are of the well known size and shape now used in the Hollerith system of perforated card accounting. The number of columns available in the card for recording data is unimportant but the machine will be described herein as designed for control by eighty column cards like the one described and claimed in Patent No. 1,772,492. The machine is easily adapted for control by either 34 or 45 column cards, this requiring merely a change in the spacing of the card sensing brushes in the case of 45 column cards, and in addition, a change in the dimensions of the card hoppers in the case of 34 column cards.

As a means of distinguishing them, the hoppers will be termed the primary and secondary hoppers, and the adjectives "primary" and "secondary" will also be used in naming the cards placed in these hoppers, and in naming the card feeding, sensing, and comparing mechanisms, and other parts associated with the hoppers or controlled by the respective cards. It will be understood that the words "primary" and "secondary" as used herein are employed purely for the purpose of identifying the parts of the machine and have no special significance. Thus the cards which in one case may be placed in the primary hopper and become primary cards for a specified type of operation, may at another time be placed in the secondary hopper and thereby become secondary cards for a different type of operation.

The primary hopper is generally designated PH while the secondary hopper is designated SH in Figs. 1, 2, 3b, 4, and 6b. These hoppers and the card picker mechanisms associated therewith are constructed in a well known way, having been used for a number of years in "International" record controlled machines, such as sorting machines, reproducers, and multiplying punches. Consequently only a very brief description of the hoppers will be given herein. Both hoppers are alike in details of construction and differ only in that the primary hopper PH is inclined owing to the fact that the cards from the two hoppers are fed to a common point for distribution to the card pockets.

Each pair of frame plates 108, 109 forms the bottom and one side of one the hoppers. Two sheet metal card guides 121 (Figs. 1, 2, 3b and 6b) are secured to the top of each frame casting 108 adjacent frame castings 102, 103 and serve to guide the ends of the cards. Two posts 122 are also secured to the edges of each frame casting 108 opposite the frame castings 109 and guide the right hand or trailing edges of the cards, while two metal strips 123 secured to the right hand face of each frame casting 109 guide the leading edges of the cards (see Figs. 3b and 6b). When the cards are placed in the hoppers the lowest card lies partly on top of ribs 108a formed in the frame castings 108 and also on picker guides 124 secured to said castings (see Fig. 6b).

Card pickers 125 (Figs. 3b and 6b) of well known construction are provided having the usual picker knife 125a and are guided for reciprocatory movement by the guides 124. Each picker 125 is provided with rack teeth meshing with gear segments 126 secured to shafts 127 journaled in frame castings 102, 103, there being two pickers 125, two segments 126, and one shaft 127 associated with each hopper. The usual adjustable throat knife 128 and throat block 129 are provided to prevent feeding more than one card at a time from each hopper. In order to keep the cards flat in the hoppers, the latter are provided with the usual follower weights 130 (Figs. 1, 3b, and 6b). In Fig. 6b the secondary cards and secondary hopper follower weight have not been shown in order to illustrate the construction of the secondary hopper more clearly.

One or both shafts 127 are oscillated at regular intervals to push one card to the left in Fig. 3b into position to be gripped by feed rollers to be described later. The means for oscillating the shafts 127 will be described in the next section dealing with the driving mechanism.

IV. DRIVING MECHANISM

The driving mechanism is shown in Figs. 3a, 4, 6a and 6b. A bracket in the form of a casting 131 is secured to the left hand face of frame plate 105 (Figs. 3a and 6a) and mounted on this casting is a stud on which is journaled a driven pulley 132 connected to the driving motor by a belt 133. When the machine is in use, the pulley 132 is continually driven by the main drive motor. Secured to pulley 132 is a pinion 134 meshing with a gear 135 which is secured to the main drive shaft 136. The latter is journaled in bearings 137, 138 secured to the casting 131 and plate 107, respectively (Fig. 6a).

Coaxial with shaft 136 (Figs. 4 and 6b) is the secondary feed shaft 139 journaled in bearings 140 secured to the rear face of frame casting 103. The primary feed shaft 141 is journaled in bearings 142, also secured to frame casting 103, and makes an angle of approximately 24° with shafts 136, 139, the extreme right hand bearings 142 (Fig. 4) being located so that the right hand end of shaft 141 extends quite close to the left hand end of shaft 136. Secured to the left hand end of shaft 136 (Fig. 4) is a bevel gear 143 meshing with a bevel gear 144 loosely mounted on shaft 141. Obviously bevel gear 144 rotates continually while the machine is in operation.

V. CARD FEED CLUTCH MECHANISM

The feed shafts 139, 141 may be selectively clutched to shaft 136 by means of two magnetically controlled clutches which for convenience will be generally termed the primary and secondary feed clutches. These clutches are controlled by two feed clutch magnets designated PFM, and SFM in Figs. 4, 7, 8, and 17a and called the primary and secondary feed magnets, respectively. Both of these clutches are shown in Fig. 4 and appear directly to the left of the bevel gears 143, 144. The lower of these clutches in Fig. 4 is the primary feed clutch while the secondary feed clutch is located directly above the primary feed clutch. The mechanism of the two clutches is identical except that the parts of the primary clutch are reversed in location and direction of movement due to the fact that gears 143, 144 rotate in opposite directions and due to the limitations of space which preclude mounting the magnets in the same relative positions with respect to the associated feed shafts. Thus the clutch mechanisms are symmetrical with respect to the bisector of the angle between shafts 139, 141. Due to this similarity of construction only the secondary feed clutch will be described in detail herein with reference to Figs. 7, 8, and 22 which are large scale views of the secondary feed clutch mechanism.

The right hand end of shaft 139 is located in a suitable anti-friction bearing in the hub of bevel gear 143 so that shafts 136, 139 mutually support each other, with shaft 139, due to its shorter overhang from the nearest bearing 140 and consequent greater rigidity, providing more support for the clutch parts than the bearing 138. Secured to shaft 139 adjacent the hub of gear 143 is a three armed driven clutch member 145 having a clutch dog 146 pivoted at 145a to one of its arms. The dog 146 has a lug 146a adapted to engage a notch 143a formed in the hub of gear 143. A spring 147, anchored to one of the other arms of the member 145 and to the dog 146, normally tends to draw the clutch dog 146 toward the hub of gear 143 to permit lug 146a to slip into the notch 143a.

A back-lash pawl 148 is also pivoted at 145a and likewise has a lug 148a adapted to engage the notch 143a. The shapes of the lugs 146a, 148a is illustrated in Fig. 22 which shows their relation when engaging the walls of the notch 143a.

Mounted on frame casting 103 above the secondary feed clutch is a casting 150 having two ears or lugs 150a projecting at right angles to shafts 136, 139. These ears support a short rod 151 on which is pivoted the latch lever 152. The armature 153 of the secondary feed magnet SFM is formed in the upper end of lever 152 while the lower end of this lever has a latching lug 154 wide enough to engage a lug 145b in the member 145 adjacent the pivot 145a and also a lug 146b formed in clutch dog 146. With the parts in the normal position of Fig. 7, lug 154, by its engagement with lugs 145b, 146b, holds the driven clutch member 145 against rotation in the direction of the arrow in Fig. 7 and also holds the dog 146 with its lug 146a clear of the hub of gear 143 against the tension of spring 147. The back-lash pawl 148 is likewise held with its lug 148a clear of the hub of gear 143 by reason of a pin 148b on said pawl engaging the dog 146. Spring 149 is anchored to the pin 148b. A pin 145c on the third arm of member 145 acts as a stop for the dog 146 which engages said pin when the parts are in normal position.

A second back-lash pawl 155 is pivotally mounted on rod 151 and has a lug 155a (see Fig. 8 also) in the plane of lever 152. A spring 156, anchored to a pin on casting 150 holds the back-lash pawl 155 in the position of Fig. 7 with the lug 155a engaging lever 152 and with the free end of the back-lash pawl 155 abutting the top edge of lug 145b. Thus the member 145 is securely locked against rotation in either direction.

An armature knocked-off device is provided and consists of a bell crank 157 pivoted on rod 151. One arm of this bell crank has a bent-over lug 157a in the plane of lever 152 but normally sufficiently clear of the said lever to permit its movement to release dog 146 without affecting bell crank 157. The other arm of bell crank 157 has a cam roller 157b cooperating with a cam lug 143b formed in the hub of gear 143. A spring 158 is anchored to the arm carrying roller 157b and to a pin on lever 152. Spring 158 serves the double purpose of holding the roller 157b against the hub of gear 143 and holding lever 152 in latching position with dog 146. Movement of lever 152 to latching position may be adjusted by a stop screw 159 carried by a plate 160 secured to lugs 150a. A post 161, secured to casting 150 above the coils of magnet SFM, has a rubber button 162 against which the armature 153 may strike when magnet SFM is energized. The button 162 prevents the click of the armature which would be heard if the armature was stopped only by a stop screw or the poles of the magnet.

When magnet SFM is energized, lever 152 is rocked counterclockwise (Fig. 7) releasing both the clutch dog 146 and back-lash pawl 148. Springs 147, 149 thereupon draw the dog 146 and pawl 148 toward the hub of gear 143 so that lugs 146a, 148a ride on the smooth surface of the hub. Eventually the notch 143a will come opposite the lug 146a which will drop into said notch and engage the upper wall thereof as shown in Fig. 22. At this point the lug 148a will drop into notch 143a and engage the lower wall of said notch thereby locking the driven clutch member 145 and shaft 139 to gear 143. Thereafter gear 143 will positively drive the shaft 139 until the dog 146 is disengaged from the notch 143a. Near the end of each full revolution of gear 143 and the shafts 136, 139, the cam lug 143b will engage roller 157b and rock bell crank 157 clockwise (Fig. 7). The lug 157a, engaging lever 152, will rock the latter clockwise to its normal or latching position, thereby forcing lug 154 into the path of the lugs 145b, 146b. If magnet SFM remains energized, the lever 152 will be rocked back to its operated position clearing lugs 146a, 148a and the shaft 139 will continue to revolve.

When magnet SFM is deenergized, the lever 152 will not be moved back to its operated position but will remain in normal position. A short time after lever 152 is restored to normal position, lug 145b will wipe past pawl 155 and reengage lug 154, the pawl 155 snapping behind lug 145b to prevent rebound of shaft 139 and the driven clutch member 145 and to lock the shaft 139 in starting position. During the period when lug 145b is moving past pawl 155 into engagement with lug 154, the lug 146b will first engage lug 154 and thereafter cause the dog 146 to be rocked counterclockwise to disengage lugs 146a, 148a from notch 143a, pin 148b compelling the back-lash pawl 148 to move with dog 146.

The primary feed clutch operates in identically the same way under control of the magnet PFM to clutch shaft 141 to shaft 136 with bevel gear 144 acting as the driving member of the clutch.

It will be seen that shafts 139, 141 always rotate one or more full revolutions and always start and stop at exactly the same points. This feature is of importance as it is vital that shafts 139, 141 rotate in exact synchronism with shaft 136. The shaft 136 drives the comparing units of the analyzing mechanism, while the shafts 139, 141 drive the feed mechanisms for the secondary and primary cards, respectively, to feed these cards past the card sensing brushes and it is essential that the sensing of the cards be accurately synchronized with the operation of the comparing units. Shaft 141 is considerably longer than shaft 139 as it has to drive a greater number of feed rollers and more mechanism than shaft 139. Were it not for the back-lash pawls 148, the shock of engagement of the dog 146 of the secondary feed clutch might cause shaft 139 to be thrust ahead of shaft 141 momentarily thus, temporarily at least, making the feed mechanisms nonsynchronous.

VI. CARD FEED ROLLERS

Two independent feed mechanisms are provided for feeding the cards from the hoppers to the point where the distribution of the cards to the pockets is determined and, in addition to these feed mechanisms, a common feed mechanism for conveying the cards to the pockets is provided. The first two feed mechanisms are driven by shafts 139, 141 and will be termed the secondary feed mechanism and primary feed mechanism, respectively, while the third feed mechanism is driven by shaft 136 and will be called the pocket feed mechanism.

The primary and secondary feed mechanisms are essentially the same so far as details of construction and general arrangement but there are more feed rollers in the primary card feed mechanism than in the secondary feed mechanism as the primary cards are sensed twice whereas the secondary cards are only sensed once prior to their distribution to the pockets. The primary and secondary feed mechanisms will be described first and are shown in Figs. 2, 3b, 4, 5, and 6b. The description will begin with the hoppers and follow the paths of the cards to the point of distribution to the pockets.

Secured to each shaft 127, which it will be recalled are rockable to actuate the card pickers 125, is an arm 163 (Figs. 3b and 4) having a roller in a cam groove 164 formed in a gear 165. The gear 165 associated with the primary hopper PH is secured to a short shaft 166 which is journaled in a bracket 167 secured to base 100 and in frame casting 103, while the gear 165 for the secondary hopper is secured to a long shaft 168 journaled in both frame castings 102, 103.

The gear 165 on shaft 166 meshes with an idler gear 169 (Fig. 4) journaled on a stud 170 carried by frame casting 103. Gear 169 meshes with a gear 171 secured to a feed roller shaft 172 journaled in anti-friction bearings 173 carried by the frame castings 102, 103 adjacent the primary hopper PH (see Figs. 2 and 3b). The gear 165 on shaft 168 meshes directly with a gear 171 secured to a similar feed roller shaft 172 journaled in bearings 173 adjacent the secondary hopper SH. Secured to the respective shafts 172 are spiral gear pinions 174 meshing with spiral gears 175 fixed to the shafts 139, 141, respectively. Thus the feed roll shafts 17 are driven in unison but in opposite directions while pickers 125 are driven in unison but in the same direction by shafts 139, 141 through the two trains of gearing just described. Thus the two feed roll shafts 172 and pickers 125 are driven in unison but in opposite directions by the shafts 139, 141 through the two trains of gearing just described.

Each feed roll shaft 172 is provided with card feeding rollers 176 cooperating with similar rollers 177 secured to a shaft 178. (See Figs. 3b and 6b.) The shafts 178 are journaled in arms 179 pivoted at 180 in recesses formed in the front faces of the castings 102, 103. Fig. 2 clearly shows the manner of mounting the arms 179 on the front frame casting 102 with the shafts 178 projecting through large openings 181 in the frame casting 102. Housed in holes in the frame castings 102, 103 at an angle to the bore of openings 181 are spring pressed plungers 182 (see Fig. 3b also), which by engagement with the exteriors of the bearings in arms 179, press rollers 177 into firm contact with rollers 176. This general scheme of mounting one feed roll shaft in fixed bearings and the other on spring actuated arms has been used for all the feed rollers. Due to limitations of space and other reasons, the means whereby the spring pressure is applied will vary in details of construction. The two sets of feed rollers 176, 177 rotate whenever the respective feed shafts 139, 141 turn and grip the cards advanced from the hoppers PH, SH and convey said cards toward the left (Fig. 3b) to a position to be gripped by the next set of feed rollers associated with the respective hoppers.

Certain of the remaining feed rollers of the primary and secondary feed mechanisms are journaled on fixed bearings carried by the frame castings 102, 103 in the same general fashion as the rollers 176 but the coacting rollers of each feed mechanism are mounted on a pivoted frame to permit removal of cards which fail to feed properly or jam in the feed mechanism. There is one of these pivoted frames for each feed mechanism, the one for the secondary feed mechanism being arranged to swing upwardly while the other swings downwardly. The two frames are substantially alike in details but the one for the primary feed mechanism is longer due to the greater number of feed rollers required for feeding the primary cards PC.

Journaled in fixed anti-friction bearings 173 (Figs. 2, 3b, 4) in the frame castings 102, 103 are two pairs of feed roller shafts 172a, 183, for the primary feed mechanism and one pair similarly designated for the secondary feed mechanism. Feed rollers 184, like the feed rollers 176 are secured to shafts 172a, while to the feed roller shafts 183 are secured metallic contact rollers which are insulated from the shafts 183. The contact rollers for the primary feed mechanism are designated PCR1, PCR2 while the one for the secondary feed mechanism is designated SCR. The contact rollers PCR1, PCR2, SCR, and feed rollers 184 are driven in unison from the respective feed shafts 139, 141 by spiral gears 185 (Fig. 4) secured to said shafts and meshing with spiral gear pinions 186 secured to the shafts 182, 183.

Cooperating with the feed rollers 184 on the shaft 172a nearest the primary hopper PH (Fig. 3b) are feed rollers 187 on a shaft 188 which is mounted on frame castings 102, 103 in the same fashion as the feed roller shaft 178, that is, by means of arms 179 actuated by spring pressed plungers 182. The feed rollers cooperating with the contact rolls PCR1, PCR2, SCR and with the remaining feed rollers 184 are all mounted on the pivoted frames mentioned above.

These frames are shown in Figs. 2, 3b, 4, 5, and 6b. They consist of a pair of side plates 189, in the case of the primary feed mechanism, and a pair of side plates 190 in the case of the secondary feed mechanism. These pairs of plates are rigidly joined together, in each case, at the ends nearest the hoppers, by means of tubes 191, and along the edges of the plates by angle strips 192. At the ends opposite the hoppers, the plates 189, 190 are pivoted to the confronting faces of frame castings 102, 103 by means of screw studs 193. The ends of tubes 191 are provided with spring pressed bolts 194 (Figs. 3b and 6b) having knurled finger pieces 195 working in slots in the tubes 191 which bolts enter the bore of the hardened steel bushings 196 pressed into holes (Figs. 2 and 4) in the frame castings 102, 103. The right hand end of the frame of which plates 189 are part can be lowered by pressing the finger pieces 195 of the bolts 194 associated with these plates toward each other to release the bolts. Similarly the right hand end of the frame including plates 190 may be raised.

Cooperating with the feed rollers 184 immediately to the right of the contact rollers PCR2, SCR are feed rollers 197 (Figs. 3b and 6b) secured to shafts 198. The ends of shafts 198 extend through large holes in the respective plates 189, 190 and are journaled in bearings carried by the arms of bell cranks 199 pivoted on plates 189, 190. Springs 200, attached to the other arms of bell cranks 199 and to pins carried by plates 189, 190, respectively, urge the feed rollers 197 into contact with feed rollers 184. The holes in plates 189, 190 through which shafts 198 project, permit a small amount of movement of feed rollers 197 away from rollers 184 to allow for the thickness of the cards and the walls of said holes act as stops to prevent the rollers 197 from becoming displaced from their proper positions more than a small amount when the frame units of which plates 189, 190 form part are lowered or raised, respectively. Cooperating with the contact rollers PCR1, PCR2, SCR are feed rollers 201, most clearly shown in Figs. 5 and 6b, which are made of some form of insulating material, such as "Bakelite," mounted on shafts 202. These shafts are mounted in bearings on the short arms of bell cranks 203 pivoted in the plates 189, 190 and operated by springs 203b which urge rollers 201 into engagement with the contact rollers PCR1, PCR2, SCR. The shafts 202 for the feed rollers 201 work in open slots in the plates 189, 190 to permit removal of the feed rollers when desired. In order to prevent the feed rollers 201 from moving far enough to damage the card sensing brushes or unhook the springs 203b when the frames including plates 189, 190 are lowered or raised, respectively, adjustable stops 203a are provided to limit movement of the arms 203 supporting the feed rollers to an amount only slightly more than enough to cause the feed rollers 201 to resiliently engage the contact rollers.

Cooperating with each contact roller PCR1, PCR2, SCR is a pair of contact roll brushes, these pairs of brushes being designated PCB1, PCB2, SCB in Fig. 17c for the respective contact rollers. As shown in Fig. 2, each pair of brushes is mounted in the end of a metallic terminal post 102a, the latter having two parallel slots in which the brushes are clamped. The posts 102a extend through large holes in the frame casting 102 and are secured in the ends of short bars 102b of insulating material mounted on the frame casting 102.

The various feed rollers described above, including the contact rollers, all have the same diameter whereby the primary and secondary cards will be fed at a uniform speed and in exact synchronism. Dependence is not placed on friction between the cards and the feed rollers to feed the cards accurately but each coacting pair of feed rollers is geared together for driving purposes by a pair of spur gears 205 secured to the feed roller shafts.

The distribution of the cards to the pockets is determined at the point where the primary and secondary lines of feed converge. Just before the primary and secondary cards reach this point, they are gripped by the eject feed rollers which are designated 206, 207 in the case of the primary feed mechanism and 208, 209 in the case of the secondary feed mechanism. These feed rollers are most clearly shown in Figs. 5 and 6b while their driving connections are best shown in Figs. 2 and 4.

The feed rollers 206 are mounted in the frame castings 102, 103 on a shaft 210 which is mounted like the feed rollers 177 in arms 179 actuated by spring pressed plungers 182. The feed rollers 208 are on a shaft 211 mounted similarly to shaft 210. The feed rollers 207, 209 are mounted on anti-friction bearings supported by a shaft or rod 212 carried by frame castings 102, 103 intermediate shafts 210, 211, the anti-friction bearings being prevented from moving axially of shaft 212 by some simple means such as wire rings or spring clips 212a (Fig. 5) sprung into grooves in the shaft 212, there being a pair of spring clips for each roller 107, 109. Rollers 206, 207 and 208, 209 are not geared together, as at this point in the feed of the primary and secondary cards it is not necessary that they be fed exactly in synchronism hence frictional contact of the eject feed rollers with the cards is sufficient properly to feed the cards.

The secondary eject feed rollers 208, 209 are driven by the secondary feed shaft 139 through a train of gears designated 213, 214, 215, 216 in Fig. 2. In this train, gear 213 is secured to the feed roller shaft 202 driven by shaft 139; gears 214, 215, are idler gears mounted on studs carried by a plate 217 secured to frame casting 102; while gear 216 is secured to shaft 211. Thus eject feed rollers 208, 209 rotate continuously while the secondary feed shaft 139 is turning.

The primary eject feed rollers 206, 207 are driven by the main shaft 136 through a clutch controlled by a magnet designated EM in the drawings and hereinafter to be called the eject magnet. The first pair of pocket feed rollers is designated 218, 219 in Figs. 2, 3b, 5 and 6b and are mounted on shafts 220, 221, respectively, which shafts are rotatably mounted in frame castings 102, 103 in the same fashion as shafts 172, 172a, 178, 188 with correspondingly designated parts. Shaft 220 is driven by a spiral gear pinion like the pinions 172 in Fig. 4 secured to shaft 136 and meshing with a spiral gear 175 fixed to shaft 220 (Fig. 6b).

Secured to shaft 220 is a gear 222 meshing with a gear 223 (Figs. 2 and 21) rotatably mounted on a stud 224 carried by frame casting 102. A gear 225 is loosely mounted on stud 224 and meshes with a gear 226 fixed to shaft 210. The eject clutch is located between gears 223, 225 and is shown on a large scale in Fig. 21 with gear 225 removed to show the clutch. The eject clutch is quite similar to the primary and secondary feed clutches but the parts are slightly differently shaped and the back-lash pawl 148 associated with clutch dog 146 is omitted.

Secured to gear 225, as by means of rivets 227 is a three armed member 228 to which at 228a is pivoted a clutch dog 229 actuated by a spring 230. The member 228 has a lug 228b and a pin 228c, said lug engaging a latching shoulder in the upper end of a latch lever 231 pivoted on a stud 232 carried by frame casting 102, while pin 228c serves as a stop to limit counterclockwise movement of dog 229, the latter being held in engagement with the pin by a lug (like the lug 146b in Figs. 7 and 22) formed in dog 229 and engaging the latching shoulder in lever 231. A back-lash pawl 233, pivoted on stud 232, and actuated by a spring 234 cooperates with the latching shoulder in lever 231 to hold member 228 and gear 225 against rotation. The dog 229 has a lug 229a adapted to cooperate with a notch 223a in the hub of gear 223. An armature knock-off lever 235 secured to lever 231 cooperates with a pin 223b on gear 223 and has an ear to which is anchored a spring like the spring 234 mounted behind the latter and anchored to the same pin. Pin 223b has the same function with respect to lever 235 as the cam 143b with respect to lever 157 in Fig. 7. A bracket 236a has a stop stud 236b to limit movement of lever 231 to latching position.

The magnet EM is mounted on a bracket 236 secured to frame casting 102 which bracket carries a post 237 having a rubber button 238 to silence the armature 239 secured to lever 231 when said magnet is energized.

The operation of the eject clutch when magnet EM is energized being almost identically the same as the secondary feed clutch shown in Figs. 7 and 8, it is believed a description of its operation is unnecessary, particularly as this type of one revolution clutch is well known in the art of constructing perforated record card controlled machines.

Three pairs of pocket feed rollers are provided to the left of the pocket feed rollers 218, 219 and are designated 240, 241 in Figs. 3a, 3b, 6a, and 6b. Feed rollers 240 are secured to shafts 242 mounted in fixed bearings 173 carried by the plates 106, 107 which shafts are provided with spiral gear pinions like 174 in Fig. 4 meshing with spiral gears 175 on shaft 136. The feed rollers 241 are made of rubber and are secured to shafts 242a journaled in the arms of bell cranks 199 actuated by springs 200 as in the case of the feed rollers 184. The pocket feed rollers 240, 241 are not geared together as extreme accuracy of feed is not necessary after the cards have been sensed.

VII. CARD GUIDES

The cards are supported and guided from one pair of feed rollers to the next by means of card guides which are shown in Figs. 3a, 3b, 5, 6a, and 6b.

Secured to the frame castings 102, 103 are three bars 243 and three angle strips 244, of which one bar 243 is located between the secondary feed rollers 176, 184 while one angle strip 244 is located between contact roller SCR and secondary feed rollers 184. Secured to the bar 243 and angle strip 244 just mentioned are three card guiding strips 245 which extend from the secondary contact roller SCR to the secondary feed rollers 176, the ends of the strips 245 being bent upwardly slightly to ensure that each secondary card will travel over strips 245 without danger of jamming on the right hand ends of said strips. The strips 245 are located between the feed rollers 184, as shown in Fig. 6b, to avoid interference with them. In a similar fashion the remaining bars 243 and strips 244 are located between the primary feed rollers 176 and contact roller PCR1, and between the latter and contact roller PCR2, respectively. Similar strips 245 are supported by the bars 243 and angle strips 244 associated with the primary feed mechanism.

Fastened to the bars 243 nearest the hoppers and spaced from said bars are the bars 246 to which are secured in each case, three short guide strips 247 which are parallel with the strips 245 and extend between the secondary feed rollers 177, 197 and between primary feed rollers 177, 187. The guide strips 247 are bent slightly at their ends and so spaced from the coacting strips 245 that cards fed from the hoppers will be fully supported and guided from feed rollers 176, 177 to feed rollers 184, 197 in the case of hopper SH and rollers 184, 187 in the case of hopper PH. The angle strips 192 similarly support short guide strips 248, two of which are partly shown on a large scale in Fig. 5.

Secured to frame castings 102, 103 are brackets like 249 in Figs. 3b and 5 on which are mounted cross bars 250 to which are secured guide strips 251, like the strips 248. Bars 252 are secured to the ends of bars 250 and support guide strips 253 similar to and parallel with the strips 251.

Between the two sets of eject feed rollers 206, 207 and 208, 209 and the first pocket feed rollers 218, 219 are located four guides 254 (Figs. 5 and 6b) having roughly the shape of arrow heads in outline mounted on a pair of rods 255 supported by frame castings 102, 103 and spaced from each other and said castings by means of tubes 256 on said rods. The "barbs" of the guides 254 are unequal in length and partly surround the shaft 212 between the feed rollers 207, 209 mounted on said shaft. Coacting with guides 254 are guides 257 which are triangular in shape and mounted on rods 258 and spaced apart by tubes 259 as in the case of guides 254. The guides 257 extend to the left close to the feed rollers 218, 219 and to the right beyond shaft 210 between feed rollers 206 so that the primary cards are fully supported and guided from the eject rollers 206, 207 to pocket feed rollers 218, 219.

A bar 260 is secured to the frame castings 102, 103 above the guides 254 and to this bar are secured four guide strips 261 of which the two nearest the frame castings are similar to the guide strips 248 in shape, while the other two strips 261 are cut away at their right hand ends as shown by dotted lines in Fig. 6b to avoid interference with the feed rollers 208, 209. Near the center of bar 260, a short guide 262 is secured to said bar. The right hand end of guide 262 is upturned as shown in Fig. 5 while the left hand end extends to the left beyond bar 260 to support the right hand end of a longitudinal guide bar 263, the left hand end of which (Figs. 3a and 6a) is secured to the end plate 105. Guide bar 263 is secured intermediate its ends to a transverse support bar 264 secured to plates 106, 107. The right hand end of the bar 263 merely rests on top of the left hand end of the short guide 262.

VIII. CARD SENSING BRUSHES

The holes in the cards are sensed by groups of card sensing brushes as the cards pass the contact rollers. The primary cards are first sensed by the group of primary brushes designated PB1 and then by the group of primary brushes PB2 while the secondary cards are sensed only by the group of secondary brushes SB. The brushes SB, PB1, and PB2 cooperate with the contact rollers SCR, PCR1, PCR2, respectively, and are so spaced that the corresponding index-point positions on one secondary card and two successive primary cards are all sensed together as the respective cards are fed in unison past the respective brushes, assuming that both card feed shafts 139 and 141 are rotating. There are eighty brushes in each group since the machine as shown in the drawings is designed for control by cards having eighty columns of index-point positions.

Fig. 5 shows the brushes SB and PB2 on a larger scale than Fig. 3b. The brushes SB, for example, are secured in transverse slots in a bar 268 made of insulating material, such as "Bakelite," secured in the frames 189, 190. Eye-bolts 269, through the "eyes" of which the shanks of the brushes SB project, are threaded into holes in headed sleeves or thimbles 270 located in holes in the bar 268 at right angles to the slots in which the brushes are laid. The heads of the sleeves may be slotted, as shown, or provided with square or hexagonal heads for turning the sleeves to draw up the eyebolts tight and thereby clamp the brushes in their slots. The electrical connections are made by attaching the circuit wires 271 to plugs 272 which are pushed into the bores of thimbles 270. Due to the closeness of the spacing of the brushes, the holes for thimbles 270 and eye-bolts 269 are staggered to ensure that neither the thimbles 270 nor plugs 272 can make electrical contact with each other. The feed rollers 201 are provided with eighty deep circumferential slots through which the brushes extend into contact with the contact rollers. The brushes PB1 and PB2 are similarly mounted.

In conjunction with the comparing units to be described later, the brushes may compare data on two successive primary cards and, if desired, the data on the first of the two primary cards can at the same time be compared with the data on a secondary card. Thus a dual comparison of data on three different cards can be made simultaneously in a single card feeding cycle.

IX. CARD LEVERS

The primary and secondary cards actuate card levers in the course of their feeding movement from the hoppers to the eject rollers 206, 207 and 208, 209. These card levers in turn actuate certain contacts for controlling the operation of the machine and are shown in Figs. 2, 3b, and 6b.

The short central guide strip 247 located between the pairs of secondary feed rollers 176, 177 and 184, 197 and the long central guide strip 245 extending between the primary contact rollers PCR1, PCR2 each have mounted thereon brackets 273. Pivoted on brackets 273 are card levers 274 which are made of stiff insulating material such as "Bakelite." One arm of each card lever extends downwardly and to the left (Fig. 3b) close to the line of contact of feed rollers 184, 197 and into the paths of cards fed by secondary feed rollers 176, 177 or by the primary feed rollers 201 and contact roller PCR1, respectively. The other arm of each card lever 274 engages the longer of two spring contact members 274a carrying contacts designated SCL, in the case of the secondary feed mechanism, and PCL, PCL3 for the primary feed mechanism. The spring contact members 274a are insulated from each other and brackets 275 by means of which the contact members are mounted on the bar 246 associated with the secondary feed mechanism and one of the bars 243 associated with the primary feed mechanism. In the case of the primary card feed mechanism, a single bracket supports two card levers like 274 and each of these card levers operates a separate pair of contacts mounted in alignment longitudinally of bar 243.

The contacts SCL, PCL, PCL3 are closed except when the card levers are engaged by a card in which case the levers are rocked clockwise (Fig. 3b) to force the contacts apart and open the circuits including them.

When the leading edges of the cards are about to pass between the brushes PB1, PB2, SB and the coacting contact rollers PCR1, PCR2, SCR, further card levers are actuated. The contacts controlled by these card levers are shown in Figs. 2 and 6b and are designated PCL1, PCL2, SCL1. The spring contact members carrying these contacts are insulated from each other and metal blocks 276 by means of which these members are mounted on the front face of frame casting 102. Since these contacts are mounted quite close to the frame casting 102, thin sheets of fibre insulation or "Bakelite" 277 are interposed between blocks 276 and frame casting 102 and are large enough to prevent possible accidental grounds between the contact members and the frame casting 102.

Each pair of contact members is actuated by an arm 278 secured to a stub shaft 279 journaled in a tube secured in a hole in the frame casting 102. Behind the frame casting 102 card lever arms 280 are secured to stub shafts 279 and project into the paths of the cards quite close to the respective contact rollers. The arm 280 for operating contacts SCL1 is shown in Fig. 6b in plan view and is arranged to be depressed by a passing card thereby rocking the stub shaft 279 and the arm 278 operating contacts SCL1 in a counterclockwise direction to close contacts SCL1. Similarly contacts PCL1, PCL2 are closed when a card is about to pass between brushes PB1, PB2 and contact rollers PCR1, PCR2, respectively, but in this case the arms 278 are rocked clockwise, since their associated arms 280 are located above the line of feed of the primary cards instead of below and consequently are lifted by the primary cards. The card levers associated with contacts PCL1, PCL2, SCL1 thus operate to close these contacts only when a card is very close to the position where sensing of the holes commences.

X. CARD POCKETS

Four card pockets are provided to which the cards are distributed by the card distributing mechanism under control of the analyzing mechanism in accordance with the comparison of data on the cards. The construction of the pockets is shown in Figs. 1, 2, 3a, 3b, 5, 6a, and 6b while they are shown diagrammatically in Fig. 15. The pockets are designated as follows: SRJ, the secondary card reject pocket; SP, split pair card pocket; MS, merged sets card pocket; and PRJ, primary card reject pocket. The pockets PRJ, and SRJ receive the rejected primary and secondary cards. The split pair pocket SP receives the secondary cards which are paired or matched with primary cards having the same data but which are to be kept separate from the associated primary cards, hence the convenient short name. Pocket MS receives the matched or paired primary and secondary cards when they are to be kept together and not split between the pockets SP and MS. Pocket MS also receives the primary cards which are paired or matched with cards in pocket SP and it is desired to keep the secondary cards separate from the corresponding primary cards. Pocket MS will also receive all cards when one set of cards is to be filed with another set in numerical sequence. It is desired to point out that the names given the pockets is purely for convenience in description because, as will be shown later, the cards which fall in primary reject pocket PRJ, in certain types of operation of the machine, may be the ones it is desired to select for use in preparing a statement on a tabulating machine and the ones that fall in pockets MS or SP may or may not be used after the operations are finished. In other words, the term "reject pocket" for pockets SRJ and PR does not necessarily mean that the cards falling in these pockets are not used for any purpose.

The construction of the pockets is old and well known having been used in "International" record controlled machines for some time, for this reason the pockets will not be described in minute detail.

The side walls of the pockets consist of the end plate 105 (Figs. 3a and 6a), three partition plates 281, and an end plate 282 (Figs. 3b, 5 and 6b). The partition plates 281 are secured to front and rear plates 106, 107 by means of lugs formed of square rod welded to the upper corners of the plates 283. The lower edges of plates 281 are set in slots formed in round headed studs 284 set in holes in the base 100. The plate 282 is secured to the bars 104. The back walls of the pockets are formed of a plate 285 secured to the back of the machine.

Associated with each card pocket is a card platform 286 secured to a tube 287 which slides in a tube 288 secured in a hole in base 100. A long coil spring in each tube 288 exerts an upward force on tube 287 sufficient to balance the weight of tube 287 and card platform 286. As the cards accumulate on the tops of the card platforms their weight causes the platforms and tubes to descend until the pocket eventually becomes full.

When any pocket becomes full, it operates the usual full pocket stop contacts designated FPC in the drawings. These contacts are carried by spring contact members insulated from each other and the plate 285 on the rear face of which they are mounted just behind the secondary reject pocket SRJ (Figs. 3a and 6a). The contacts are separated when no pocket is full but are closed by means of an arm 289 secured to a shaft 290 journaled in bearings 291 mounted on base 100 behind plate 285. Arm 289 is curved forwardly through an opening 285a in plate 285, upwardly and thence rearwardly through a hole 285b in plate 285 and is provided with an insulating pin engaging the front side of the rear contact member of contacts FPC. Secured to the shaft 290 behind each pocket are arms 292 which extend forwardly in the path of the associated card platforms. A spring 293 attached to a pin on arm 289 in front of plate 285 and to a pin secured to said plate, holds said arm against plate 285 so as to keep contacts FPC open, the rear spring contact member being biased so as to tend to move forwardly to close the contacts.

When a pocket becomes nearly full, its platform engages the associated arm 292 and with the addition of a few more cards, the platform moves arm 292 downwardly. This causes arm 289 to move forwardly permitting contacts FPC to close.

XI. CARD DISTRIBUTING MECHANISM

The disposition of the cards to the pockets SRJ, SP, MS, PRJ is effected by card distributing mechanism. This mechanism is shown in detail in Figs. 3a, 3b, 5, 6a, and 6b and diagrammatically in Fig. 15, and is controlled by two magnets designated PRM, SRM, hereinafter termed the primary and secondary reject magnets, respectively. The mechanism directly associated with these magnets is most clearly shown in Figs. 5 and 6b. The construction of the magnets and the mechanism individual to each are practically identical but the location and direction of movement of the corresponding parts is reversed as it is necessary to place these magnets on opposite sides of the lines of feed of the cards in the respective feed mechanisms. The corresponding parts of the two magnets and the mechanism individual to them are symmetrically located with respect to the bisector of the angle between the lines of feed of the primary and secondary cards as is clearly shown in Fig. 5. Consequently a description of the secondary reject magnet SRM and the mechanism individual to it will suffice for the primary reject magnet and the mechanism individual to the primary reject magnet, the corresponding parts being identically designated except for one or two exceptions.

The magnet SRM is mounted on an L shaped member 294 which is secured to a bar 295 mounted on the frame castings 102, 103. The armature 296 of magnet SRM is pivoted at 297 to member 294 and is normally held away from the poles of the magnet by means of a spring 298. Movement of the armature 296 toward the poles of the magnet is limited by a shoulder formed in a long stud 299 screwed into member 294, the portion of said stud adjacent the shoulder being threaded and extending loosely through a hole in the armature 296 which is smaller in diameter than the smooth part of stud 299. Thumbscrews 300 screwed on the threaded portion just mentioned limit movement of armature 296 away from the poles of the magnet in response to the tension of spring 298.

The armature 296 is shaped to provide a lug 296a (Fig. 5) which is engaged by a hook-shaped portion 301a in a curved blade operating member 301 pivoted on a bracket 302 secured to the L-shaped member 294. The blade operating member 301 has a roller 301b cooperating with a cam 303 secured to shaft 211 and a spring 304 normally tends to draw the member 301 downwardly to cause roller 301b to follow the periphery of cam 303. However, the lug 296a, engaging the hook-shaped portion 301a normally prevents roller 301b from moving into the low part of the cam 303. This cam is so proportioned that the member 301 is raised a slight amount during each revolution of shaft 211 so as to free the hook-shaped portion 301a from lug 296a and relieve magnet SRM from the frictional load caused by the contact of lug 296a with the hook-shaped portion 301a. This enables the armature 296 to move faster and the impulses of current through magnet SRM are timed to occur only when member 301 is being held up by cam 303.

The member 301 is roughly L-shaped in general outline with the portion below hook 301a extending downwardly to a point just above the line of feed of the secondary cards and to the left of shaft 211. At this point member 301 is formed with a lug 301c which is at right angles to the plane of the bulk of member 301. Lug 301c slopes upwardly from left to right and at its extreme right hand end is also bent upwardly. Armature 296 extends downwardly into a position to be engaged by a cam 305 fixed to shaft 211 but the thumb screws 300 are so adjusted that spring 298 normally holds the armature 296 clear of the cam. In the case of primary reject magnet PRM the cams 303, 305 are secured to shaft 210.

The distribution of the cards to the respective pockets is effected by means of three guide blades designated 306, 307, 308 in Figs. 5 and 6b. These blades vary in length and are located in superposed relation beneath the bar 263. The two top blades 306, 307 lead to the pockets SP and MS respectively, while the blade 308 leads to the pocket PRJ. The relation of these blades to the pockets and magnets SRM, PRM is best shown diagrammatically in Fig. 15.

The blades 306, 307 extend horizontally under the lug 301c of the member 301 associated with magnet SRM while the blade 308 is curved downwardly toward the right into cooperation with the lug 301c of the member 301 associated with the magnet PRM. All of the blades are of the same width as bar 263 throughout the length of the latter but to the right of the support bar 260 the ends of blades 306, 307 are cut away to form two narrow tongues which clear each other and press side-by-side upwardly against the underside of lug 301c whereby the free end of blade 307 may be depressed independently of blade 306 below the line of feed of the secondary cards without affecting the blade 306.

With magnet SRM in deenergized condition, the blades 306, 307 are above the line of feed of the secondary cards which condition permits the secondary cards to pass underneath both these blades and over the blade 308 to the pocket MS. Assuming for the moment that both blades 306, 307 are free to work in unison, the energization of magnet SRM causes armature 296 of this magnet to move to the right, disengaging lug 296a from the hook-shaped portion 301a of member 301. This allows spring 304 to draw the member 301 downwardly as the cam 303 rotates thereby depressing both blades below the line of feed of the secondary cards. In this case the secondary cards will pass over both blades 306, 307 under bar 263, and be guided to the secondary reject pocket SRJ.

The blade 308 normally occupies a position below the line of feed of the primary cards as shown in Fig. 5 whereby the primary cards pass over said blade and underneath blade 307 into the pocket MS. When magnet PRM is energized the blade 308 is pushed upwardly above the line of feed of the primary cards and the primary cards will then pass beneath all the blades into the primary reject pocket.

When either magnet is operative to cause the associated blades to move inwardly, that is, toward the card guides 254, the cards affected travel between the lug 301c and the blades. The lugs 301c are inclined away from the lines of feed of the cards and bent at their right hand ends in order to prevent the cards from being caught by the members 301.

It is clear, therefore, that with all three guide blades free to be operated by the members 301 under control of the magnets PRM, SRM, secondary cards and primary cards will be conveyed to the pocket MS for the merged sets when neither magnet is energized, whereas the primary and secondary cards will be conveyed to the primary and secondary reject pockets SRJ, PRJ, respectively, according to whether magnet SRM or magnet PRM is energized.

In some cases it may be desired to keep the primary and secondary cards which agree in respect to the compared data not only separate from the rejected cards, but separate from each other by conveying the secondary card to pocket SP and conveying its related primary card to the pocket MS. This result is accomplished by means of mechanism controlled by a manual lever 309 and appearing in Figs. 1, 2, 3b, 6b, and 15. As will be seen in Figs. 2 and 6b, lever 309 is secured to the front end of a shaft 310 journaled in frame castings 102, 103 and is capable of limited movement between two pins 311 carried by the front face of frame casting 102. A flat spring 312 is riveted at its upper end to lever 309 and is provided with a round-nosed pin projecting through a hole in lever 310 into engagement with one of two spherical depressions or holes like 313 whereby the lever 309 is yieldingly held in either of two positions. Secured to shaft 310 near its mid-point (Figs. 3b, 5, and 6b) is a finger 314 overlying the narrow end of blade 307. Finger 314 is so shaped that the secondary cards can pass underneath even when the finger is moved downwardly an appreciable extent. When lever 309 is in the position shown in solid lines in the drawings, the blade 307 is free to move with blade 306 and the secondary cards can only be conveyed to one of the pockets MS and SRJ. If the lever is moved to the right to the position shown in broken lines in Fig. 15, finger 314 moves the blade 307 to the position it is moved by the blade operating member. With this setting of lever 309 the secondary cards will pass between blades 306, 307 when magnet SRM remains deenergized and will be conveyed to the pocket SP. When magnet SRM is energized the secondary cards will be conveyed to the pocket SRJ.

The blades 306, 307, 308 are secured, as by welding, at their left hand ends to blocks 315 (Figs. 3a, 3b, 5, and 6a). The latter are secured by suitable screws to the beveled surface of card deflector blocks 316 which are secured to the partition plates 281 directly beneath bar 263. The deflector blocks 316 extend upwardly and to the right at an angle to the partition plates 281, being beveled for that purpose, and the planes of the bevels are at right angles to each other so that blocks 315 are horizontal. The heads of the screws securing blocks 315 are countersunk to avoid catching the edges of the cards as they pass over the left hand ends of the blades. Tongues 316a pierced out of the blades 306, 307, 308 extend downwardly and to the left to deflect cards away from the space between blocks 315 and deflectors 316. Over pocket SRJ (Figs. 3a and 6a) a deflector 317 is secured to the top of bar 236 and extends downwardly and to the left, being bent around the edges of a large hole in bar 263.

XII. CIRCUIT TIMING DEVICES

A number of devices such as commutators and impulse distributors are provided for the purpose of controlling the times of closure of various circuits and to prevent arcing between the sensing brushes and contact rolls. These devices will be described in this section.

One group of timing devices comprises six commutators which are driven by the worm drive shaft 136 and are generally designated C1 to C6, inclusive, in Figs. 2, 3b, 4, 6b, 16, 17a, 17b and 17c. These commutators are mounted on a vertical shaft 326 journaled in bearings 327, 328 (Figs. 2, 3b, 4, and 6b) supported by the base 100 and the frame casting 103, respectively. Shaft 326 is driven by shaft 136 through a mitre pinion 329 (Fig. 6b) on shaft 136 which pinion meshes with a mitre pinion 330 secured to shaft 326. Associated with each of the segments 331 of commutators C1 to C6 is a pair of brushes 332 which wipe over the segments. The heavy lines in Fig. 16 indicate the period of time the brushes 332 are in electrical contact with the segments. The brushes 332 are mounted in slots in a vertical bar 333 of insulating material by means of eye bolts and sleeves in the same fashion as the card sensing brushes PB1, PB2, SB are mounted in the bars 268. Bar 333 is secured to base 100 by means of brackets 334 and is also bolted to a lug formed in the frame casting 103.

A second group of primary commutators designated PC1, PC2, PC3 in the drawings is mounted on the primary shaft 141. The brushes 335 for this group are mounted in slots in a support block 336 in the same fashion as the brushes 332. Block 336 is mounted on the frame casting 103 by means of two hexagonal posts screwed into said casting.

A single secondary commutator SC1 is mounted on the shaft 139 and its brushes 335a are mounted in the same fashion as the brushes 335 on a block 336a supported by posts 337a.

The current through the sensing brushes is controlled by two sets of impulse distributors or circuit breakers designated PID1, PID2 for the primary card sensing brushes PB1, PB2, and a third set designated SID for the secondary brushes SB. The impulse distributors PID1, PID2 are driven by the primary feed shaft and are operated by four cams 338 (Figs. 4 and 6b) secured to the shaft 166. The cams 338 are made of insulating material like "Bakelite" and have a scalloped shape (Fig. 4) to provide a plurality of dwells. Cooperating with each cam 338 is a cam follower lever 339 having a roller held in contact with the periphery of the cam by two leaf springs 340. The cam follower levers 339 are pivoted on brackets 341 mounted in front of plates 342 to which the ends of leaf springs 340 are secured. Spaced from plate 342 by a block of insulating material is a contact strip 343 having at its upper end a contact point cooperating with a similar contact point on the upper end of the cam follower lever. There are two cams 338, two follower levers 339, two brackets 341, two plates 342, and contact strips 343 for each set of primary impulse distributors with a single block of insulating material spacing all the contact strips 343 from all the plates 342. Thus there are four impulse distributor units in all, with two in series comprising a set (Fig. 17c). The parts comprising the four impulse distributor units of the two sets PID1, PID2 are insulatably mounted on a single bracket 344 secured to frame casting 103 with a common pair of screws for each unit, a single block of insulating material 345 being interposed between the contact plates 343 and bracket 344.

The set of impulse distributors SID for the secondary brushes are identical in construction and similarly mounted, but there are only two units in series for this set since there is only one set of secondary card sensing brushes. The cams 338 for the secondary impulse distributors are mounted on shaft 168.

The cams 338 are timed to open and close the circuits through the respective sensing brushes synchronously with the sensing of the index-point positions by the respective card sensing brushes as shown by the short heavy lines in Fig. 16. The index-point positions are shown in Fig. 16 by the scale of numerals "9, 8, * * * 0, 11, 12" directly below the scale of degrees of movement.

XIII. PLUGBOARD

A plugboard, generally designated 346 in Figs. 1, 9, and 10, is provided to secure flexibility of operation and is so constructed that the usual toggle type switches are replaced by simple plug switches. The plugboard is removably mounted in the machine whereby it may be removed and another one like it, but plugged according to a different plan, substituted for the one removed. The plugboard and the mechanism for locating it in the machine and locking it in place is well known in the art and substantially identical in details of construction with the one disclosed in application Serial No. 10,299, filed March 8, 1935, by C. D. Lake, now Patent No. 2,111,118. For this reason only a brief description of the plugboard will be given herein.

The plugboard consists of a pair of rectangular plates 347, 348 (Figs. 9 and 10) of substantially the same size and shape secured in spaced relation in a metal frame 349 and provided with rows of contact elements or shoes 350 secured in plate 347 which shoes have suitable bores for the reception of plugs 351. The bores of the contact shoes register with plug holes 352 in plate 348 to permit insertion of the plugs. There are four rows of twenty plug holes 352 with corresponding contact shoes 350 at the top of the plugboard for making plug connections to the secondary brushes SB grouped under the caption "Secondary brushes" in Fig. 9. Similarly there are two groups of four rows of holes 352 for the primary brushes PB2, PB1 disposed, in the order named, below the group for brushes SB. These two groups are captioned "Primary brushes" and "Primary comparing brushes," respectively. The columns of the cards are designated in Fig. 9 by the small numbers 1, 5, 10, etc., indicating the first, fifth, tenth, etc., columns of the cards.

Below each group of plug holes 352 for the respective sensing brushes, is a single row of sixteen plug holes with corresponding shoes 350, these rows being captioned "Secondary magnets," "Primary magnets," and "Primary comparing magnets," respectively. The machine shown in the drawings has a capacity for comparing data recorded in any sixteen columns of a primary card with data recorded in the corresponding columns of a succeeding primary card or a secondary card, or both simultaneously. Therefore, the analyzing mechanism is provided with two comparing units each having two groups of sixteen comparing magnets. The two sections of these comparing units are captioned "Primary comparing unit" and "Secondary comparing unit" in Figs. 17a, 17b and 17c. The sixteen comparing magnets of the secondary unit, which control said unit in accordance with data in the secondary card, are designated SM1 in Fig. 17c and the row of contact shoes 350 associated with the plug holes 352 under the caption "Secondary magnets" are electrically connected to the magnets SM1 when the plugboard is inserted in the machine. Similarly, the magnets PM1 (Fig. 17c) of the primary comparing unit, which control said unit according to data on the second of two successively fed primary cards, are associated with the row of plug holes captioned "Primary comparing magnets" in Fig. 9. The contact shoes 350 of the middle row of sixteen holes 352 captioned "Primary magnets" are associated with the remaining two rows of magnets for both comparing units which magnets are designated PM2, SM2 in Fig. 17c.

As a convenience in visualizing the method of plugging the machine and the relationships the respective brushes and magnets bear to each other, the small numbers 1 to 4 in Fig. 17c framed by the magnet symbols and the small numerals "1," "5," "10," "15," in Fig. 9 above the holes 352 for the respective magnets denote the denominational orders of the analyzing mechanism. Thus "1" signifies the units order and "5" the ten thousands orders, respectively.

It will be noted in Fig. 17c that the units magnets SM2, PM2 of the two comparing units are connected in common so that when the plugboard is in place in the machine, and a plug wire PW2 inserted as in Figs. 9 and 17c, the primary brush PB2 sensing column 20 of the primary cards will be electrically connected to the units magnets SM2, PM2 of both comparing units. Similarly, if plug wires PW1, PW3 are inserted as shown in Figs. 9 and 17c, the brushes SB and PB1 sensing column 20 of the secondary and primary cards will be connected to the units magnets SM1 and PM1, respectively, of the comparing units. With all three plug wires PW1, PW2, PW3 as shown in Figs. 9 and 17c, designations in column 20 of a first primary card sensed by brush PB2 for this column, will be compared with designations in column 20 of a second primary card sensed by brushes PB1 and also with a secondary card sensed by brushes SB.

Below the row of plug holes 352 for the primary comparing magnets in Fig. 9 is a pair of holes under the caption "X unmatch," one hole being marked "PCB" and the other "PB." When the plugboard is in place, the contacts 350 behind these holes are electrically connected to the commutators PC1, PC2 in Fig. 17c. The purpose of these plug holes with their contact shoes 350 will be explained hereinafter.

Under the caption "Switches" in Fig. 9, there is shown seventeen groups of holes 352, there being three holes in each group and arranged in vertical rows under the numbers 1 to 17. There is a contact shoe 350 associated with the upper two holes 352 of each group, but the beveled portion of the contact shoe 350 for the lowest hole 352 of each group may be cut-off or its coacting spring contact finger omitted or not connected except with respect to the groups 13 and 14, so as to make the bore of the lowest contact shoe 350 and the lowest hole 352 merely a convenient receptacle for one of the prongs of a two-prong plug 353. The prongs of the plugs 353 are electrically connected inside the plug and so spaced that the prongs can be inserted only in central and outer holes 352 of a group. When the prongs of any plug are placed in the central and upper hole of a group the circuit is closed whereas the circuit is left open when the plug is placed in the central and lowest holes of a group, except with respect to the groups 13 and 14. These positions are shown by the word "On" and "Off" in Fig. 9. The plug switches are designated S1 to S17 in Figs. 17a, 17b and their condition for various types of operation is shown in the chart comprising Fig. 18.

The plugboard 346 is supported in channel-shaped guides in a frame 354 (Fig. 1) which is pivoted at the bottom adjacent the operating bar 355. When bar 355 is pulled upwardly and outwardly, it operates toggle mechanism as in the cited application which causes the upper end of frame 354 to swing outwardly far enough to permit the plugboard to be removed by sliding it upwardly in frame 354. Behind the plugboard the machine is equipped with a suitable plate having rows of spring contact fingers adapted to engage the beveled contact surfaces of shoes 350 and make electrical contact therewith when the plugboard is in its proper position in frame 354 and handle 355 is in the position shown in Fig. 1.

It is contemplated that the machine disclosed herein be provided with a number of plugboards like the one shown in Figs. 9 and 10, each one being plugged differently from the others whereby no time need be lost in re-plugging the machine each time it is desired to change the type of operation or operate the machine under control of cards which have the data disposed according to a different card form.

XIV. ANALYZING MECHANISM

In the preceding section it was explained that the analyzing mechanism comprised two sections or comparing units each having two groups of sixteen controlling magnets. Both the primary and secondary comparing units are identical in construction except in one minor respect. In the present section, the construction of the secondary comparing unit will be described in detail, as it is the most complete, and the respects in which the construction of the primary comparing unit differs from the secondary unit will be explained at the proper points.

Fig. 4 shows a rear elevation of the primary comparing unit, while Fig. 11, is a similar view, on a larger scale, of the secondary comparing unit. Portions of the both units appear in Figs. 6a and 6b to illustrate their location, manner of mounting in the machine, and the driving connections which are identical for both units. The mechanism for each unit is mounted in a pair of side plates 356 (Figs. 4, 6a, 6b, 11, and 12) secured together by six magnet support bars 357, two stop pawl support bars 358 (Figs. 11, 12, and 13), and two spring anchoring bars 359. The magnet support bars 357 are secured to plates 356 by means of angle strips 360 screwed to said plates.

The two rigid frames thus formed by plates 356 and the bars 357, 358, 359 are mounted on two rectangular bars 361, 362 secured to the main framework of the machine by means of two pairs of hexagonal screw studs 363. The pair of studs for bar 361 are screwed into the support bar 104 (Fig. 4) and the end plate 105 (Fig. 6a), while the pair for bar 362 are screwed into plate 105 and the rear frame casting 103, respectively. The lower, horizontal edges of plates 356 have rectangular slots (see Fig. 12) embracing the bar 361 while the upper front corners of the plates are adjustably secured to bar 362 by means best shown in Figs. 11 and 12. This means consists of blocks 364, secured to plates 356; a stop screw 365, screwed into a threaded hole in block 364 and abutting the side of bar 362; and a clamping screw 366 passing loosely through a hole in block 364 and into a threaded hole in bar 362. By loosening the screws 366 for each comparing unit and turning screws 365 in the proper direction, the unit may be adjusted relative to bar 362 by a pivoted movement on bar 361. This adjusting means is provided for the purpose of bringing the drive gears for the comparing units into proper meshing relation.

There is provided a separate drive shaft 367 for each comparing unit which shafts are journaled in the frame plates 356. Secured to shafts 367 are gears 368 which mesh with gears 369 secured to the main drive shaft 136. Each shaft 367 has secured thereto a pair of bail operating cams 370 (Figs. 11 and 12) each of which is located adjacent one of the side plates 356, and also a pair of restoring cams 371a, 371b (Fig. 13) located close together on a common hub near the center of the shaft. Thus shaft 367 and cams 370, 371a, 371b are rotated continually by the drive shaft 136.

Each of the comparing units is provided with a main support rod 372 which is secured to the centers of the side plates 356 and the bulk of the moving parts of the comparing units are supported by these rods. Rotatably mounted on rod 312 in interspersed relation are two series of sectors designated 373, 374 in Figs. 11 and 12. There are sixteen sectors in each series to correspond with the number of comparing magnets in the comparing unit. In the case of the secondary comparing unit, each sector 373 is associated with one of the comparing magnets SM1 and is paired with one of the sectors 374 which sector, in turn, is associated with one of the magnets SM2. In other words, there is a pair of magnets like SM1, SM2, and a pair of sectors 373, 374 for each denominational order of both comparing units. The sectors 373, 374 for each denominational order are located side by side but are separated by certain parts which are mounted on rod 372 between the sectors. The pairs of sectors may be separated from each other by suitable spacing washers or by the hubs to which the sectors are secured.

The bars 358 are transversely slotted opposite the edges of the sectors 373, 374 and are also longitudinally grooved to support pivot wires 375. The wires 375 act as pivots for stop pawls 376 located in the transverse slots in the bars 358. There is a stop pawl 376 for each sector 373, 374 and each pawl is located in the plane of its cooperating sector so as to be capable of engaging ratchet teeth formed in the sector. Springs 377 anchored to the pawls and to the spring anchoring bars 359 tend to rock the pawls 376 into engagement with the ratchet teeth on the sectors 373, 374. Combs 358a hold the pawls 376 and sectors 373, 374 in alignment.

Normally the pawls are held out of engagement with the sectors by means of the armatures 378 of the comparing magnets. The comparing magnets SM1, SM2, PM1, PM2, are mounted on narrow plates 379 each secured to the central bar 357 and to one of the outer bars. Since the coils of the magnets are larger in diameter than the width of the space allotted to each pair of sectors 373, 374 with their pawls and other parts comprising one denominational order, the magnets of each group of sixteen are arranged in two parallel rows of eight each, with the magnets in staggered relation. Thus the two pawls 376 associated with the two sectors 373, 374 shown in Fig. 12 are controlled by the left-hand magnet SM1 and the right-hand magnet SM2, while the right-hand magnet SM1 and the left-hand magnet SM2 control the pawls associated with the pair of sectors 373, 374 immediately behind those shown in Fig. 12. The numerals 1 and 2 on the coils of the magnets indicate the denominational orders.

The comparing magnets have L-shaped yokes 380 (Fig. 12) secured to the plates 379 by the same screws 381 as are used to secure the cores of the coils to the yokes. The vertical portions of the yokes are provided at their ends with rectangular slots (see Fig. 11) to form a pair of posts which project through aligned slots located on opposite edges of the armatures 378. The horizontal portions of the slots in the yokes 380 and the sides of the slots in the armatures 378 are slightly beveled and these beveled portions coact to form pivots for the armatures. Springs 382 (Figs. 11 and 12), attached to the armatures 378 and to pins carried by yokes 380, tend to hold the armatures in engagement with the stop pawls 376.

The free ends of armatures 378 associated with the left-hand row of magnets SM1 (Fig. 12) and the right-hand magnets SM2 rest on shoulders formed in the tails of the associated pawls 376 and abut the vertical walls of the shoulders. The armatures 378 for the right-hand magnets SM1 and the left-hand magnets SM2 have openings adapted to hook over the tooth formed by the shoulders in the pawls and rest on the shoulders. Thus the armatures 378 normally hold pawls 376 out of engagement with the sectors 373, 374.

Rotatably mounted on the rod 372 are two bails 383, 384 associated with the two series of sectors 373, 374, respectively. The bail 383 projects through the planes of all the sectors 373 and is connected to the sectors by means of springs 385 which tend to draw the sectors 373 into engagement with the bails so that oscillation of the bails will cause the sectors to follow the movements of the bails provided none of the pawls 376 have been released. Bail 384 is similarly associated with sectors 374.

Oscillation of the bails is controlled by the cams 370. Rotatably mounted on rod 372 adjacent the side plates 356 are cam follower levers 386 (Fig. 12) having rollers 387 engaging the respective cams 370. The ends of the levers 386 engage the ends of screw studs 388 located at the ends of bails. Heavy coil springs 389 (Fig. 13), anchored to pins 390 carried by the arms of the bails and to brackets 391 secured to plates 356, have a tendency to rock the bails in a counterclockwise direction (Figs. 12 and 13) and thereby, through the screw studs 388, press the rollers 387 into contact with cams 370.

There are nine ratchet teeth in each sector 373, 374 and also abutments 373a, 374a comprising zero stops projecting a greater distance radially of rod 372 than the ratchet teeth so as to arrest the sectors in a zero position by engaging the ends of stop pawls 376 in every case where a stop pawl is not released by energization of a magnet. In other words, the sectors 373, 374 will always move to zero positions unless stopped in other positions by release of the stop pawls 376. The ratchet teeth have the numerical values shown in Fig. 12 by the small numerals adjacent the teeth and the cams 370 are so shaped that, as the bails move in a clockwise direction, the ratchet teeth will pass the ends of pawls 376 in synchronism with the sensing of the index-point positions on the record cards. In other words, the "9" teeth will be opposite the ends of pawls 376 when the brushes reach the "9" index point position and so on for the other index-point positions.

Fig. 12 shows the positions the sectors 373, 374 for the tens order of the secondary comparing unit assume when both a primary and a secondary card have a "9" hole in the tens column of the card field in which the numbers compared are recorded. In this figure the bails have moved to their limit of travel in a clockwise direction, reached after about 198° of movement of shaft 136 from the point where the sensing of the card commences, and the cam roller 387 is on the dwell shown in Fig. 16 between the 198° and 216° positons of the cycle.

Normally, movement of the bails 383, 384 is prevented by mechanism controlled by certain restoring magnets designated CR, PR, and SR. This mechanism is shown in Fig. 13 which illustrates the bail control mechanism for the secondary comparing unit.

Restoring magnets SR and PR are constructed like the comparing magnets SM1, PM1, etc. and are similarly mounted on the bars 357 by means of plates 379a like the plates 379. The armatures 378a of magnets SR, PR engage shoulders in stop pawls 392 actuated by springs 393 anchored to bar 359. The stop pawls project into the paths of stop arms 394 pivoted on slotted blocks 395 secured to the centers of bails 383, 384. Springs 396, anchored to bails 383, 384 and to ears formed in the stop arms 394 normally hold the stop arms against the bails which act as stops to limit clockwise movement of the stop arms.

Each pair of sectors 373, 374, in moving to various positions under control of the card sensing brushes, will also move relative to each other different extents angularly about rod 372 according to whether the hole in one of the columns compared is higher or lower in value than the other but will not move relative to each other when the holes are of the same value. Each pair of sectors 373, 374 is connected together mechanically to control a switching device for determining which of the holes in two cards compared is higher or lower in respect to the column compared and also to indicate when the holes are equal in value. This mechanical connection is most clearly shown in Fig. 12.

Both sectors 373, 374 are provided with pins 397 located equal distances from rod 372 and having circumferential slots riding in curved slots formed in a differential link or beam 398 which in outline bears a resemblance to an ox bow as viewed from the right-hand margin in Fig. 12. Each differential link has a pin 399 which extends through, and projects from both sides of the differential link. The front end or head of the pin 399 is provided with a circumferential groove embracing a straight slot formed in a guide plate 400, while the shank of the pin acts as a rivet to secure a grooved collar to the rear side of the differential link. The grooved collar is of substantially the same dimensions as the head of the pin and the groove in the collar embraces a cam slot formed in a contact control arm 401.

The guide plates 400 are forked at one end to partly surround rod 372 and also have a shallow rectangular slot at the other end embracing a support bar 402 secured to plates 356. The upper and lower edges of bar 402 are provided with slots to prevent the guide plates from being displaced along said bar. The rod 372 is provided with circumferential grooves into which the forked portions of guide plates 400 are located. Thus the guide plates are maintained in accurately spaced relation on rod 372 and bar 402, respectively.

The guide slots in the plates 400 are straight and extend radially of rod 372. It is evident that links 398 may rotate about pins 399 as an axis and that pins may also slide radially of rod 372 but cannot be displaced angularly of rod 372. The curved slots in links 398 are so designed that, when both sectors of a pair move equal distances, as would be the case when both holes in a given column of two cards have the same numerical value, both ends of the link will receive equal angular displacements and consequently pin 399 will remain stationary so far as movement radially of rod 372 is concerned. On the other hand, if a hole in a given column of the secondary card, for example, is lower in value than the hole in the same column of the primary card, the sector 373 will move clockwise a greater extent than the sector 374. As a result the upper end of link 398 will be moved farther to the right than the lower end is moved to the left, causing pin 399 to move to the right.

The contact control arms 401 are rotatably mounted on rod 372 and the slots therein have two long straight portions, angularly displaced with reference to rod 372 and substantially radial of rod 372, and also a relatively short straight portion connecting the longer portions but making a rather sharp angle to a line passing through the center of rod 372. When both sectors 373, 374 of a pair are at either of their limits of travel or in positions having the same value, the pin 399 will be located at the center of the short connecting portion of the slot in arm 401 thus holding said arm in a neutral position. When any pin 399 is caused to move to the right, as is the case where a hole in a given column of a secondary card is lower than the hole in the corresponding primary card, pin 399 enters the right-hand straight portion of the slot in the associated contact control arm 401 causing said arm to rock counterclockwise. On the other hand, when the numerical relation of the holes is reversed and pin 399 moves to the left from the neutral position, pin 399 enters the left hand straight portion of the slot in contact control arm 401, camming said arm in a clockwise direction.

Summarizing the foregoing description, the control arms 401 move clockwise when the primary cards are lower and counterclockwise when the primary cards are higher in respect to the value of the holes in the columns of primary and secondary cards compared under control of the magnets SM1, SM2 through brushes SB and PB2, respectively.

The primary comparing unit is identical in construction with the secondary comparing unit and the location of its comparing magnets PM1, PM2 is the same relatively as the magnets SM1, SM2 in Fig. 12. The bail 383 for the primary comparing unit is controlled by a restoring magnet CR (see Fig. 6a) but, while a restoring magnet is provided for bail 384, its armature is omitted and its coil is not connected to any circuit. As a consequence of the omission of the armature, the bail 384 for the comparing unit, and also the sectors 374, will oscillate continually as long as the machine is in operation. Thus a number inserted in the primary comparing unit under control of brushes PB2 and magnets PM2 is invariably erased from the primary comparing unit by bail 384 at the end of the cycle in which the number was entered.

The enlarged portions of the slots in the parts designated 398, 400, 401 have no useful purpose so far as the operation of the comparing units are concerned, but are provided to facilitate assembly, and for this purpose are made large enough to insert the heads of the pins 397, 399 to engage the grooves in said pins with the edges of the slots.

The contact control arms operate switching mechanisms which selectively control the various card feed magnets, reject magnets, and eject magnet, either directly or through relays. The switching mechanisms also control the restoring magnets PR, SR, CR to cause the numbers entered in the comparing unit to be erased by restoring the sectors 373, 374. The switching mechanism is shown to best advantage in Figs. 11, 12 and 14.

Mounted on posts 405 (Figs. 11, 12 and 14), rectangular in section and pressed into holes in the side plates 356, is a switch contact assembly generally designated 406 in the drawings, screws 407, threaded into transverse holes in posts 405, being used to secure the switch contact assembly to the studs. The base of the switch contact assembly consists of a base plate 408 (Fig. 14)

and a face plate 409 both of stiff insulating material like "Bakelite" separated by a thin and narrow spacing strip 410, also of insulating material. The rivets 411, which secure the plates 408, 409 and the spacing strip 410 together also secure two common contacts strips 412, 413 to the face of the strip 409. Washers 414, through which the rivets 411 along the lower edges of strips 408, 409 pass, space said plates apart a distance equal to the thickness of strip 410.

Located between the two strips 408, 409 is a series of seventeen terminal plates 415 the shanks of which project downwardly beyond the edges of strips 408, 409 and have holes for terminal screws. The upper portions of plates 415 to some extent resemble 45° right triangles in shape with the apexes of the 90° angle pointing to the right. On the face of the strip 409 are seventeen contact plates 416. Each terminal plates 415 is riveted to the strip 409 and to one of the contact plates 416 by means of a common pair of metallic rivets 417 so that each plate 415 is electrically connected to a contact strip 416.

The contact strips 412, 413 are serrated and so arranged that the serrations confront each other and extend into the spaces between the contact plates 416, but the serrations on one contact strip do not touch either the plates 416 or the serrations on the other contact strip. Fitting between the abutting ends of the serrations in strips 412, 413 and the opposing edges of the contact plates 416 are rectangular blocks 418 of insulating material secured to terminal plates 415 by means of rivets 419 the round shanks which pass through holes in the strip 409 and the rectangular heads of which are set in rectangular grooves formed in blocks 418. After the switch assembly has been riveted together, the faces of the strips 412, 413, plates 416, blocks 418, and rivets 419 are ground flat to secure a uniform height above the strip 409.

The extreme left hand contact plate, associated with the extreme left hand contact rivet 419, has no other purpose than to provide a metallic backing for the rivets 417 which secure said plate to the left hand terminal plate. The left hand terminal plate 415 and its rivet 419 are electrically connected to the group of equal relays R6 to R9 (Fig. 17a) in the case of the secondary comparing unit and the relays R16, R17 (Fig. 17b) for the primary comparing unit. The right hand terminal plate 415 has no contact rivet 419 and is connected to one brush 332 of commutator C1 (Fig. 17a) in the case of the secondary comparing unit and commutator C3 for the primary comparing unit 1 (Fig. 17b). The contact strips 412, 413 are connected to the four groups of relays designated as follows: R2 to R5 (Fig. 17a) which control the machine when the number punched on a secondary card is higher than the number punched in the primary card; R10, which control when the primary card is higher in value; R11 to R14 and R28, which control when the first primary card is lower in value than the second; R18, R19, and R29, which control when the first primary card has a higher value than the second.

Secured to each of the contact control arms 401 (Figs. 11 and 12) is a plate of insulating material 420 on which is mounted a contact blade 421 having two contact fingers each carrying contact points. Normally the fingers of each blade 421 bridge the gap between the contact rivet 419 of one terminal plate 415 (Fig. 14) and the contact plate 416 of the next terminal plate 415. When the holes in the columns of two cards have the same value, that is, the numbers recorded are equal, the contact control arms 401 remain in the central or equal position as has already been explained, whereby the terminal plates 415, contact plates 416, and contact rivets 419 will be connected in series by the contact blades 421 as shown diagrammatically in Figs. 17a and 17b. This condition prevails in respect to unused orders of the comparing units, as for example, if only the lower four orders were used for comparing numbers having four digits, the sectors 373, 374 for the fifth to sixteenth orders would always move to the "0" position causing their associated arms 401 to remain in the central or "equal" position.

The small numbers in Fig. 14 below the blades 421 and in Figs. 17a, 17b, above the diagrammatic representation of said blades indicate the denominational orders of the comparing units. Assume that certain columns of a secondary card are punched to represent the number 6896 while the same columns of the primary card are punched 6977. Since the two numbers are equal in the highest order the control arm 401 for this order will remain in equal position. The arm 401 for the third or hundreds order, will move counterclockwise (Fig. 12) causing its contact blade 421 to move upwardly (Fig. 14) or downwardly (Fig. 17a). The contact blade 421 for the units order will move in the same direction as the primary card is higher than the secondary card in both the units and hundreds orders. The arm 401 and blade 421 for the tens order will move in a clockwise direction (Fig. 12) or upwardly in Fig. 17a since the primary card is lower than the secondary card in the tens columns. The blade 421 for the hundreds order, in moving upwardly in Figs. 12 and 14, slides over the fourth contact plate 416 from the left (Fig. 14), or the fourth from the right in Fig. 17a, to a position to bridge the gap between said plate and one of the serrations in strip 412 thereby electrically connecting said strip with the fourth contact plate from the left in Fig. 14. In Figs. 17a and 17b, in order to simplify the wiring diagram, the contact plates and terminal plates are shown in a simplified form as if the contact plates were T shaped with the vertical part of the T extending between the serrations in strips 412, 413. It is apparent that this movement of the hundreds arm 401 and its blade 421 has the effect of breaking the circuit from commutator C1 to the units and tens blades 421 and no current can flow through them notwithstanding the fact that the units order blade 421 contacts with strip 412 and the tens order blade 421 with the strip 413. As the tens order blade also breaks the circuit to the units order blade, there is no danger of a back circuit to contact strip 413 through the units and tens order blades 421.

The gist of the foregoing description is that the highest order in which there is a difference in the values of the holes in corresponding columns of two cards being compared predominates over lower orders of the comparing unit. Thus, in Figs. 17a and 17b, if the first primary card is higher than the secondary card and/or the second primary card in respect to the fourth order, for example, the fourth order blades 421 will move down (or upwardly with reference to Figs. 12 and 14) and connect the commutators C1 and C3 to the relay R10 (Fig. 17a) and the pair of relays R18, R19 (Fig. 17b), respectively, through the strips 412, the fourth order blades 421, and the contact strips 416 and blades 421 of the higher orders. If the second primary card and/or the secondary card are higher in value than the first primary card in the fourth order, the blades 421 for these orders will move upwardly, thereby connecting commutators C1, C3 to the two groups of relays R2 to R5 and R11 to R14, R28, respectively. Commutators C1, C3 close the circuits to the switch contact assemblies at 180° in the cycle of the machine or just after the sensing of the "0" holes in the card (Fig. 16).

Knock-off mechanism is provided for the armatures of the comparing magnets SM1, SM2, PM1, PM2 and the restoring magnets PR, SR, CR. The knock-off mechanism for the comparing magnets of the secondary comparing unit is shown in Figs. 11 and 12. A separate knock-off bail 422 is provided for the armatures of each group of comparing magnets SM1, SM2, PM1, PM2. Each bail is pivoted on a pair of screw studs 423 carried by side plates 356 and extends transversely of the tips of armatures 378 on the same side thereof as the coils of the comparing magnets. Springs 424 anchored to bars 358, hold the knock-off bails against the edges of angle strips 425 secured to bars 357, which angle strips act as stops for the knock off bails. Secured to each bail is a pair of side arms 426 which extend into the paths of bails 383, 384. When the latter push the sectors 373, 374 back to their starting position by rotation in a counterclockwise direction, the noses of pawls 376 wipe over the teeth in sectors 373, 374 and eventually ride up on the smooth portions 373b, 374b of the sectors which are made slightly higher than the teeth for the purpose of camming the pawls 376 slightly beyond the latching position. At this point the bails 383, 384 strike the arms 426 and rock bails 422 clockwise thereby forcing the armatures 378 into latching relation with the pawls 376 in the event the armatures should stick to the poles of the magnets.

The knock-off mechanism for magnets SR, PR and CR, is illustrated in Figs. 11 and 13. Rockably mounted on rod 372 is a pair of cam follower levers 428a, 428b each having two rollers cooperating with one of the cams 371a, 371b whereby both levers 428a, 428b are oscillated periodically when shaft 367 rotates. Cam 371b is timed approximately 50° in advance of cam 371a (Fig. 16), so that lever 428b always rocks to the left (Fig. 13) ahead of lever 428a. As a convenience of manufacture, levers 428a, 428b are alike and may be made with the same die but they have separate functions.

Lever 428a has pin and slot connections to arms of two armature knock-off levers 429, each associated with one of the magnets SR, PR. The levers 429 are pivoted on brackets 430 secured to the L-shaped yokes 380a of the restoring magnets SR, PR and the other arms of levers 429 have bent-over lugs cooperating with the armatures 378a of the restoring magnets. It is apparent that once in each cycle of shaft 367 the lever 428a will be rocked counterclockwise, thereby operating the levers 429 to force the armatures 378a away from the poles of the magnets. Before this takes place lever 428b is similarly rocked and, by engagement of cam lugs 431 formed in said lever with square studs 392a secured to pawls 392, said pawls are rocked clockwise slightly beyond their latching positions with armatures 378a. Thus both the pawls 392 and armatures 378a are positively restored whenever sticking thereof occurs.

The primary comparing unit is similarly constructed but in this case only the upper half of the knock-off mechanism has any utility. The levers 428a, 428b, as well as the pawls 392 are guided by the combs 358a in both comparing units.

Since the construction and operation of the comparing units has been described in detail in the present section, in subsequent sections, dealing with the various types of operation of which the machine is capable, only general reference will be made to the operation of the comparing units.

XV. MACHINE CONTROL KEYS

There is provided at the front of the machine a group of four keys and a signal lamp which are part of a control unit mounted on the base 100. The control unit is shown in Figs. 1, 19, 20, and 23. The group of keys consists of the start key SK (Figs. 1, 19 and 23), the stop and error key SP (Figs. 1 and 19), the secondary run-out key SRK (Fig. 20) and primary run-out key PRK (Figs. 1 and 19). The functions of these keys will be explained in describing the various types of operations of which the machine is capable.

The control unit (Figs. 19, 20 and 23) has a base 435 consisting of a flat plate on which are riveted a number of posts 436 on which posts is mounted the key guide 437, screws 438 securing said plate to the posts. The key guide 437 is formed with a skirt portion extending downwardly at right angles to the plate 435 against the front edge of which the skirt abuts. Both the base 435 and key guide 437 have vertically aligned round holes to guide the stems 439 of the keys. The key stems consist of short round rods to each of which is secured a flanged collar 440 made of insulating material. The key caps are of a conventional form. Springs 441 interposed between the hubs 440 and base plate 435, normally press the keys upwardly with collars 440 against the underside of the key guide 437.

A double armed bracket 442 is riveted to base plate 435 (Figs. 19 and 23) directly behind the stem 439 of the start key SK. Pivoted on a pin 443 carried by the two arms of bracket 442 and located between said arms, is a contact operating lever 44 formed of sheet metal and channel shaped in cross section. The front end of lever 44 projects under the flange of the collar 440 of start key SK while the rear end supports a long pin 445 of insulating material projecting to right and left (Fig. 19), well beyond bracket 442, underneath the lower contact members of two sets of conventional contact assemblies SK1, SK2 mounted on base plate 435 on opposite sides of bracket 442.

Pivoted on a pin 446 carried by bracket 442 is a latch 447 similar in construction to lever 444. Latch 447 has a forwardly and upwardly projecting lug 447a designed to slip under the rear end of lever 444 when the key SK is depressed and hold contacts SK1, SK2 closed and for the purpose of holding latch 447 in latching position a spring 448 is anchored to the lower end of latch 447 and to a pin 449 carried by the arms of bracket 442. Latch 447 is released by a magnet SKM mounted on a bracket 450 secured to the base plate 435.

The stop key SPK operates two contact assemblies of conventional form designated EKC and SPC. The lower contact member of contacts EKC underlies the flanged part of the hub 440 for the stop key SPK and has a pin 551 engaging the top contact member of contacts SPC whereby depression of key SPK will cause contacts EKC to open and SPC to close.

The secondary run-out key SRK in the same way operates the contacts SRC so as to close them whenever the secondary run-out key is depressed. The primary run-out key operates the contacts PRC1, PRC2 by moving the central common contact member of an assembly comprising three contact members in a direction to close one pair of contacts PRC1 and open the other pair PRC2. The contacts PRC1 appear in Fig. 17b and PRC2 in Fig. 17a as if they were separate and independent contacts operated by PRK. This has been done in order to simplify the wiring diagram.

It is necessary that keys SRK, PRK be locked in depressed position for certain types of operation. For this purpose there is provided a slide 452 (Figs. 19 and 20) for each key. These slides have a slot of slightly greater width than the thickness of the key stems 439 and at the front end of the slides the slots terminate in circular openings slightly larger than the smaller diameters of collars 440. The rear ends of the slides 452 are supported and guided by a headed stud 453 riveted to the key guide 437 with a spacing washer 454 between the slide and the key guide. The front ends of the slides 452 are guided by slots in the key guide 437. By pulling forward the slides, while holding the keys SRK, PRK depressed, the large opening is drawn forward to the position shown in dotted lines in Fig. 19 out of registry with hubs 440 thereby holding the keys in depressed position, as is the case of key SRK shown in Fig. 20.

An error lamp EL assembly is mounted on the skirt of key guide 437 with the light bulb behind a bull's-eye 455 in the skirt of key guide 437 and located between the keys SRK and SPK. The lamp assembly may take any suitable form but preferably follows the design of telephone switchboard lamps.

A suitable cover 456 is provided and is designed to fit close to the edges of an opening formed in the front cover 111. The caps of keys SRK, PRK, SK are protected against accidental depression by hoods 457 secured to the cover 456. These hoods allow one finger to be inserted to depress a key but prevent accidental depression by clothing catching on the keys or accidental depression in some other way as by a person leaning on or carelessly placing a hand on the machine.

XVI. OPERATION OF MACHINE UNDER VARIOUS CONDITIONS

Figs. 18a and 18b when laid side by side comprise a chart showing how the switches are set for different types of operation and the operating conditions in respect to the arrangement, number, relation, and disposition of the cards in the pockets. An example of the application of the operation to accounting practice is also shown. It will be understood that the number of operations shown in Figs. 18a and 18b and the uses to which they are put in practice are purely illustrative of the flexibility of the machine and the variety of purposes for which it may be used in record filing operation and in preliminarily arranging cards for subsequent preparation of reports or statements by means of tabulating machines. Each of the operations will be briefly described with reference to the wiring diagram.

OPERATION No. 1

This is an illustration of how the machine may be used to mechanically perform a simple filing operation in which it is desired to place in a main file in their proper places, variable numbers of newly punched cards which are related to cards in the files, the number of which may vary for each control number. By "control number" is meant the serial number, classification number, or code number punched in the cards which is used to control the machine. This control number need not be punched in one field of the cards but can be a composite number recorded in scattered columns. As an example, in control by classification numbers, the control number may consist of several classifications recorded in separated columns. Thus the control number 6849 might consist of a main classification number 68 recorded in, say columns 8 and 9 and a sub-classification number 49 recorded in columns 11 and 12. The only condition to be satisfied is that the respective denominational orders of the numbers must always be recorded in corresponding columns of all the cards to be compared on the basis of the control numbers. It will be assumed hereinafter that the control numbers will not exceed four digits, which, of course, must always appear in corresponding columns of all the cards.

In operation No. 1, the cards will be understood to represent articles of stock arranged in numerical sequence in accordance with a code number designating the kind of goods, with each unit of stock, say a case of canned corn, for example, designated by a single card. The problem is to place in the file of cards representing items in stock, the newly punched cards representing additions to stock arising from receipt at the warehouse of fresh stock from a manufacturer.

The cards representing stock on hand are placed in primary hopper PH face down with the 9's at the left, while the cards representing additions to stock are similarly placed in the secondary hopper SH. In describing operation No. 1 and others hereinafter, the cards will be merely designated primary and secondary cards according to the hopper in which they are placed in order to avoid cumbersome repetition of the names they may have in the application named in the chart.

The switches are set as shown in the chart (Fig. 18b) and the comparing magnets PM1, SM2, PM2, SM1 are plugged to the four card brushes PB1, PB2, SB1, respectively, which sense the control number by means of three sets of four plug wires like PW1, PW2, PW3. Since it is desired to place together all the cards designated with the same control number, pocket SP is not used, consequently lever 309 (Fig. 2) is moved to the left if not already in that position so that the secondary cards must pass to either the merged sets pocket MS or the secondary reject pocket SR. As shown by the chart (Fig. 18b) switches 2, 3, 5, 8, 10, 12, and 17 are closed while all others remain open. The open positions of switches S13, S14 are the "off" positions shown in Figs. 17a, 17c. The main drive motor is started, causing commutators C1 to C6 to rotate and the bails 383, 384 of the primary comparing unit to oscillate back and forth continually.

Before placing cards in the hoppers, it is advisable to depress the start key SK and both run-out keys SRK, PRK to allow commutator C2 to send impulses of current through magnets PR, SR, holding these keys down for at least one machine cycle. This is to ensure that all control numbers left from previous use of the machine will be erased from the comparing units. The circuits for magnets PR and SR extend as follows: Line wire W1, commutator C2, contacts SK2, through contacts SRC and magnet SR, to line wire W2, and also through contacts PRC1, switch S17 or contacts R28a, and magnet PR to line wire W2, respectively. Magnet CR received an impulse through contacts R11a. Thus all numbers will be erased from both comparing units since the bail 384 for the primary unit is always free to oscillate and cards may now be placed in the hoppers.

The machine is now in condition to start feeding the cards for operation No. 1 and is operating idly with commutators C1 to C6 turning, bails 383, 384 of the primary unit oscillating back and forth periodically to move sectors 373, 374 of this unit to zero positions. The bails 383, 384 of the secondary unit are held in zero position as this unit was reset, consequently the group of relays R6, R7, R8 will be periodically energized once per revolution of the commutator C1, whereby the contacts of these relays, designated R6a, R7a, and R8a, will close once each cycle of shaft 136 and commutators C1 to C6. The switching assembly of the primary unit will take an equal setting periodically because the sectors 373, 374 of the primary comparing unit are free to repeatedly move to a zero position. The circuits for this group of relays are easily traced from line wire W1, commutator C1, the contact plates 416 and blades 421 of the secondary comparing unit, and the group of relays R6, R7, R8, to line wire W2. It is evident that contacts R7a, R8a will close each cycle while the machine is idling but have no effect as start key contacts SK2 are open.

The feeding of cards is started by depressing the start key SK thereby closing contacts SK2 and energizing primary feed magnet PFM by a circuit as follows: Line wire W1, commutator C2, contacts SK2, R8a, switch S3, contacts R12a, and magnets PR, PFM in parallel, to line wire W2. Magnet PR has no useful effect as the secondary comparing unit has already been reset and bail 384 is merely released to oscillate sectors 314 of this unit from zero position and back to zero position. Magnet PFM starts the feeding of primary cards to advance the first primary or file card from the primary hopper PH. During this first card feeding cycle, card lever contacts PCL, PCL3 are opened and the primary card feeding mechanism will stop unless the start key SK is held down by hand. This is due to the fact that contacts PCL, SCL are still closed whereby the closure of contacts SK1 in starting the feeding of cards prevents latching the start key contacts in closed position by energizing magnet SKM over a circuit as follows: Line wire W1, commutator C4, contacts PCL, SCL, in parallel, SK1, and magnet SKM, to line wire W2. The first primary card will be fed from the hopper PH to the position shown in Fig. 15 by the short straight line tangent to the circles representing the first primary feed rollers 176, 177 and second feed rollers 184, 197. It is necessary to hold the start key SK depressed manually until card lever contacts SCL are opened by the first secondary card before the machine will operate automatically, since magnet SKM will be energized once each cycle to unlatch contacts SK1, SK2 as long as one or both of the contacts PCL, SCL remain closed.

The first primary card is fed past the brushes PB1 during the second card feeding cycle thereby opening card lever contacts PCL and closing card lever contacts PCL1. Since card lever contacts PCL2 are still open, the control number from the first primary card is not entered in the primary comparing unit during this cycle.

Contacts PCL2 are closed early in the third card feeding cycle thereby causing entry of the control numbers from the first two primary cards in the comparing units by circuits as follows: Wire W1, commutator C6, contacts PCL2, PCL1, impulse distributors PID1, brush PCB1, contact roller PCR1, brushes PB1, plug wires PW1, and magnets PM1, to line wire W2; wire W1, commutator C6, contacts PCL2, impulse distributors PID2, brushes PCB2, contact roller PCR2, plug wires PW2, and magnets PM2, SM2 in parallel, to line wire W2. Thus the control numbers on the first two primary cards are entered in the secondary and primary comparing units by energizing magnets PM1, PM2, SM2. The bail 383 of the secondary unit remains immovable during the third cycle with sectors 374 of this unit in zero position. It will be assumed that the first two primary cards are in proper sequence, that is, the first is equal to the second. Thus a low secondary card condition is created in the secondary unit and an equal condition is created in the primary unit.

Relay R10 and magnet SRM are energized as a result of the conditions created in the comparing units during the third cycle. Contacts R10a close and energize magnets SR, SFM starting the feeding of secondary cards while the equal condition in the primary unit has no effect, switch S11 being open. The control number from the first primary card is retained in the secondary unit, magnet PR not being energized while the control numbers from the first two primary cards are erased by operation of bails 383, 384 of the primary unit. Contacts R4a, R8a remain open to prevent energization of magnets PR, PFM, also the feeding of primary cards. Magnet CR is energized during the third cycle to cause the erasing of the control number from the second primary card from the primary unit. During the following card feeding cycle the equal primary and low secondary conditions will be retained in the primary and secondary units respectively.

The first secondary card is fed during the fourth cycle to a position to open card lever contacts SCL. This prevents magnet SKM from unlatching contacts SK1, SK2 so that key SK may be released and the machine will now run automatically, beginning with the fifth cycle, until the cards become exhausted or the machine is stopped either by hand operation of key SPK or by the error control to be described hereinafter. Since the first secondary card has not yet passed brushes SB and contacts SCL1 are still open, the conditions in the comparing units remain as in the third cycle and the same circuits are established to continue the feeding of secondary cards for the fifth cycle and prevent feeding of primary cards. The machine is now in condition to commence comparing primary cards with secondary cards and dispose of them according to the relationships between the control numbers. It will be assumed that the control numbers on the first few primary and secondary cards are as follows:

Table I

| Pri. card | Control No. | Secondary card No. | Control No. |
|---|---|---|---|
| 1 | 6 | 1 | 6 |
| 2 | 6 | 2 | 6 |
| 3 | 6 | 3 | 9 |
| 4 | 8 | 4 | 11 |
| 5 | 8 | 5 | 12 |
| 6 | 10 | | |
| 7 | 11 | | |
| 8 | 7 | | |
| 9 | 11 | | |
| 10 | 12 | | |

There are nine possible combinations of relationships between a secondary card and a primary card and between a pair of primary cards. These combinations are set forth in the following table:

Table II

| Combination | Primary unit | Secondary unit |
|---|---|---|
| 1 | Low 1st pri. card | High secondary card. |
| 2 | High 1st pri. card | Do. |
| 3 | Pri. cards equal | Do. |
| 4 | Low 1st. pri. card | Equal to pri. card. |
| 5 | High 1st pri. card | Do. |
| 6 | Pri. cards equal | Do. |
| 7 | Low 1st pri. card | Low secondary card. |
| 8 | High 1st pri. card | Do. |
| 9 | Pri. cards equal | Do. |

Beginning with the fifth cycle, the operation of the machine under control of the specimen sets of cards shown in Table I will be explained in detail to make clear how the machine disposes of the specimen cards as the various combinations of Table II occur.

The sectors 373, 374 of the primary unit have been reset to zero while the sectors 373 of the secondary unit also have been set to zero and sectors 374 of the latter unit still retain the control number from the first primary card, now held in the eject position by feed rollers 206, 207, when the fifth card feeding cycle commences. In other words, the combination No. 9 of Table II has been established in the comparing units.

The first secondary card is fed past brushes SB during the fifth cycle, first closing contacts SCL1 permitting its control number to be entered in the secondary unit during this cycle by circuits as follows: Line wire W1, commutator C6, contacts SCL1, impulse distributor S1D, brush SCB, contact roller SCR, brushes SB, plug wires PW3, and magnets SM1, to line wire W2. Since the control numbers of the first secondary card and both of the first two primary cards are the same, an equal condition will be created in the secondary unit while the primary unit will remain in equal condition which is combination No. 6 in Table II.

The relays R6, R7, R8 are thereby energized during the fifth cycle. Contacts R6a permit energization of magnet EM to cause the first primary card to be ejected during the sixth card feeding cycle. Contacts R8a close to energize magnets PR, PFM to continue feeding of primary cards. Magnets SR, SFM cannot be reenergized during the fifth cycle since contacts SRC, R10a, R13a, R29a and switch S4 are open.

The control numbers on the second and third primary cards are compared during the sixth cycle and the control number from the first secondary card is compared with the control number of the second primary card. The first primary card is ejected and will eventually reach pocket MS. Since the first three primary cards and first two secondary cards all have the same control number, combination No. 6 is again present causing the same circuits to be established at the end of the sixth cycle as in the fifth cycle to continue the feeding of primary cards for the seventh cycle and prevent feeding of secondary cards. Magnet EM is of course energized to cause ejection of the second primary card during the seventh cycle.

The third and fourth primary cards are compared during the seventh cycle and the third primary card is compared with the first secondary card, still held in the eject position with its control number retained in the secondary unit. The combination No. 4 of Table II is now present, causing relays R6, R7, R8, R11, R12, R13, R28 to become energized near the end of the seventh cycle.

Contacts R6a cause energization of magnet EM which results in ejection of the third primary card and its ultimate conveyance to pocket MS. Contacts R13a cause magnets SR, SFM to become energized during the seventh cycle to restart feeding of secondary cards and cause resetting of sectors 373 of the secondary unit thereby erasing the control number of the first secondary card from the secondary unit. Contacts R12a open and prevent energization of magnets PR, PFM notwithstanding the closure of contacts R8a. Contacts R11a open and prevent energization of magnet CR during the seventh cycle. Thus the sectors 374 of the secondary unit and sectors 373 of the primary unit will retain the control numbers from the third and fourth primary cards, respectively, through most of the eighth card cycle. Due to energization of magnets SFM and EM, the third primary card and first secondary card will be ejected during the eighth cycle and eventually will drop into pocket MS with the first secondary card on top of the third primary card. These two cards travel to pocket MS together in superposed relation.

The second secondary card is sensed during the eighth cycle and its control number compared with the control number of the third primary card while the latter is in process of ejection. Since sectors 374 of the primary unit now are in zero position while sectors 373 of this unit still retain the control number from the fourth primary card, combination No. 4 will again be present and the eighth cycle will be a repetition of the seventh cycle except that no primary card is now in position to be ejected. The second secondary card is brought to eject position and will be ejected during the ninth cycle.

During the ninth cycle the control number of the third secondary card will be compared with the control number of the third primary card which is still being retained by sectors 374 of secondary unit. Since the primary card feeding mechanism is still stopped, the condition of the primary comparing unit will remain unchanged. The third secondary card is higher in value than the third primary card (see Table I) whereby a high secondary condition will be created in the secondary unit producing the combination No. 1. As a result, relays R2, R3, R4, R5 will be energized. However, relays R11, R12, R13, R28 will not be energized because relay contacts R3a open and prevent energization of the relays R11, R12, etc. Contacts R5a cause energization of eject magnet EM but this will have no effect as there is no primary card in position to be ejected. Thus magnet CR will be energized to cause the erasure of the control number from the fourth primary card from the primary unit restoring this unit to equal condition. Contacts R4a will cause energization of the magnets PR and PFM to restart the feeding of primary cards and to erase the control number of the third primary card from the sectors 374 of the secondary comparing unit. The energization of relay R2, by opening contacts R2a, will prevent energization of magnets SR and SFM thereby stopping the feeding of the secondary cards and preventing the erasure of the control number of the third secondary card from the secondary unit.

The fourth primary card is compared with the fifth primary card during the tenth cycle of the control number from the fourth primary card is compared with the control card from the third secondary card. Since the fourth and fifth primary cards have the same control numbers an equal condition is created in the primary unit while a high secondary condition is created in the secondary unit thus setting up the combination No. 3 of Table II.

Relays R2, R3, R4, R5 are energized but relays R16, R17 are not energized owing to switch S11 being open. Contacts R5a cause energization of eject magnet EM whereby the fourth primary card will be ejected during the eleventh card cycle. Closure of contacts R4a will cause the magnets PR and PFM to be energized during the tenth cycle to continue the feeding of primary cards for the eleventh cycle. Magnet CR also will be energized whereby the control number of the fifth primary card will be erased from sectors 373 of the primary comparing unit during the early part of the eleventh card cycle.

The fifth primary card will be compared with the sixth primary card during the eleventh cycle and the control number of the fifth primary card will be compared with the control number of the third secondary card which is still being retained by sectors 373 of the secondary unit. This creates the combination 1 in the comparing units during the eleventh cycle thereby energizing relays R2, R3, R4, R5 which prevents energization of the relays R11, R12, R13, R28 by the opening of contacts R3a. Magnet EM is energized to cause the ejection of the fifth primary card during the twelfth cycle and magnets PR, PFM and CR are again energized to continue the feeding of the primary card and erase the control number of the sixth primary card from the sector 373 of the primary comparing unit.

During the twelfth cycle, the control number on the third secondary card is compared with the control number on the sixth primary card and the latter is also compared with the seventh primary card. This results in combination No. 7 being present energizing relay R10 and magnet SRM and also energizing relays R11, R12, R13, R28. Contacts R4a and R8a now being open, magnets PR, PFM cannot be energized during the twelfth cycle and the feeding of primary cards will stop and the number from the sixth primary card will be retained in the sectors 374 of the secondary unit. Contacts R11a will open and prevent energization of magnet CR thereby preventing the erasure of the control number on the seventh primary card from the sector 374 of the primary comparing unit. Contacts R13a close and cause energization of magnets SR and SFM. The feeding of secondary cards is thus restarted and the control number from the third secondary card is erased from the secondary unit. During the thirteenth cycle, the third secondary card will be ejected but due to energization of magnet SRM this card will ultimately be conveyed to the secondary reject pocket SRK instead of pocket MS.

At this point, it is desired to point out that the third secondary card should have matched with one of the primary cards and the fact that it did not do so indicates that there is probably either an error in punching this card or it is misplaced in the batch of secondary cards. By rejecting this card, it is set aside for investigation to determine why it did not match with any primary card.

Since magnet EM was not energized, the sixth primary card will be held at the eject position between rollers 206, 207 at the end of the twelfth cycle. The fourth secondary card is now fed past the brushes SCR during the thirteenth cycle and its control number is entered in the secondary comparing unit and compared with the control number from the sixth primary card which is still being retained by the sectors 374 of the secondary unit. Since the primary cards are not fed during this cycle, the low first card condition created during the twelfth cycle will be retained and, the control number from the fourth secondary card being higher than the control number from the sixth primary card, the combination No. 1 is present again. The consequent energization of relays R2, R3, R4, R5 will cause energization of magnets EM, PR, PFM and CR and the opening of contacts R3a will again prevent energization of relays R11, R12, R13, R28. The secondary feed mechanism now stops and the sixth primary card will be ejected during the fourteenth cycle. The primary feed mechanism restarts and, due to the energization of magnets CR and PR, all control numbers derived from primary cards will be erased from the comparing units, only the control number from the fourth secondary card being retained by the secondary unit. The fourth secondary card will be held in the eject position between feed rollers 208, 209.

The seventh primary card will be compared with the eighth primary card and also with the fourth secondary card during the fourteenth cycle. This creates the combination No. 5 of Table II and the high first primary condition indicates a reversal in the sequence of the primary cards. This reversal of sequence is usually caused by an error in filing the eighth primary card as this card, if correctly punched, should have been placed between the third and fourth primary cards. Relays R6, R7, R8, R18, and R19 are now energized and the error light EL, being in parallel with relay R18, also becomes illuminated to indicate an error of reversal in sequence of the primary cards. Contacts R18a close to cause energization of the magnet SKM which unlatches the start key contacts SK1, SK2. However, the commutator C4 which controls the energization of magnet SKM does not close its circuit until after the commutator C2 has closed the circuits for the various feed magnets, reject magnets and restoring magnets and so on (see Fig. 16). Thus the closure of contacts R6 during the fourteenth cycle permits energization of magnet EM to cause the ejection during the fifteenth cycle of the seventh primary card. Also an impulse of current is sent to magnets PR and PFM through the closure of contacts R8a to continue the feeding of primary cards for one more cycle and causing the erasure of the control number from the seventh primary card from the secondary comparing unit. Magnet CR also receives an impulse, since relay R11 was not energized, with the result that all control numbers derived from primary cards are erased from the comparing units during the fourteenth cycle. Contacts R10a, R13a being open, magnets SFM and SR will not be energized and the secondary feeding mechanism will not be restarted.

During the fifteenth cycle, the control numbers from the eighth and ninth primary cards will be compared but, due to the fact that contacts SK1, SK2 are now open, no more circuits can be established through the various feed magnets, restoring magnets, etc. with the result that the machine will come to a stop so far as card feeding is concerned with the error light EL illuminated. However, the control numbers from the eighth and ninth primary cards and the fourth secondary card will be retained in the comparing units whereby the machine will stop with the combination No. 1 present in the comparing units. The magnet EM will not be energized during the fifteenth cycle, hence the eighth primary card will be held in the eject position.

Relay R19, by closing its contacts R19a establishes a holding circuit for itself, relay R18, and the error light EL to line wire W1, through contacts EKC associated with the stop key SPK. If the start key SK is now depressed, the feeding of cards will be restarted but will stop at the end of one cycle unless the start key is held down by hand.

The eighth primary card must be removed for investigation of the reason for its presence and for this purpose may be set aside and the operation of the machine resumed immediately. The stop key SPK is now depressed to extinguish the error light and break the holding circuit for relays R18, R19. The start key is then depressed causing the machine to restart automatically for the sixteenth cycle and will remain in operation without further manual control as long as the hoppers contain cards. The closure of contacts SK2 permits circuits to be set up through the various feed magnets in accordance with the combination No. 1. Relays R2, R3, R4, R5 will be energized during the sixteenth cycle and the closure of the contacts of these relays will cause energization of magnets EM, PR, PFM, and CR thereby causing the ejection during the sixteenth cycle of the eighth primary card which will drop in the pocket MS and the primary feed mechanism is restarted. The control numbers derived from the primary eighth and ninth cards are erased from the comparing units by the energization of magnets PR and CR so that only the control number for the fourth secondary card is retained by the sectors 373 of the secondary comparing unit. The operator can easily observe when the eighth primary card drops in the pocket MS and can remove it by hand and set it aside for investigation.

During the seventeenth cycle the control numbers on the ninth and tenth primary cards are compared and the control number on the ninth primary card is also compared with the control number on the fourth primary card. This causes the combination No. 4 to be created. Relays R6, R7, R8 are energized as well as relays R11, R12, R13, and R28 and the operation of the machine will be the same as in the case of the seventh and eighth cycles. The primary feed mechanism will be stopped, the secondary feed mechanism restarted, and magnet EM will be energized, causing the fourth secondary card and the ninth primary card to be ejected in superposed relation during the eighteenth cycle.

The fifth secondary card is compared with the control number from the ninth primary card during the eighteenth cycle producing the combination No. 1 again. This causes relays R2, R3, R4, R5 to be energized. The secondary feed mechanism now stops and the primary feed mechanism is restarted, the fifth secondary card being held in the eject position and its control number retained in the secondary unit.

The machine will continue to operate in the same general fashion as has been explained above by means of two specimen sets of cards until ultimately one or both of the hoppers become exhausted of cards.

It will be noted that all of the combinations shown in Table II have not been treated in the above description, combinations No. 2 and No. 8 not having occurred. The combinations numbered 2, 5, and 8 are similar in that they cause the feeding of cards to stop as the result of a change in the sequence of the primary cards. The combination No. 5 was discussed above in connection with the fourteenth cycle in which the machine was being conditioned to stop during the fifteenth cycle due to the reversal of sequence caused by the seventh and eighth primary cards. Combinations No. 2 and No. 8 are merely variants of combination No. 5. Had the fourth secondary card been numbered 12 instead of 11, combination No. 2 would have been created during the fourteenth cycle. This causes energization of relays R2, R3, R4, and R5 instead of relays R6, R7, R8. Contacts R6a causes magnet EM to be energized as in the fourteenth cycle to effect the ejection of the eighth primary card, while relay contacts R4a instead of contacts R8a causes energization of the magnets PR and PFM to feed the primary cards. In effect, therefore, the operation of the machine would be exactly the same, relay R4 performing the same function as relay R8 performed in the fourteenth cycle above. The secondary cards as before will not be fed during the fifteenth cycle.

The combination No. 8 would be present if the fourth secondary card had been numbered 9 instead of 11. Assuming for convenience that there was no previous secondary card numbered 9, the relays R18, R19 and the error light EL will be energized as before during the fourteenth cycle but in this case relay R10 and magnet SRM will be energized. The relay R10, by closing its contacts R10a, will start the feeding of secondary cards to cause the ejection of the fourth secondary card during the fifteenth cycle and the primary feed mechanism will remain stopped.

Magnet EM will not be energized during the fourteenth cycle whereby the eighth primary card will be held in eject position. The primary unit will be reset, restoring it to equal condition, due to energization of magnet CR and the invariable operation of bail 384 of this unit.

The fifth secondary card will be compared with the seventh primary card during the fifteenth cycle, the control number for this card being retained by sectors 374 of the secondary unit. Since the primary comparing unit was reset and no primary cards can be fed during the fifteenth cycle, the primary unit is in equal condition while the secondary unit is now in high secondary condition. Thus the machine will stop with combination No. 3 present.

During the first part of the sixteenth cycle, relays R2, R3, R4, R5 are energized while relays R16, R17 are not energized with the result that the machine will operate as in the case of the tenth cycle in comparing the fourth and fifth primary cards and the third secondary card. The principal difference between the tenth cycle operation and the sixteenth cycle operation following the creating of the combination 8, is that in the first case the primary cards are fed and identical numbers compared whereas in the latter case zeros are compared with the feeding of primary cards stopped.

It will be seen that under any condition in which there is a reversal of sequence, even when this condition may be coupled with an error condition in the secondary side, the machine functions properly to stop the machine and in cases where there is a second error on the secondary side, the erroneous secondary card is rejected. Thus, the machine detects not only errors due to previous manual filing of cards but also detects errors in punching the cards to be filed or in arranging them in numerical order. The machine, therefore, is practically independent of the human element and in fact shows up errors due to the human element.

Contacts FPC close when any pocket becomes full and energize magnet SKM which unlatches contacts SK1, SK2 to stop card feeding by opening contacts SK2. Removal of the cards from the full pocket, opens contacts FPC and the machine may be restarted by depressing key SK to reclose contacts SK1, SK2. The same thing happens when the stop key SPK is depressed to close contacts SPC.

When the last card has been fed from either the primary or secondary hopper, card lever contacts PCL or SCL close and have the same effect in stopping the machine as the contacts FPC and SPC. Assuming the secondary hopper is exhausted first, the last secondary card will be carried past brushes SB to the eject rollers 208, 209 before card feeding is stopped. The control number of the last secondary card will be compared with a primary card during this cycle and the machine will be conditioned to dispose of the last secondary card and/or the primary cards in accordance with one of the combinations of Table II when card feeding operations are resumed. However, the feeding of cards will stop at the end of this cycle since card lever contacts SCL close to energize magnet SKM before commutator C2 can close a circuit through any of the feed magnets, restoring magnets, etc. This causes the last secondary card to be held in eject position.

Cards are now placed in the secondary hopper and the machine is restarted by depressing the start key SK. This key must be held down by hand until the card lever contacts SCL open. The number of cycles required to get contacts SCL opened will depend on the combination previously created in the machine. If one of the combinations is present which normally would cause feeding of primary cards, the magnets PR, PFM will be energized immediately and feeding of primary cards will continue until a combination is created which results in energization of magnets SR, SFM. On the other hand, if a combination involving a low secondary card condition is present, the secondary cards will start feeding as soon as key SK is depressed. Since it requires two cycles of operation of the secondary feed mechanism to bring a secondary card to the eject position, there will be an additional gap equal to one card between the secondary card held in eject position and the first card fed from the hopper. This gap has the effect, during the cycle preceding the one in which the contacts SCL are reopened in restarting the machine, of a low secondary card. This is due to the fact that card lever contacts SCL1 remain open while this gap is, figuratively speaking, passing brushes SB, whereby sectors 373 of the secondary unit take zero settings. The gap between cards thus causes the machine to operate as in the case of the twelfth cycle wherein the third secondary card and the sixth and seventh primary cards were compared, at least as far as the feeding of secondary cards is concerned. As the contacts SCL open during the cycle in which the gap passes brushes SB, the start key SK may be released.

In the case where the primary hopper becomes exhausted, the last primary card will be carried to eject position between feed rollers 206, 207. During the cycle in which this occurs, due to opening of the card lever contacts PCL1, sectors 373 of the primary unit take zero settings while sectors 374 are set according to the control number from the last primary card. The high first primary condition thereby created in the primary unit causes the error light EL and relays R18, R19 to become energized. Magnet SKM is energized by closure of card lever contacts PCL1 before contacts R18a can close. This prevents the extra primary card feeding cycle usually occurring after a reversal in sequence of primary cards so that the last primary card is held in eject position. The secondary unit will retain the control numbers of the last primary card and the secondary card in eject position but the primary unit will be cleared of control numbers since magnet CR is not dependent on the contacts SK2 and will receive an impulse while the machine is idling.

The stop key SPK is depressed to extinguish the error light EL and break the circuit for relays R18, R19, primary cards are placed in hopper PH, and key SK is held down until the machine has operated long enough to close contacts PCL1. Since it requires three cycles to bring a primary card from the hopper to eject position, two card gaps will be present between the last primary card, now in eject position, and the first primary card from the hopper. As in the case of the secondary cards, several cycles may be required to restart feeding of primary cards. If the feeding of cards stopped with the secondary unit in high secondary or equal condition, feeding of primary cards will be resumed immediately by energization of relay R4 or relay R8, respectively. On the other hand, a low secondary condition, by energization of relay R10 and magnet SRM, will cause one or more secondary cards to be fed and rejected until a high secondary or equal condition in the secondary unit restarts the feeding of primary cards.

As a result of the high secondary or equal conditions, magnets EM, PR, PFM will be simultaneously energized whereby the last primary card will be ejected by feed rollers 206, 207 in unison with the ejection from the hopper of the first of the new batch of primary cards. Since card lever contacts PCL, PCL1, PCL2 are open, the machine will operate for two cycles with the primary unit in equal condition and during the first of these cycles, the control number of the last primary card will be erased from the secondary unit creating a high secondary condition which will ensure re-energization of magnet PFM to continue the feeding of primary cards. During the second of these two cycles, card lever contacts PCLI close to permit release of key SK. A third cycle now takes place in which both card lever contacts PCLI, PCL2 are closed and the first two primary cards of the new batch and the secondary card, now held at the eject position, are compared. The machine now continues to operate automatically.

Eventually the last card to be filed or the last card of the file will be brought to eject position and the feeding of cards will stop. If the primary hopper is exhausted first, it means that the remaining secondary cards will in any case follow in numerical sequence the last primary card held in eject position. Both run-out keys PRK, SRK and the start key SK may be held depressed until all the cards in course of feed have dropped into pocket MS. If both hoppers are exhausted together or the secondary hopper is exhausted first the cards are removed from pocket MS then the run-out keys and start key are held depressed until the cards remaining in the machine drop in pocket MS. These cards are arranged by hand and added to the cards previously removed from pocket MS.

Operation No. 2

This operation consists in removing single cards from files in which there are groups comprising two or more cards interspersed with single cards. In stock control systems a balance card is sometimes made out to show the total number of items in stock and, as articles of stock are issued from time to time, item cards for the issued stock are made out. The file will receive these item cards as time goes on. Eventually it is desired to prepare a statement to show how much stock remains of those articles that are in demand and perhaps another statement to show which are the inactive articles with a view to eliminating slow moving merchandise. The balance cards in this case, when unaccompanied by an item card, represent inactive stock, while the groups comprising balance cards accompanied by item cards represent active stock. The balance cards usually are placed first because it is desired from an accounting standpoint to print the balance at the top of the statement sheet or on the first line of a group of entries on the statement sheet. The object is to remove the balance cards which are not accompanied by item cards. These are two cases to be considered, one where the balance cards are provided with an "11," or so called "X" hole, to distinguish them from the item cards, and the other where only the control number is punched.

Referring to Fig. 18b, it will be seen only switch 12 is closed for the case where "X" holes are the distinguishing means. It will be assumed that this hole appears in column 20 of the cards. A plug wire PWI in Fig. 9 is inserted in the PCB hole 352 instead of in one of the holes for magnets PMI while a plug wire PW2 is similarly placed in the PB hole instead of in one of the holes 352 for magnets SMI but no other plug wires are inserted. The primary run-out key PRK is latched down by hand and the start key SK depressed after placing the cards in the primary hopper. The secondary hopper is not used for this type of operation.

The contacts PRCI, PRC2 being closed, magnets EM and PFM will be energized invariably every machine cycle. This means the cards will feed continuously once the primary card lever contacts PCL open, key SK being held down until this happens.

When the first balance card passes under brush PBI for column 20, the relays R22, R23 are not energized as card lever contacts PCL2 are still open. During the next card feeding cycle, when the first card passes brushes PB2, these contacts close and relays R22, R23 are energized by a circuit as follows: Line wire WI, commutator C6, contacts PCL2, impulse distributors PID2, brush PCB2, contact roller PCR2, brush PB2 for column 20, plug wire PW2, commutator PCI, and relays R22, R23 to line wire W2. Relay R23, through contacts R23a, establishes a holding circuit for itself and relay R22 through commutator PC3.

Now, if the second primary card is also a balance card, relays R24, R25 also will be energized over a similar circuit through brush PBI for column 20 and plug wire PWI, and a similar holding through circuit to commutator PC3 will be established through contacts R24a. Thus contacts R22a, R25a will close together and energize primary reject magnet PRM. This causes the rejection to pocket PRJ of the first primary card, magnet EM being energized through contacts PRC2.

If, on the other hand, a detail card follows the first primary card, the relays R24, R25 will not be energized and the first primary card will not be rejected but will be conveyed to pocket MS, only magnets PFM. EM being energized this time. This same condition prevails when a detail card is followed by another detail card or another balance card.

In case the balance cards and detail cards do not have "X" holes but are only designated by the control numbers, each balance card and each group comprising a balance card and one or more detail cards having a different control number, the primary comparing unit is used. This unit is plugged by means of plug wires PWI, PW2 as in operation No. 1 to compare the control numbers on two successive cards. The primary run-out key is latched down to cause magnets EM, PFM, PR to be energized every machine cycle. As relay RII will remain deenergized, switch S5 being open (Fig. 18b) magnet CR will be energized every machine cycle through contacts 11a of this relay. The sectors 373, 374 of the primary unit will thereby be restored every machine cycle and primary cards will feed continuously.

Every balance card which precedes another balance card will have a lower control number than the following primary card so that the primary unit will take a low first card setting. This causes energization of relay RI4 which closes its contacts RI4a to energize the primary reject magnet PRM through normally closed contacts R20a. Thus the first primary card is rejected. A balance card which is followed by a related detail card or a detail card followed by another detail card, all of which will belong to the same group, will cause the primary unit to take an equal position energizing relays RI6, RI7.

In order to explain the effect of an equal setting upon the subsequent distribution of cards, it will be assumed that a pair of cards having identical control numbers is compared during the fifth cycle of operation and that these cards are followed by a third card having a higher control number. The primary comparing unit will take an equal setting, thereby energizing relays R16 and R17, during the fifth cycle. Relay R17 closes its contacts R17a to establish a holding circuit for itself and relay R16 through the commutator C5. The contacts R16a close and energize relays R20, R21. The energization of relays R16, R17, R20, and R21 and the establishment of the holding circuit for the relay R17 takes place at the very end of the fifth cycle. During this cycle the first of the two equal cards to be fed to the eject position while the second of the two equal cards and the third card are brought to the brushes PB2, PB1, respectively, in readiness for analysis during the sixth cycle.

Commutator C5, as will be seen by reference to Fig. 16, will hold the circuit for relays R16, R17, R20, and R21 up to and slightly beyond the "7" index point position of the sixth cycle. However, during the early part of the sixth cycle, before the second of the two equal cards and the third higher numbered card has been sensed and the control numbers therein entered in a primary unit, commutator C6 will establish a holding circuit for relays R20, R21 through the commutator C6. Thus, relays R20 and R21 are kept energized during the sixth cycle notwithstanding the fact that the sectors 373, 374 primary comparing unit are now taking a new setting which, of course, will result in a low first card condition and notwithstanding the fact that commutator C5 breaks the circuit for relays R16, R17.

During the sixth cycle, the second card is brought up to the eject position and the third card is brought up to a position to pass the brushes PB2 during the seventh cycle. Relay R14 is energized but relay R20, by opening its contacts R20a, prevents the closure of contacts R14a from establishing a circuit through the primary eject magnet PRM, thereby preventing the rejection of the second equal card which will be ejected and eventually drops in the pocket MS. It will be noted by reference to Fig. 16 that commutator C6 will hold relay R28 energized until after commutator C1 has broken the circuit. C1 breaks at about 243° whereas the commutator C6 holds to 252° of a machine cycle which is after the feeding of cards has been continued for the seventh cycle. In other words, relay R20, by the cooperation of commutators C5 and C6 is kept energized from the last part of the fifth cycle, in which the two equal cards were compared, until the first part of the seventh cycle. Thus it will be seen that the last card of a group will not be rejected but will be conveyed to the pocket MS.

When a balance card is not preceded by any detail card, but by a single balance card, the equal condition will not have been created in the primary unit nearer than two cycles to the one in which two successive balance cards are compared. Consequently relay R20 will not have been energized when this comparison takes place with the result that contacts R14a will close to energize magnet PRM and cause the first of the two balance cards to be rejected.

It will be seen that balance cards which are not accompanied by detail cards will always be rejected while the balance cards which are accompaned by detail cards and the accompanying detail cards wil be deposited in the pocket MS.

It may happen that a misplaced card is present or is incorrectly punched. This will invariably cause a high first card setting of the primary unit, which has already been discussed in the description of operation No. 1, with respect to the card preceding or following the erroneously punched or misfiled card and the feeding of cards will stop.

Operation No. 3

This operation consists in matching single primary cards corresponding with one or more secondary cards by bringing the related cards together in the merged sets pocket MS. Both batches of cards are in numerical order. This type of operation is generally similar to operation No. 1 but differs in that there may be present in the primary hopper cards for which there is no corresponding secondary card and vice versa. These odd cards must be rejected to the proper pockets PRJ or SRJ. Both comparing units may be used and are plugged as for operation No. 1.

The machine is started as in operation No. 1 by holding the key SK down until both card lever contacts SCL, PCL open to permit the feeding of cards to continue without further manual control. It is of course desirable to hold the keys PRK, SKR, and SK down for at least one cycle before placing cards in the machine in order to ensure that the sectors 373, 374 of the comparing units will be restored to zero before feeding of cards is commenced. Since switch S4 is closed and the secondary unit is in equal condition, secondary cards will commence to feed as soon as key SK is depressed, the circuit for magnet SFM and SR being closed by contacts R7a. Since switch S3 is open for this operation, secondary cards will feed for two cycles before the primary cards commence to feed, opening contacts SCL during the first and closing contacts SCL1 during the second of these cycles. This results in entering the control number from the first secondary card in the secondary unit during the second cycle.

During the second card feeding cycle the control number from the first secondary card will be compared with the zero settings of sectors 374 of the secondary unit causing the combination No. 3 of Table II, the primary unit remaining in equal condition due to the fact that its sectors are still in zero position. The high secondary condition in the secondary unit energizes relays R2 to R5 and magnet PRM. Magnet PRM has no effect as there is no primary card in position to be rejected. Contacts R5a also permit energization of magnet EM but this likewise has no effect for the same reason. Contacts R4a close a circuit for the magnets PR and PFM thereby starting the feeding of primary cards. The secondary feed mechanism stops. The feeding of primary cards will continue for two cycles to open contacts PCL and close contacts PCL1 during the fourth cycle of operation and the machine will now continue to run automatically without further manual control. During this fourth cycle, since contacts PCL2 are still open, no control numbers will be entered in the primary unit and combination No. 3 will be retained in the comparing units with the result that the primary cards continue to feed for the fifth cycle.

During the fifth cycle the control numbers from the first two primary cards are entered in the comparing unit and compared, also the control number from the first primary card will be compared with the control number from the first secondary card which is now being held at eject position with its number retained in the secondary unit. From now on the machine will operate automatically substantially as for operation No. 1 but will be modified to some extent due to the fact that switch S3 is open and switch S4 closed.

If both the first primary card and first secondary card are equal, magnet EM is energized by closure of contacts R6a and magnets SR and SFM are energized by closure of contacts R7a. This causes the first primary and first secondary cards to be ejected together and the feeding of secondary cards to continue for another cycle. These cards eventually drop into pocket MS. Since the magnets PR and PFM are not energized, the primary feed mechanism will stop and the control number of the first primary card will be retained in the secondary unit for comparison for the second secondary card.

If the second secondary card belongs to a group comprising several secondary cards having the same control number as the first primary card, this operation is repeated until eventually a secondary card is fed which is higher than the first primary card, thereby creating a high secondary condition in the secondary unit. Relays R2 to R5 and magnet PRM will now be energized and the feeding of secondary cards will stop whereby magnet PRM again has no effect since there is no primary card in the eject position. Relay R4, through contacts R4a, now restarts the primary feed mechanism by energizing magnets PR and PFM with the result that the control number from the first primary card will be erased from the secondary comparing unit and the control number from the second primary card will be entered in the comparing unit.

If the second primary card belongs with the secondary card now being held in the eject position the equal condition again will be created which will cause both the second primary card and the second secondary card to be ejected. If the second primary card, on the other hand, does not belong with the secondary card now held at the eject position there are two conditions to be considered.

The secondary card may be lower in number than the primary card in which case the low secondary condition will cause relay R10 and magnet SRM to become energized to reject the secondary card, contacts R10a energizing magnets SR, SFM to restart feeding of secondary cards and the feeding of primary cards will stop.

On the other hand, the primary card may be lower than the secondary card, creating a high secondary condition. Since there is now a primary card in position to be rejected, the high secondary condition, by causing energization of relays R2 to R5 and magnet PRM will restart the feeding of primary cards and cause the primary card to be rejected because this primary card is an odd card and feeding of secondary cards will stop. Since there is only one primary card for each control number it is merely necessary, when the equal condition exists, to eject both the primary and secondary cards together and it is not necessary to stop the feeding of secondary cards until a new primary card has been sensed and its control number compared with the ejected secondary card. Virtually the only advantage in using the primary comparing unit for operation No. 3 is to detect a reversal in sequence of the primary cards because there will be invariably a change in sequence between each pair of primary cards compared. In other words, each time a pair of primary cards is compared, the low first primary condition should be created in the primary unit.

It may happen, however, that there may be present in the file of cards a pair of primary cards having the same control number. The first of these duplicate cards, as they may be termed for convenience in description, will be ejected to pocket MS or rejected to pocket PRJ, according to whether it is equal to or lower in respect to control number than the secondary card with which it is compared. The second of these duplicate primary cards invariably will be rejected due to the fact that it will always be compared with the next highest numbered secondary card creating the high secondary condition which results in energizing magnet PRM and relays R2 to R5. In other words, the second of the duplicate cards is held between the brushes PB1, PB2 until all cards having the same number as this primary card have been ejected or rejected and this card is then compared with a secondary card having a higher control number.

Summing up the foregoing description: When an equal condition prevails in the secondary unit both the secondary and the primary cards are ejected together and subsequent secondary cards will also be ejected since the equal condition is maintained notwithstanding the ejection of the primary card until a change occurs in the control numbers of the secondary cards. Whenever there is an odd secondary card, that is, one that will not match with any primary card this card will invariably set up the low secondary card condition which causes rejection of the odd secondary card and a continuation of feeding of the secondary cards. On the other hand, when an odd primary card occurs, it will be lower than the secondary card, thereby creating the high secondary card condition which, by causing energization of magnets PRM and EM, will effect the rejection of the odd primary card. In other words, only the primary and secondary cards which agree in control numbers will be deposited in pocket MS. If a reversal in sequence of the primary cards occurs, the error lamp EL will be illuminated and the machine will stop so far as feeding of cards is concerned.

Since virtually the only value the primary comparing unit has for operation No. 3 is to indicate a reversal of sequence, the machine may be run for operation No. 3 without using the primary comparing unit by opening switch S12. It is possible to perform operation No. 3 with the same set of switches as for operation No. 1 but a saving of time is effected by feeding the equal primary and secondary cards together without waiting to determine if there are further primary cards having the same control number. In operation No. 1, when the equal condition of a primary and a secondary card is first sensed by the secondary comparing unit, the secondary feed is stopped and the primary feed continues for another cycle to determine whether or not the next primary card has the same control number as the secondary card held in the eject position. This is necessary in operation No. 1 because there may be a plurality of primary cards having the same control number as one or more secondary cards.

OPERATION No. 4

This type of operation is almost identical with operation No. 1, both comparing units being used, but switch S2 is opened. This prevents rejecting secondary cards which must always be conveyed to pocket MS. As in operation No. 1, there may be secondary cards present for which there are no primary cards, and vice versa. In this case, any erroneously punched secondary cards will be deposited in pocket MS. This is unimportant where the secondary cards will always be carefully checked before filing them with the primary cards.

OPERATION No. 5

This operation is practically the same as operation No. 3 but there is only one secondary card or primary card for each control number and primary cards will not match secondary cards. In other words, each primary and secondary card will be followed by another card which has a higher control number. Under these conditions, the feed mechanisms operate alternately to deposit the cards in pocket MS in proper sequence. In cases where there should not be any equal cards, that is, matching primary and secondary cards, as in re-filing balance cards but through error there was a like punched card in each file, the matching primary card can be rejected by closing switch S7. This causes relay R9 to become energized every time an equal condition is created in the secondary unit. Contacts R9a close and the primary reject magnet PRM is energized along with magnets PR, SR, PFM, SFM, and EM, the latter group being energized by closure of contacts R6a, R7a, R8a. Thus the duplicate primary card is rejected.

With switches S3 and S4 closed, the equal cards are fed simultaneously, the secondary card eventually going to the pocket MS, the primary card going to the pocket PRJ.

OPERATION No. 6

This operation consists in refiling groups of cards, such as name and address cards, after they have been used for tabulating purposes. In using alphabetical cards, the name and address cards are filed separately from the detail cards. This file consists of groups of two or three cards, all the cards of each group being designated with the account number, with the name of the customer punched in the first card, his street address in the second, and the city and state in the third. There should be no matching cards in this case as there should be only one set of name and address cards for each account.

The file of cards is placed in the primary hopper while the cards to be filed are placed in the secondary hopper. As the settings of the switches are the same as for operation No. 1, except for the secondary reject switch S2, the operation will be substantially the same. It will differ in that there will never be any equal condition in the secondary unit and the feed mechanisms will alternate when a group of secondary cards is to be placed between two groups of primary cards. Since there will usually be more primary cards than secondary cards, the primary will frequently feed continuously a number of groups before the place for a group of secondary cards is reached.

It may happen that it is found desirable to keep duplicate or triplicate sets of address cards in some cases and only one may be withdrawn from the files. When these duplicate sets are refiled the machine will operate as in operation No. 1 to place the duplicate sets taken from the file behind the corresponding set or sets remaining in the file. If both sets of duplicated name and address cards are withdrawn, they will be treated like any two or three card group as the number of cards in a group is not important. In other words, two sets of duplicated name and address cards in the secondary hopper, each having three cards, will be treated as if they constituted a six card group.

OPERATION No. 7

This type of operation may be used to eliminate the manual operation of withdrawing the name and address cards from the name and address file and placing them with the proper detail cards as a preliminary to billing customers, preparing invoices, and so on. The detail cards, which may represent sales, returns for credit, and payments on account are placed in the secondary hopper and are in consecutive order by account number. There may be more than one detail card per account number. The file of name and address cards is placed in the primary hopper and obviously there should be a group of name and address cards for each group of detail cards. It may also happen that a group of detail cards represents a new customer for which no name and address cards have been prepared.

The machine will operate as in operation No. 1 except that, due to the fact that switches S1 and S2 are now closed, a group of detail cards representing a new account will be rejected by creating a high primary condition which causes energization of magnet SRM as was the case in operation No. 1 for erroneously punched secondary cards. With switch 1 closed, those primary cards that do not match detail cards will be rejected by the high secondary condition which was created by odd primary cards in operation No. 1.

Operation No. 7 may also be used to withdraw balance cards for billing purposes by placing them in the primary hopper.

OPERATION No. 8

In this type of operation the object is to remove from a file predetermined cards or groups of cards by means of another set of cards which are punched for the purpose of effecting a selection and are not to be merged with the cards which are to be withdrawn from the files. The hand lever 309 is moved to the right whereby all secondary cards will be conveyed to either pocket SRJ or pocket SP while primary cards will be conveyed to the pocket PRJ or pocket MS.

In one case a single selecting card is punched for each file card or group of cards to be withdrawn while in another case it may be necessary to use a plurality of selector cards to select a group of file cards.

Since the operation is purely selecting cards from a file, there should be no selector cards which do not correspond in respect to the control number of the file cards. The file cards are placed in the secondary hopper for both cases, while the selector cards are placed in the primary hopper.

The case where there is only one selector card for each file card cards to be selected will be described first. The switches are set exactly as for operation No. 5 except that switches S1 and S2 are closed to cause rejection of the unwanted secondary cards and any primary or selector cards that may have been made out in error or for some other reason do not match with any file card. Only the second comparing unit is used.

In this case, due to switches S3 and S4 being closed, feeding of both primary and secondary cards commences as soon as the start key SK is depressed. After two cycles of operation the secondary feed mechanism will be stopped due to the control number from the first secondary card creating a high secondary condition by comparison with the zero settings of sectors 374 of the secondary unit. During this second cycle, contacts PCL close to permit release of the start key SK. During the third cycle, the first primary card, which is a selector card, is compared with the first secondary card. If the selector cards have been properly prepared and are in proper sequence, low secondary conditions will be repeatedly created in the secondary unit, resulting in energization of magnet SRM and relay R10. Thus the unwanted secondary or file cards will be rejected to pocket SRJ and the feeding of secondary cards continued by closure of contacts R10a to energize magnets SR, SRM.

Eventually the primary card will match a file or secondary card and the equal condition thereby created in the secondary comparing unit causes relays R6, R7, R8 to close contacts R6a, R7a, R8a to energize magnets EM, SR, SFM, PR, PFM whereby the first selector card will be conveyed to the pocket MS, while the first file card will go to pocket SP. The next selector card will now be compared with the cards following the selected file card and the low secondary condition repeatedly created until a file card having the same number as the second selector card occurs again creating the equal condition which causes the file card to be deposited in pocket SP and the second selector card to be deposited in pocket MS.

If a selector card is fed for which there is no file card with the same number, eventually a high secondary condition will be created in the secondary unit energizing relays R2 to R5 and magnet PRM. This restarts the feeding of primary cards by the energization of magnets PR, PFM, stops the feeding of secondary cards, and by energization of magnet EM causes rejection of the selector card to pocket PRJ.

If it is necessary to remove a plurality of file cards by means of a single selector card and where a plurality of selector cards must be used to select a group of file cards, the switches are set as for operation No. 1, the primary comparing unit must be used and in addition switch S1 must be closed. The operation will be identical with operation No. 1 except that the selector cards which do not match with a secondary card will be deposited in pocket PRJ, the matching selector and file cards go to pockets MS and SP, respectively, while the unmatched file cards will be deposited in pocket SRJ.

OPERATION NO. 9

This operation consists in withdrawing from a file of cards all cards having a predetermined control number where the file of cards is not in numerical sequence with respect to the numbers in the field in which the control number appears. A special finder card is punched with the predetermined control number which will appear only in the cards to be selected. This finder card is placed in front of the first file card and the file cards are placed in the primary hopper. Only the secondary comparing unit is used, and tab cards are placed in the secondary hopper.

Brushes PB1 are plugged to magnets SM1 so that the control number on the finder card will be entered in the secondary comparing unit. Brushes PB2 are plugged to magnets SM2. Magnets PM2 will be energized along with magnets SM2 but this has no effect, useful or harmful, since the primary comparing unit is not in use.

The primary run-out key PRK is latched down to cause the primary cards to feed continually and the sectors 374 of the secondary unit are reset every cycle by energization of magnet CR. Only switches S4, S7, S10, S13, S14 are closed, the closed positions of the last two being the ones opposite those shown by solid lines in Figs. 17a, 17c.

The machine is started by depressing the start key SK thereby energizing the feed magnets SFM, PFM and the restoring magnets SR and PR, respectively. This starts the feeding of the file cards from the primary hopper and the tab cards from the secondary hopper. When the first primary card passes brushes PB1 during the second cycle, the control number punched in this card, which it will be recalled is the finder card, is entered in the secondary comparing unit by energizing magnets SM1 and the card lever contacts PCL3 are opened thereby preventing the restoring of sector 373 of the secondary comparing unit by opening the circuit for magnet SR.

Since the sectors 374 of the secondary unit are still in zero position, a high secondary condition is created in the secondary unit energizing relays R2 to R5. The deenergization of relay R7 stops the feeding of the tab cards at the end of the second cycle with the first one held in the eject position between feed rollers 208, 209. During the third cycle, the finder card passes brushes PB2 and its control number is compared with the same number entered in the comparing unit from the same card during the previous cycle. This creates an equal condition in the secondary comparing unit causing the energization of relays R6 to R9, inclusive. The closure of contacts R9a causes the energization of magnet PRM whereby the finder card is started toward the primary reject pocket, magnet EM being energized through contacts PRC2. Thus the finder card is rejected as its usefulness has ceased. The secondary feed mechanism is started by closure of contacts R7a while the primary feed magnet PFM and restoring magnet PR are also energized through contacts PRC1 and contacts R28a so that the primary cards continue to feed. After card lever contacts PCL3 have opened the restoring magnet SR cannot again be energized and hence the control number from the finder card is retained for the duration of operation No. 9. It will thus be seen that the control number from the finder card will be compared with every following file card fed from the primary hopper.

During each of the following cycles a primary card is compared with a control number from the finder card and if an equal condition prevails, relays R6 to R9 are energized and the closure of contacts R9a causes the primary card which has the same control number as the finder card to be rejected. This action is repeated every time the card to be selected is sensed by the brushes PB2. At the same time, through closure of contacts R7a, the secondary feed magnet SFM is energized causing a tab card to be fed to the pocket MS. When a high secondary card condition is created, which will be the case every time a file card has a lower number than the finder card, relays R2 to R5 will be energized, opening contacts R2a to prevent feeding of tab cards. Switch S1 being open to prevent energization of magnet PRM for this condition, the file card will be conveyed to pocket MS. When a card is sensed having a higher number than a finder card, it creates a high primary card condition in the secondary unit but this has no effect on the feed magnet SFM because, switch S8 being open, magnet SRM and relay R10 are not energized. Thus this card also will go to pocket MS. It will be seen that only the selected cards will be deposited in the primary reject pocket PRJ on top of the finder card, while the remainder of the file, which now includes the unwanted cards and tab cards put in place of the selected cards, will be deposited in pocket MS.

OPERATION No. 10

This operation is of value where it is necessary to replace cards in the files with others for some special reason. For example, it may be desired to replace the old balance cards for active accounts with new balance cards in a file devoted only to balance cards. This is a case where only one card per control number in the file is to be replaced by another card. Another application for this operation is the replacing of old name and address cards with new name and address cards made necessary for some reason, as for a change of address. Operation No. 10, in respect to the first case where a single card is to be replaced by another card, is similar to operation No. 5 insofar as the operation of the machine is concerned but differs in that, switch S7 being closed, the primary card is rejected every time an equal condition prevails in the secondary comparing unit, which is the only one used in this case. This means that every time a secondary card has the same control number as a primary card, the secondary card will be fed into the pocket MS whereas the primary card will be rejected by energization of relay R9 which, through the closure of its contacts R9a, causes the energization of the reject magnet PRM. The odd primary cards will be fed into the pocket MS as magnet PRM will not be energized under any conditions except the equal condition.

When there is more than one card to be replaced for control number there may be one or more cards in the secondary hopper to take the place of one or more withdrawn from the file. It is necessary to use the primary comparing unit in this case, and the operation will be substantially the same as for operation No. 1 except that, switch S2 being opened, no secondary cards can be rejected and, switch S7 being closed, primary cards will be rejected every time an equal condition prevails in the secondary unit.

OPERATION No. 11

This is a relatively simple operation which formerly was performed by hand by punch operators where it was necessary, for example, to punch two differently colored forms with the same data. One card form is placed in the primary hopper and the other in the secondary hopper, switch S10 is closed, both run out keys are latched down and neither comparing unit is used. The start key is depressed and held down until the opening of the card lever contacts SCL, PCL permits the machine to run continuously without further manual control. The secondary feed magnet is energized every cycle through the contacts SRC while the primary feed magnet is similarly energized every cycle during contacts PRC1 and R28a. This causes both card forms to feed continuously with the result that a pair of card forms will always be fed to the pocket MS in superposed relation. Since the primary feed is always one cycle behind the secondary feed the first card form from the secondary hopper will drop in the pocket MS first and will be followed by successive pairs of superposed primary and secondary forms. The first primary form being on the bottom, it will fall on top of the first secondary form. Thus the forms from the primary pocket are interspersed with the forms from the secondary pocket which may be removed from the pocket and delivered to the punch operators. It is, of course, not necessary that the cards be blank for this operation but may either or both be wholly or partly punched. It is plain that this operation may be used to intersperse punched cards or for applications where it is necessary that the cards alternate.

OPERATION No. 12

In this type of operation the last card of each group of cards and single cards are removed by rejecting them to pocket PRJ, the remainder of the file being deposited in pocket MS. Only switches S9 and S12 are closed for this operation and the primary run out key PRK is latched down. Only the primary comparing unit is used in this case, and the secondary feed mechanism is not used, the file of cards being placed in the primary hopper. Whenever a card is followed by another which has the same control number, an equal condition prevails in the primary comparing unit. This has no direct effect on the feeding of cards or their distribution, the switch S11 being open. The first of the two compared cards is fed into the pocket MS, magnet EM being energized through the closed contacts PRC2. It will be seen that, as long as the cards agree, the first card of each pair compared is always sent to the pocket MS. Eventually every group comprising a plurality of cards having the same control number will be succeeded by another group or a single card having a higher control number. This causes the primary comparing unit to take a low first primary setting energizing relay R14 and closing contacts R14a. This causes the energization of the primary reject magnet PRM with the result that the last card of every group is rejected. Another way of stating it, is to say that every card which precedes another of higher number will be rejected. It is thus evident that single cards will likewise be rejected because they will be invariably followed by another having a higher control number. The only cards which will be deposited in the pocket MS will be the remaining cards of the groups which consists of more than one card. The switch S12 being closed, a misplaced card will cause the machine to stop since its control number will be higher than the one on the succeeding card creating a high first card condition in the primary comparing unit energizing relays R18 and R19 and the error lamp EL. The closure of contacts 18a stops the machine by energizing magnet SKM.

OPERATION No. 13

After cards have been sorted into numerical order on a sorting machine it is sometimes desired to check the sorting operation to make sure that the cards are actually in numerical sequence, as for some accounting and statistical reports it would cause a costly error if the cards were not in proper order. It is even more important to check the card files from time to time, particularly where the files are of such a nature as to require filing of cards by hand. This may be done very easily in the present machine by using the primary comparing unit.

Tab cards are placed in the secondary hopper and the cards to be checked are placed in the primary hopper. Only switches S4, S16, S17 are closed in this case. If the cards are in proper numerical sequence there are only two conditions that can prevail in the comparing unit, the equal and the low first primary card conditions. If the sequence changes it should invariably result in a high first primary card condition in the primary unit. This will energize relay R29 which by closing contacts R29a will energize the secondary feed magnet SFM and cause a tab card to be fed to the pocket MS along with the card which was out of sequence. For this operation, the primary run out key is latched down as it is desired that the primary cards be fed continuously.

It is also possible to stop the machine and cause the error light EL to be illuminated when an error is detected. This is accomplished by closing switch S12 which results in energizing relays R18, R19 and the error light EL every time the first of two cards is higher than the second. The contacts R18a close and stop the machine by energizing magnet SKM.

OPERATION NO. 14

It is sometimes desired to introduce two blank cards after a group of cards. Only the primary comparing unit is used for this operation, switches S4, S5, S10, S15 are placed in closed position, and the primary run-out key PRK is latched down. The file of cards is placed in the primary hopper and the blank cards in the secondary hopper.

The start key SK is depressed to start feeding of cards and is held down until card lever contacts PCL close during the second card feeding cycle. Since the comparing units are in equal condition, relay R7 closes its contacts R7a during both of the first two cycles so that magnet SFM is twice energized. This keeps the primary and secondary feed mechanisms in operation until the first two primary cards are compared during the third cycle. Thus the first blank card is started toward pocket MS while the second blank card is fed to the eject position between the feed rollers 208, 209 and held thereby.

The control number of the first primary card is entered in the secondary unit during the third cycle by setting sectors 374 and, since sectors 373 are in a zero position, this has the effect of causing a low secondary card condition in the secondary unit. Switches S2 and S8 being open, no circuit is completed through the secondary comparing unit. Thus the feeding of blank cards stops. In subsequent cycles, the low secondary condition will repeatedly occur in the secondary unit because the sectors 374 will be set according to the control numbers on primary cards, while sectors 373 will always move to zero.

As long as cards are fed which belong to the same group, the primary unit will remain in equal condition with relays R28a and R11 deenergized. Thus magnets PFM and CR are repeatedly energized to keep the primary cards feeding continuously. Eventually the last card of one group and the first card of the next group will pass brushes PB2, PB1, respectively, and the first of these two primary cards will move to eject position between feed rollers 206, 207. It will be assumed, for convenience in description that this happens during the fifth cycle. The low first card condition created in the primary unit during the fifth cycle will cause relays R28, R11, R12, R13, to be energized before commutator C2 can close the circuit through magnets CR, PR, PFM, thus, by opening contacts R28a, R11a, stopping the feeding of primary cards and preventing the erasing of the control number of the second of the two primary cards from the sectors 373 of the primary unit. The primary unit is still maintained in low first card condition because sectors 374 are reset.

Relay R13, by closing contacts R13a, restarts the feeding of secondary cards and, magnet EM being invariably energized through contacts PRC2, the second blank card and first of the two primary cards are started in superposed relation toward pocket MS. Commutator SC thereby starts to turn since it is mounted on the secondary feed shaft 139.

During the sixth cycle a third blank card is fed to the eject position and magnet SFM is again energized to continue the feeding of blank cards for the seventh cycle. This is due to the fact that the sectors 373 of the primary unit have not been reset and this unit is still in low first card condition thereby reenergizing relays R11 to R13, and R28. Magnet CR is energized during the sixth cycle by commutator SC, which began turning when the secondary feed clutch magnet SFM was energized during the fifth cycle. Thus the sectors 373 of the primary unit will be restored, secondary feed magnet SFM energized, the third blank card ejected, and the fourth blank card moved to the eject position during the seventh cycle.

The restoring of the sectors 373 during the early part of the seventh cycle causes the primary unit to resume the equal condition, deenergizing relays R28, R11, R12, R13 during this cycle. The closure of contacts R28a now permits energizing the primary feed magnet during the seventh cycle while the opening of contacts 13a stops the feeding of blank cards with the fourth blank card in eject position.

During the eighth cycle the second of the previously compared primary cards is compared with the succeeding primary card and, if this card also belongs to another group, another pair of blank card feeding cycles takes place.

The first blank card always falls in the pocket MS ahead of the first primary card because three cycles of operation are needed before the first primary card reaches the eject position. Unless switch S10 is closed, the machine will not stop when the secondary hopper becomes exhausted.

If it were desired to insert only one blank card after each group, switches S4, S5, S6, S10, and S17 are closed and the primary run-out key latched down. With switch S6 closed, the primary comparing unit will be restored every cycle by energizing magnet CR. Contacts R13a will close to energize magnet SFM every time the control numbers change and thereby start the feeding of blank cards. This causes a blank card to be ejected by feed rollers 208, 209 along with the last card of a group having more than one card and for each card comprising a single card group. When there is more than one card to a group, equal conditions are created for the first cards of the group, and relay contacts R13a are not closed thereby prevents the feeding of blank cards.

Switch S12 can be closed for either of the above blank card insertion operations for the purpose of verifying the numerical sequence in which case the feeding of cards will stop when an error occurs.

Obviously the operations which have been described above may be varied by changing the settings of switches S1 to S17 or hand lever 309 to secure various results. For example, the closure of switches S1 and S2 always causes the rejection of cards when they might otherwise be deposited in the pockets MS or SP. The setting of hand lever 309 for those operations which would normally cause unrejected secondary cards to go in the pocket MS will cause these cards to be deposited in the pocket SP.

It will be seen from the illustrative operations described above that the machine is very flexible and can handle a wide variety of problems which hitherto required special machines for each operation or required manual labor. For instance, the operation of removing the balance cards hitherto had to be performed largely by hand because of the limitations in the use of multi-column selector and matching devices with which the present types of sorting machines are sometimes equipped. The machine not only saves manual labor but it also saves a considerable amount of time in the use of sorting machines, particularly, in respect to re-filing of cards. It was formerly necessary, if balance cards were to be refiled by machine, to place the entire file with all the new balance cards in the sorting machine and run them through as many times as there were digits in the control numbers to arrange the new cards in their proper numerical sequence with respect to other cards of the file. With the present machine, it is merely necessary to first arrange the relatively smaller number of new cards in numerical order and then, in a single run of the machine described herein, these cards can be properly filed and it is unnecessary to run the file cards through the sorting machine again.

While there has been shown and described and pointed out the fundamental novel features of the invention as applied to a single embodiment it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a machine of the class described, a series of four record receiving stations, a record distributing mechanism common to all of said stations and arranged to distribute records selectively to said stations, a plurality of separate record feeding mechanisms converging upon the distributing mechanism so as to feed to the distributing mechanism a plurality of separate batches of records having control number designations, the control number designations of the records in one of the batches bearing predetermined numerical relationships to the records in another batch, record analyzing means associated with each feeding mechanism for sensing the records fed thereby, record comparing means controlled by the sensing means and so constructed and arranged as to detect equality and inequality relationships between the records of the respective batches, and means so constructed and arranged as to selectively control the distributing mechanism to distribute the records of the several batches to the receiving stations in accordance with the numerical relationships between the control numbers in the compared records.

2. In a machine of the class described, a series of three or more record receiving stations; a record distributing mechanism common to all of said stations and adapted to selectively distribute records to any of said stations, a plurality of separate record feeding mechanisms converging upon the distributing mechanism for feeding a plurality of separate batches of records to said stations, certain of the records of each batch bearing a predetermined relationship to certain records of another batch, record analyzing means for successively sensing designations in the respective batches, means controlled by the record sensing means for comparing the data on the records of one batch with the data on the records of another batch and adapted to take settings indicative of the numerical relationships between the designations and the respective records compared, and means controlled by the comparing means for selectively controlling the operation of the distributing mechanism to cause compared records having a predetermined relationship to be deposited in one of said stations and to cause those records of each batch which do not have the predetermined relationship to be deposited in stations separate from each other and also separate from the records of other batches which do not have the predetermined relationship.

3. In a machine of the class described, a plurality of separate record feeding mechanisms each for feeding a separate batch of records, some of the records of one batch having a predetermined relation to some of the records of another batch, said record feeding mechanism feeding the records to a common distribution point where the records of the respective batches are brought into substantial juxtaposition; a record distributing mechanism located at the common distribution point for receiving said records, a series of record receiving stations comprising three or more for receiving the records from the distributing mechanism under control of said distributing mechanism, means to sense data designations in the respective records prior to their delivery to the distributing mechanisms by the feeding mechanisms, a plurality of record comparing devices including one for checking the sequence of one of said batches of records and another for comparing the data designations on records from the respective batches, and means controlled by the comparing means for controlling the distributing means to cause those records of said batches which have a predetermined relationship to become deposited in a predetermined common station and to cause those records of each batch not having the predetermined relationship to become deposited in stations separate from each other and from the pocket for the records having the predetermined relationship.

4. In a machine of the class described, a pair of record receiving stations, a record distributing mechanism common to all of said stations for selectively distributing records to said stations, means to feed two separate batches of records to the common record distributing mechanism, certain records of one batch having a predetermined relationship to certain records of the other batch; record analyzing means for sensing the data designations in the records of the respective batches prior to their delivery to the common record distributing mechanism, means controlled by the record sensing means for comparing the data on a pair of records comprising a record from one batch and a record from the other batch to detect the predetermined relationship, means controlled by the record sensing means for comparing two successive records of one batch to detect changes in sequence of the records of said batch, means controlled by both of the comparing means for controlling the distributing mechanism and feeding mechanisms to cause said mechanism to substitute one of a pair of compared records having a predetermined relationship for the other record and cause the two batches of records to become merged in a common station.

5. In a machine of the class described, means to feed a batch of records arranged in groups, means to compare successive records to detect a change in group designations, a plurality of record receiving stations, record distributing mechanism, and means controlled by said comparing means upon a change in group designations in the records for controlling the distributing mechanism to distribute all but one of the records of multi-record groups to one of said stations and to distribute the remaining record of a multi-record group and the single record groups to another of said stations.

6. In a machine of the class described, a plurality of record receiving stations, means to feed a file of records to a station assigned to the file records, means to feed to said station a series of records to be filed with the file records in proper file sequence, means to compare data designations on the file record with designations on the records to be filed, means to compare the designations on each file record with the designations on a succeeding file record to detect a change in designations, and means jointly controlled by the comparing means for controlling the two feeding means to cause a group of similarly designated records to be filed to be fed into said station in proper sequence.

7. In a machine of the class described, a plurality of record receiving stations, means to feed a file of records to a station assigned to the file records, means to feed to said station a series of records to be filed with the file records in proper file sequence, means to compare data designations on the file records with designations on the records to be filed, means to compare the designations on each file record with the designations on a succeeding file record to detect a change in designations, means jointly controlled by the comparing means for controlling the feeding means to cause a group of similarly designated records to be filed to be fed into said station in proper sequence, and means controlled by the second comparing means for stopping the feeding of records when the sequence of the file records is reversed.

8. In a machine of the class described, a pair of record receiving stations; record distributing means for determining the station to receive the records, said distributing means normally causing records to become deposited in a predetermined station; means to feed to said distributing means two separate batches of records bearing data designations, one batch comprising a file, and the other batch consisting of records which are to replace others in the file; means to compare each file record with a record from the second batch to detect an equality relationship between the compared records, including two series of members, each series being settable to correspond with the actual values of the designations on one of the records compared, and means jointly set by said members according to the numerical relationship of said values; and means controlled by the last-named means for controlling the distributing means to cause a file record having an equality relationship with a record from the second batch to be deposited in a station other than the predetermined station and operative to cause the record of the second batch to become deposited in the predetermined station.

9. In a machine of the class described, record sensing means, means to feed a batch of records at the head of which is a finder record designated by predetermined designations, record comparing means controlled by the sensing means including a plurality of elements each variably selectively settable according to numerical values, means controlled by the sensing means for setting groups of said elements according to numerical values represented by the designations in the records, said means being operative initially to set one group of said elements according to the values of data designations on the finder record and subsequently effective to set another group of said elements according to the values of the designations in the succeeding records, record distributing mechanism, and means controlled by the record comparing means for controlling the distributing means to cause the records having the predetermined control number designations to be distributed differently from the records which do not have such designations.

10. In a machine of the class described, means to feed a batch of perforated records arranged in numerical order, means to sense simultaneously the data designations on two successive records, means controlled by the sensing means for comparing the data designations representing the control numbers including means controlled by the sensing means for storing both of the control numbers in the comparing means and including means settable to indicate a reversal in sequence of the control numbers in respect to two compared records, a pocket for receiving the compared records, means to feed an unpunched record to said pocket, and means controlled by the comparing means for causing the feeding means to feed an unpunched record to said pocket whenever the sequence of perforated records is reversed.

11. In a machine of the class described, means to feed a batch of perforated records previously arranged in numerical order according to control number designations in said records, a pair of record sensing devices for simultaneously sensing two successive records; record comparing means including two series of elements, each element settable according to a scale of numerical value and means to set each series of elements to represent the numerical values on one of the records and including means to indicate a reversal of sequence between two records compared, and means controlled by the comparing means for stopping the feeding of records upon a reversal of sequence.

12. In a machine of the class described, a record receiving station, means to feed a file of records and undesignated records to said station, means to sense simultaneously the designations on two successive records; record comparing means comprising two series of elements each of which is settable selectively to represent any one of a scale of numerical values, each series being controlled by the designations on one of the records, said comparing means also including means jointly controlled by both series of elements for indicating a change in sequence of the designations; and means controlled by the last-named means for controlling the feeding means to cause a predetermined number of undesignated records to be fed to said station in succession for each reversal in sequence.

13. In a machine of the class described, a series comprising at least three record receiving stations, record distributing means common to all of said stations and arranged to distribute the records selectively to said stations, means to feed two separate batches of records to the record distributing mechanism, means to successively sense the records in each batch prior to delivery to the record distributing mechanism, means controlled by the sensing means for comparing designations in one record of each batch with designations in one record in the other batch, said comparing means being operative under control of said designations to indicate three different numerical relationships between the designations in the two compared records, means controlled by the comparing means for controlling the record distributing mechanism for causing one of a pair of records having a predetermined relationship to be deposited in one of said stations and the other record of said pair to be deposited in another station when a predetermined relationship exists between the respective sets and in a common station for a different relationship, and selectively settable means for predetermining the kind of predetermined relationship.

14. In a machine of the class described, a pair of record supply hoppers for receiving two separate sets of perforated records, a series comprising at least three record receiving stations, means common to both said stations and to said supply hoppers for distributing the batches of records to said stations, means to feed two batches of records from said hoppers to said common distributing means, record analyzing means for successively sensing the records of each batch prior to their delivery to the common distributing means, a record comparing device having a plurality of series of settable elements each variably selectively settable to designate a numerical value, means controlled by the analyzing means for variably setting each series of elements according to the values of designations in one of the records whereby to enter into the comparing means the numerical values of the designations in a record from each batch, said comparing means including means jointly controlled by the respective series of settable elements for indicating three different numerical relationships between the respective records, means controlled by the comparing means for selectively controlling the distributing means to cause the records to be distributed to the stations according to one or more of the three numerical relationships, and presettable means for controlling the effect of the comparing means on the distributing means according to a predetermined plan whereby the records will be distributed to the three pockets according to prearranged combinations of the numerical relationships.

15. In a machine of the class described, a series of record receiving stations, means to selectively distribute records to said stations, means to feed a plurality of separate batches of records to the distributing means, means for sensing data designations in the records of each batch, a pair of record comparing devices controlled by the sensing means, one of said record comparing devices comparing the data designations of a record from one batch with a record of the other batch, the other comparing device comparing two successive records of one of the batches, each of said record comparing devices including a series of differentially selectively settable elements, each of which is settable to represent any one of a scale of numerical values, each series of elements being settable according to the values of the designations in a single record, the first comparing device being adapted to indicate numerical relationships between a record of one batch and a record of the other batch, the other comparing device being adapted to indicate the sequence of the records of one batch, means jointly controlled by the comparing means for selectively controlling the distributing means and feeding means in accordance with both the numerical relationships between a record of one batch and a record of another batch and the sequence of the records in one of the batches.

16. In a machine of the class described, a series of record receiving stations, means to distribute records to said stations, means to feed two separate sets of records to the distributing means, a pair of record comparing devices, one for comparing the records from one set with the records of the other set, the other for comparing each record of one set with the succeeding record of the same set, and means for selectively controlling the distributing and feeding means in accordance with the dual comparison effected by the comparing means.

17. In a machine of the class described, a series of record receiving stations, means for distributing records to said stations, primary and secondary feeding means for feeding separate sets of primary and secondary records to the distributing means, means to compare the primary records with the secondary records, means to compare each primary record with the succeeding primary record, means controlled by the first comparing means for causing the primary feeding means to operate continuously when primary and secondary records correspond, means controlled by the second comparing means for interrupting the feeding of primary records and initiating feeding of the secondary record feeding means when there is a change in the designations of the primary records, and means controlled by the comparing means for controlling the distributing means in accordance with the relationship between the compared records whereby corresponding records of both sets are distributed to a predetermined station and non-corresponding records in either of the sets are distributed to separate and different stations.

18. In a machine of the class described, a series of record receiving stations, means to distribute records to said stations, means for feeding a plurality of batches of records to the distributing mechanism, said distributing mechanism normally causing the records from both batches to be distributed to a predetermined station, means to compare the records of one batch with the records of another batch to detect a correspondence of data in the records compared, and means controlled by the comparing means for controlling the distributing means to cause the corresponding records of one batch to be distributed to a station other than the predetermined station.

19. In a machine of the class described, means to feed a plurality of separate batches of records each batch having both records which correspond to and record which do not correspond to records in another batch, record distributing mechanism for receiving all the records of said batches for determining at least three different destinations for the records according to whether or not they correspond in the respective batches, record comparing means, means selectively controlled by the comparing means for controlling the distributing mechanism to cause the corresponding records of all the batches to have a common destination and to cause the non-corresponding records of each batch to have separate and distinct destinations in the case of each batch, whereby the non-corresponding records of one batch are kept separate from the non-corresponding records of another batch and also separate from the corresponding records.

20. In a machine of the class described, means to feed a plurality of separate sets of records, each set having groups of records which correspond to groups of records in another set; means to distribute the records from both sets, means to compare the records in one set with the records of another set, means to compare successive records of one set with one another to detect changes in sequence and means controlled by both comparing means for controlling the distributing means and feeding means to cause a group of records in one set which corresponds to a group of records in another set to replace the corresponding group of records in the second set.

21. In a machine of the class described, means to compare data designations on a plurality of separate sets of records and adapted to take one of three settings according to whether one of a set of compared records is higher, lower or equal to another compared record; a series of receiving stations including separate stations for the records which are equal, and a station for the low records of each set, means controlled by the comparing means for distributing the equal records and the low records to their respective pockets, and manual means for conditioning the distributing means to cause all the equal records to be distributed to only one of the equal stations.

22. In a machine of the class described, the combination of a series comprising three or more record receiving stations, a series of sorting blades leading from a common distribution point to said stations for guiding records to said stations, a plurality of separate record feeding mechanisms for feeding a plurality of batches of records to the common distribution point, means to selectively operate said series of blades to determine the station to receive a record, means to compare data on a record of one batch with data on a record from another batch, said comparing means being settable in three different positions indicative of two kinds of inequality and equality, and means controlled by the comparing means to selectively control the blade operating means in accordance with the inequality and equality relationships between the records, and selectively settable means for predetermining the effect of the comparing means on the blade operating means, said predetermining means being settable to cause two records having an equality relationship to become deposited in a common pocket or in two separate stations as desired.

23. In a machine of the class described, a series of record receiving stations, comprising at least three stations, a series of sorting blades leading from said stations to a common distribution point for guiding records to said stations, means to feed a plurality of separate batches of records to said blades at the common distribution point, means to compare data on a record of one batch with data on a record from another batch, and means located at the common distribution point and controlled by the comparing means for selectively operating the sorting blades to cause compared records having a predetermined relationship in respect to the compared data to become deposited in a common station and to cause those records of each batch which do not have the predetermined relationship with records of another batch to become deposited in a station other than the station for the compared records having the predetermined relationship and also separate from the said records of another batch which also do not have the predetermined relationship.

24. In a machine of the class described, means to feed a plurality of batches of records, some of the records of one batch having a predetermined relationship with the records of another batch, a series of record receiving stations including a plurality of record receiving stations for each batch, a group of contiguous blades for guiding the records of both batches from a common distribution point to said stations, means located at the common distribution point for selectively actuating the blades whereby a record from one batch may be caused to be deposited in a pocket of another batch, means to compare data on the records in one batch with records in another batch to detect the predetermined relationship, means controlled by the comparing means for controlling the blade operating means to cause the records in both batches having a predetermined relationship to become deposited in a predetermined pocket and to cause the remaining records of each batch to become deposited in the pockets assigned to said batch, and means for changing the effect of the blade operating means to cause records having a predetermined relationship to become deposited in two separate stations which are separate from the stations assigned to receiving the records of each batch which do not have the predetermined relationship.

25. In a machine of the class described, a plurality of record receiving stations, sorting mechanism including a group of contiguous flexible sorting blades leading from a common distribution point to said stations for guiding records from the common distribution point to said station; means to feed two separate batches of records to the sorting blades at the common distribution point, certain records of one batch bearing a predetermined relationship to certain records of another batch; means to compare a record from one batch with a record from the other batch to detect the predetermined relationship, a plurality of magnets for controlling the operation of the blades, and means controlled by the comparing means for selectively controlling the magnets to cause one of a pair of records having the predetermined relationship to be substituted for the other record and to cause the record replaced to become deposited in a station separate from the records of the batch formerly containing the replaced records.

26. In a machine of the class described; sorting mechanism including a series of record receiving stations, a series of guide blades leading from a common distribution point to the several stations, and blade selecting magnets; a pair of feed mechanisms for conveying two separate batches of records to the distribution point, means to sense designations in both batches of records as they approach the distribution point, and comparing means controlled by the sensing means for comparing data designations in the records, said comparing means including switching means arranged to be set according to whether one of the compared records is higher, lower, or equal in respect to the data designations than the other compared records, said switching device selectively controlling the magnets to cause the records of both sets to be distributed to said stations according to the relationship between the designations in the compared records.

27. A machine for filing perforated accounting and statistical record cards, comprising means to fed a file of records, means to feed the records to be filed, dual record comparing means for detecting both numerical relationships and changes of sequence of the file records and the records to be filed, record distributing mechanism common to both feed mechanisms, and means controlled by the comparing means for variably controlling the operation of the distributing means in accordance with both numerical relationships and sequential changes in both the file records and the records to be filed.

28. In a machine for filing accounting and statistical records, record receiving stations, means to distribute records to said stations, means to feed two separate batches of records to said distributing means, one batch consisting of a file and the other consisting of records to be filed, said distributing mechanism being normally operative to distribute both batches of records to a predetermined station, means to compare the records of one batch with records of the other batch to detect an equality relationship, means controlled by the comparing means for controlling the distributing means to cause a file record having an equality relationship with a record to be filed to become distributed to a station separate from the predetermined station receiving the record to be filed whereby the latter replaces the former in the file, and means to render the last-named means operative and inoperative at will.

29. In a machine for filing accounting and statistical records, a series of record receiving stations, means to distribute records to said stations, means to feed a file of records to the distributing means, said file including records to be withdrawn and odd file records; means to feed a set of withdrawal records arranged in groups of one or more records each of which groups may correspond to a similar group of records in the file, means to compare the file and withdrawal records with each other to detect equality relationships between file records and withdrawal records, and means controlled by the comparing means for selectively controlling the distributing means so as to cause odd file record groups to be distributed to one station and the equal file and withdrawal records to be deposited in a common station separate from the odd file record groups, said comparing means controlling the distributing means to cause odd withdrawal record groups to be distributed to a station separate from the station for the odd file records and the station for the equal file and withdrawal records.

30. An analyzer unit for record controlled machines, comprising a series of pairs of sectors, means to rotate each sector differentially to set same in accordance with a numerical value, a series of differential links each interconnecting a pair of sectors, a series of cam levers each co-acting with one of the links whereby each cam lever is differentially responsive to relative movements between the sectors of the associated pair, and a switching unit controlled by the cam levers.

31. In an analyzer unit for record controlled machines a pair of relatively movable pivotally mounted sectors, means to rotate the sectors to represent two separate numerical values, a differential link or beam having a pin and slot connection to both sectors and a pivot pin, a guide member for said link having a slot receiving said pin whereby the pin may move along the slot when said sectors are displaced relative to each other, a cam lever having a slot embracing said pin whereby movements of the pin are communicated to the cam lever to cause the latter to take one of three positions depending upon whether the relative movements of the sectors are the same or one sector moves more than the other, and a three-position switch actuated by the cam lever.

32. In an analyzer for record controlled machines, a pair of relatively rotatable sectors, separate means to rotate each sector variable extents to represent a numerical value, a beam having each end pivotally slidably connected to one of the sectors whereby both ends of said beam will move equal extents in opposite directions when both sectors are set to equal numerical values and unequal extents when the numerical values are unequal, and a cam device operated by the center of the beam and settable to any one of three positions according to the position of the beam to designate the numerical relationship between the two values represented by the setting of said beam such as the equality and two kinds of inequality, that is, when the value represented by the sector of one setting is higher, lower or equal to the value represented by the setting of the other sector.

33. In a machine of the class described, record distributing mechanism, means to feed a plurality of separate batches of records to the distributing mechanism, means to compare data on records of one batch with the records of another batch, means to compare two successively fed records of one batch, and means jointly controlled by both comparing means for variably controlling the distributing means in accordance with record relationships detected by the comparing means.

34. In a machine of the class described, means to feed a batch of records, means to compare together the data on two successive records to detect changes in designations, means to cause a record to be inserted between two records of said batch, means controlled by the comparing means for interrupting the feeding of said batch of records and for causing a predetermined number of cycles of the record inserting means whereby to insert a predetermined number of other records between two records of said batch, and means to restart the feeding means after the predetermined number of other records have been inserted in said batch.

35. In a machine of the class described a record receiving station, means to feed two separate batches of records to such station, a pair of record analyzing devices associated with one of the feed mechanisms and spaced apart so as to sense together two successive records of the batch of records fed by the associated feed mechanism, record comparing means controlled by both of said sensing means and including elements settable to denote whether the first of two compared records is numerically higher, lower, or equal to the second of the two compared records, means jointly controlled by all of said elements to stop the feeding of the records which are compared when the second of two compared records is higher numerically than the first, means controlled by the comparing means for starting the feeding of the second batch of records when the same condition exists, means to cause the feeding of the second batch of records to continue for a predetermined number of cycles whereby to feed a predetermined number of records of the second batch to said station, and means to stop the feeding of the records of the second batch and restart the feeding of records of the first batch after the predetermined number of records from the second batch having been fed to said station.

36. In a machine of the class described, a plurality of record receiving stations, means to feed two separate batches of records to said stations, means to distribute the records from both feeding means to said stations, means to compare designations in three different records including a record of one batch with a succeeding record of the same batch and also with a record of another batch, said comparing means being responsive to equality and two kinds of inequality relationships between said record and the other two records with which it is compared, means selectively controlled by the comparing means for selectively controlling the feeding means and distributing means in accordance with said relationships, and manually settable means for predetermining the effect of the comparing means upon the distributing means, whereby the records of the several batches are caused to be automatically distributed to said stations according to a variety of relationships including the deposition of records having equal data in a common pocket or in a separate pocket at the will of the operator.

37. In a machine of the class described, means to feed a file of records to a common distribution point, means to feed to the common distribution point a batch of records to be filed, record comparing means including four series of settable members arranged in two groups, means to set a series of members from each group in accordance with the numerical value of data designations in a record from the file of records, means to set the remaining two series in accordance with the data designations in another file record and in a record to be filed, respectively; means controlled by the two series of records in each of the two groups for indicating the numerical relationship between two successive file records and between a file record and a record to be filed, said means being settable to indicate whether a first rule record is higher, lower or equal to a second file record and whether the first file record is higher, lower or equal to a record to be filed, and means controlled by the last-named means to selectively control the operation of a feeding means in accordance with the numerical relationships between the first file record and with the other file record and with the record to be filed, manually settable means for predetermining the effect of the last-named means upon the feeding means.

38. In a machine of the class described, means to feed a plurality of separate batches of records containing data designations to a common distribution point, a series of record receiving stations including at least three stations, a series of sorting blades leading from the common distribution point to the respective stations, means to selectively operate the blades whereby to cause records from each batch having a predetermined relationship to become deposited in a common pocket and the remaining records of the respective batches to become deposited in pockets separate from each other and from the pocket for the records having the predetermined relationship, a series of groups of electrical sensing devices each group for sensing the designations in the records of one of said batches, record comparing means including a plurality of separate groups of members each variably settable to numerical values and including a plurality of groups of magnets each for controlling the setting of one of said members, each group of magnets being controlled by a group of sensing elements, and electrical switching means associated with and controlled by the groups of settable elements, said switching means being selectively settable by said members to indicate equality and two kinds of inequality relationship between the records compared, a series of magnets for selectively controlling the operation of the distributing mechanism, a system of relays controlled by the switching means for selectively controlling said magnets, and a series of switches settable to predetermine the effect of the switching means upon said magnets, said switching means being settable in combinations to predetermine the distribution of the records from the respective batches.

39. In a machine of the class described, a series of record receiving stations comprising three or more stations, a common feed mechanism for conveying records from a common distribution point to any one of said stations, record distributing means located at said common distribution point and including a plurality of magnets each for determining a predetermined distribution of the records, means to feed a plurality of separate batches of records to the distributing means, each feeding means including a magnet for starting and stopping the feeding means with which it is associated, record comparing means comprising two units each including two series of elements each element settable to represent a numerical value, and including a series of magnets each associated with one of said elements to control the setting thereof in accordance with the numerical value, means controlled by the magnets for setting said elements individually to represent a single value, a plurality of sets of electrical sensing brushes one for sensing successively the records of one batch and two for sensing together two successive records of another batch, means to selectively connect the respective series of magnets to said sensing brushes, a system of relays for selectively controlling the operation of the magnets associated with the distributing mechanism with the feed mechanism respectively, and selectively settable switching means for placing said magnets under the control of the comparing means, said switching means being settable combinationally in a plurality of ways according to prearranged plans to variably control the distribution of the records from the several batches to said stations.

40. In a machine of the class described, a series of record receiving stations comprising four stations, a record feeding mechanism common to all of said stations and leading from a common distribution point to all of said stations, a series of sorting blades leading from the common distribution point to the respective stations, means located at the common distribution point for selectively variably operating the blades to distribute the records fed to the distributing means at the common distribution point in a variety of ways to said stations, means to feed a plurality of separate batches of records to the blades at the common distribution point, means to sense together a plurality of records from said batches including a record from one batch and a plurality of records from another batch, record comparing means controlled by the sensing means and so constructed and arranged as to indicate the numerical relationships between the respective records compared, means controlled by the comprising means for selectively controlling the operation of the blades, and presettable means settable in combinations according to a plurality of predetermined plans for determining the effect of the comparing means upon the distributing means whereby to cause the respective records from the several batches to be distributed to said stations in a variety of ways at the will of the operator.

41. In a machine of the class described the combination of a series of record receiving stations, selectively controllable record distributing mechanism common to all of said stations, a plurality of separate record feeding mechanisms, each for feeding a separate batch of records to said common distributing mechanism, electric sensing means associated with each feeding mechanism and operative to sense data designations in the records fed thereby; record comparing means common to said feeding mechanisms and having means controlled by sensing both means for entering the data represented by the designations in the records sensed, said comparing means including a plurality of series of setting magnets each responsive to a data designation in one of the records sensed by the sensing means, said comparing means also including a switching mechanism settable to indicate whether one of the records compared is numerically equal to, higher, or lower than another with respect to the data designations in the records; and a system of relays selectively controlled by said switching mechanism for controlling the operation of the feeding means and distributing means, said system of relays causing records from the respective batches to be selectively distributed to the stations according to the numerical relationships between the data designations on the records compared.

42. In a machine of the class described, a plurality of record receiving stations, selectively operable means to distribute the records to said stations; two separate feeding means for feeding two separate batches of records to the distributing means, certain records of one batch bearing a predetermined relationship to certain other records of the other batch; a pair of electric sensing devices, each associated with one of said feeding means and operative to sense data designations in the records fed thereby; means to compare the designations in a record from one batch with the designations of records in another batch, including two series of controlling magnets, each responsive to a designation in one of the records, and including a switching device settable under control of said magnets to indicate a predetermined relationship between the designations on a record of one batch and a record from the other batch, a series of relay circuits for controlling the operation of the distributing means and the feeding means, and a plurality of selectively settable switches for placing certain of said relay circuits under control of the comparing means.

43. In a machine of the class described, a plurality of record receiving stations, record distributing mechanism common to said stations and normally operative to cause all records to become deposited in a predetermined station, means to feed a file of records to said distributing means, means to feed a series of records to be filed to the distributing means, means to compare the designations on each file record with the designations on each record to be filed to detect equality and inequality relationships between the file records and the records to be filed, means to compare the designations of each file record with the designations on the succeeding file record to detect a change in designations in the file records, and selective control means controlled by both comparing means for selectively controlling both the distributing means and the feeding means to cause the file records and the records to be filed to be fed into the predetermined station according to the sequence of their respective designations, said comparing means being operative when an odd record to be filed occurs for which there are no corresponding designations in a file record to control the selective control means to cause said record to be filed to become deposited in a station separate from the predetermined station.

44. In a machine of the class described, a plurality of record receiving stations, record distributing mechanism common to said stations and normally operative to cause all records to become deposited in a predetermined station, means to feed a file of records to said distributing means, means to feed a series of records to be filed to the distributing means, means to compare the designations on each file record with the designation on each record to be filed to detect equality relationships between the file records and the records to be filed, means to compare the designations of each file record with the designations on the succeeding file record to detect a change in designations in the file records, selective control means controlled by both comparing means for selectively controlling both the distributing means and the feeding means to cause the file records and the records to be filed to be fed into the predetermined station according to the sequence of their respective designations, said comparing means being operative, when an odd record to be filed occurs for which there are no corresponding designations in a file record, to control the selective control means to cause said record to be filed to become deposited in a station separate from the predetermined station, and means controlled by the comparing means for stopping the feeding of records to the stations when the sequence of the records is reversed.

45. In a machine of the class described, a plurality of record receiving stations, record distributing mechanism common to said stations and normally operative to cause all records to become deposited in a predetermined station, means to feed a file of records to said distributing means, means to feed a series of records to be filed to the distributing means, means to compare the designations on each file record with the designations on each record to be filed to detect equality relationships between the file records and the records to be filed, means to compare the designations of each file record with the designations on the succeeding file record to detect a change in designations in the file records, selective control means controlled by both comparing means for selectively controlling both the distributing means and the feeding means to cause the file records and the records to be filed to be fed into the predetermined station according to the sequence of their respective designations, said comparing means being operative when an odd record to be filed occurs for which there are no corresponding designations in a file record to control the selective control means to cause said record to be filed to become deposited in a station separate from the predetermined station, means controlled by the first-named comparing means upon the occurrence of a misplaced record to be filed for controlling the distributing mechanism to cause said mis-placed record to become deposited in a station other than the predetermined station whereby to segregate misplaced records from the file records.

46. In a machine of the class described, a pair of record receiving stations, means to distribute records to said stations and normally operative to cause all records to be deposited in a predetermined station, means to feed a batch of records to said distributing means in the first of which records is designated a predetermined control number; record comparing means having two sections, each capable of being set in accordance with the designations from a record, each section including a series of magnets operative to control entry into the comparing means of the value represented by a single designation, an electrical sensing device for sensing the designations in said records successively, means for causing the entry of the control number in the first card in one section of the comparing means, means for subsequently entering control numbers of the succeeding records in the other section of the comparing means, and means controlled by said comparing means for controlling the distributing means when an equality relationship exists in the comparing means for causing a record to become distributed to the remaining station.

47. In a machine of the class described, means to feed a batch of perforated records arranged in numerical order according to the control number designations in said records, a pair of electric sensing devices, each for sensing designations in two successive records, electric comparing means controlled by said sensing means, a record receiving station, means to feed said records to said station, means to feed blank records to said station including a pair of magnets, each controlling one of the said feed mechanisms, and means controlled by said comparing means for selectively controlling said magnets to cause one or more blank records to be fed to said station whenever a given record is followed by one having a different control number.

48. In a machine of the class described, means for feeding a batch of perforated records previously arranged in a predetermined order according to control number designations in the records, a pair of electric sensing devices for sensing designations in two successive records, comparing means controlled by the sensing devices for comparing said designations including two series of elements each settable to any one of a scale of values to represent a digit of a control number, means to differentially selectively set said elements including two series of control magnets each series associated with a sensing device and with a series of settable elements, each magnet being responsive to a designation in the record, and an electric switching device comprising a series of members settable by said elements to any one of three positions denoting an unchanged sequence of numbers, the predetermined sequence, and reverse sequence; and electric means controlled by the third position of the switching device for stopping feeding of the records whenever the sequence is reversed.

49. In a machine of the class described, a record receiving station, means to feed a batch of records to said station, said records being arranged in groups in a predetermined order according to data designations in said records, a pair of electrical sensing devices for sensing together the designations in two successive records; record comparing means including two series of control magnets, each associated with and controlled by one of said sensing devices, and a switching device settable under control of said magnets to indicate a change in the sequence of the data designations; means to feed a second batch of records to said station, and an electric cycle controller set into operation by said switching device for controlling the feeding means to cause a plurality of unperforated records to be deposited in said station in succession between two groups of records which do not have the predetermined sequence.

50. In a machine of the class described, the combination of a pair of record receiving stations, record distributing means for distributing records to said stations, a plurality of record feeding means each for feeding a separate batch of records to the distributing means, a pair of sensing devices each associated with one of the feeding means and operative to sense data designations in the records fed thereby; a record comparing device including two series of elements each variably selectively settable according to a scale of values to represent a numerical value, means controlled by each sensing device for setting the corresponding group of settable elements according to the values of designations in a record in the associated batch, means jointly operated by the two groups of settable elements to one of three positions according to whether a predetermined record is higher, equal to or lower than the other record, means controlled by the last-named means for selectively controlling the distributing means, manually presettable means settable in combinations to control the effect of the last-named means on the distributing means, said manually settable means being settable to cause records having a predetermined one of three numerical relationships to become deposited in one station when the predetermined relationship exists and in a different station when a different relationship exists.

51. In combination, a pair of record receiving hoppers, a pair of converging feed mechanisms each for conveying records from an associated hopper to a common distributing point; a series of record receiving stations including two stations for each hopper and associated with the feed mechanism for such hopper, one of said stations of each pair being a reject station and the other for selected records; a plurality of record sensing means for sensing control number designations in the records fed by the respective sensing means, record distributing means for controlling the disposition of records from the respective hoppers to said stations, said distributing means being operable to both cause certain records from both batches to become deposited in a common station or to become deposited in the reject stations according to numerical relationships between the designations, record comparing means controlled by said sensing means and adapted to detect equality and two kinds of inequality relationships between the designations in the compared records, selectively operable means controlled by said comparing means for selectively controlling the distributing means and feeding means according to the nature of said relationships, and selective control means settable to control the effect of the comparing means on the selectively operable means.

52. In a sorting machine, a series of sorting stations, selectively controllable record distributing mechanism for determining the disposition of records in said stations, means to feed records to the distributing means, means to sense together the data designations in a plurality of the records fed by the feeding means; means controlled by the sensing means for comparing the numerical value of data in said records, including elements for denoting which of two records is numerically higher or lower in value than the other; means controlled by said elements for selectively controlling the distributing means, and a device freely manually insertible in the machine having means pre-settable according to a prearranged plan and, when inserted in the machine, selectively controlling the operation of the distributing means under control of the selective controlling means.

53. In a machine of the class described, a series of record receiving stations, means to distribute records to said stations, means to feed a primary set of records to said distributing means, means to feed a secondary set of records to the distributing means, means to sense together data designations in a plurality of records including at least one from each set; record comparing means controlled by the sensing means, said comparing means being settable under control of the sensing means according to a plurality of positions manifesting equality and two kinds of inequality relationships between a primary record and a secondary record, and means controlled by the several settings of said comparing means for controlling the distributing means to select a common station for equal primary and secondary cards and to select either of two other stations according to whether the primary record is higher numerically or vice versa whereby to segregate the odd primary and secondary records in stations separate from each other and the equal primary and secondary records.

54. In a machine of the class described, a pair of record receiving stations, means to distribute records to said stations; means to feed two separate batches of records to said distributing means, the records of each of said batches being arranged in groups according to a predetermined order, one of said batches consisting of records to be filed with the records of the other batch which correspond; means to sense together a plurality of the records in said batches; record comparing means, controlled by the sensing means, for comparing the records of one batch with the records of the other batch and including means to compare the successive records of at least one of said batches with one another, and adapted to detect equality relationships between the compared records and to detect reversals in sequence arising from misplaced records; and means controlled by the comparing means for controlling the distributing means and feeding means to cause the misplaced records to become deposited in one of said stations and to cause the corresponding records to become merged in the other station in a single sequence.

55. In a sorting machine, a series of sorting stations, selectively operable record distributing mechanism for determining the disposition of records to said stations, control circuits for the distributing means, a plurality of means to feed a plurality of separate batches of records to the distributing means, means to sense data designations in at least one record of each of the batches of records fed by the feeding means, means controlled by the sensing means for comparing each record of one batch with a record of another batch and adapted to denote the actual numerical relationship between said records, means controlled by the comparing means for selectively controlling the distributing means, and a device freely manually insertible in the machine having means presettable according to a prearranged plan and, when inserted in the machine, selectively controlling the operation of the distributing means under control of the selective controlling means, said device comprising a switch assembly having a plurality of selectively settable switching devices combinationally settable to control the effect of the circuits controlling the distributing means on said distributing means.

56. In a machine for filing accounting and statistical records, a series of record receiving stations, means to distribute records to said stations, means to feed a file of records to the distributing means, said file including records to be withdrawn and odd file records which are to remain in the file, means to feed a set of withdrawal records arranged in groups of one or more records, each of which groups correspond to a similar group of records to be withdrawn from the file, means to compare the file and withdrawal records with each other adapted to detect equality relationships between the file records and withdrawal records, and means controlled by the comparing means for selectively controlling the distributing mechanism to cause odd file record groups to be distributed to one station and to cause an equal file of withdrawn records to be deposited in stations separate from each other and from the odd file record groups.

57. In a machine of the class described, a pair of record receiving pockets, means to distribute records to said pockets, means to feed two separate batches of records to said distributing means, the records of each batch being arranged in a predetermined sequence which, when combined with the records of one batch, intersperse the records of the other batch resulting in the combined batch having the records arranged in the same sequence, the records of one batch being designated differently from the records of the other batch whereby no record of either batch is designated the same as any record of the other batch, a pair of record sensing devices each for sensing the designations in one of said batches, a record comparing device comprising two series of elements each element being settable in accordance with the position of a designation in one of the records, means controlled by the respective sensing devices for setting the respective series of settable elements in accordance with the designations in the respective records, means jointly controlled by the two series of settable elements and settable thereby to any one of three positions to denote whether a record in a given batch is higher, equal to or lower than the record of another batch in respect to the sequence, means controlled by the jointly operable means for controlling the feeding means and the distributing means to cause the records in the respective batches to be deposited in a predetermined pocket alternately so as to occur in said pocket in a single sequence, and means controlled by the jointly operable means when the two records contain the same designations to cause one of said records to become deposited in a pocket separate from the records which have been combined in proper sequence.

58. In a machine of the class described, the combination of a series comprising at least three record receiving pockets, a common feed mechanism for conveying records to said pockets from a common distribution point, record distributing means located at the common distribution point and including a series of sorting blades leading from said common distribution point to the respective pockets for guiding records into said pockets and including means to selectively operate the blades; means to feed a plurality of separate batches to the distributing means for distribution to said pockets, a plurality of record sensing devices including at least one for each record feeding mechanism for successively sensing the records fed by the respective record feeding mechanisms and including an additional record sensing device which in cooperation with one of the other sensing devices causes two successive records of a given batch to be sensed together for sequence comparison purposes, record comparing means comprising a plurality of record comparing devices, each record comparing device including two series of settable elements each variably selectively settable to designate a digit of a number designated in the records, means controlled by each record sensing device for variably selectively setting the elements of an associated series of settable elements, means jointly controlled by the two series of settable elements of each comparing device for taking settings to one of three positions to indicate the numerical relationship between two numbers represented by the positions of the series on settable elements to indicate whether one of two numbers is higher, lower or equal to the other number; means controllable by the comparing means for selectively controlling the operation of the distributing means and the feeding means to determine the distribution and order of feeding of the records from the several batches to said pockets, and manually settable means settable in combinations to control the effect of the comparing means upon the last-named means whereby to preset the machine to cause the records in the respective batches to be distributed to said pockets according to a predetermined plan.

59. In a machine of the class described, a series of record receiving stations, means for distributing records to said stations, primary and secondary feeding means for feeding separate sets of primary and secondary records to the distributing means, means to compare the primary records with the secondary records, means to compare each primary record with the succeeding primary record, means controlled by the first comparing means for causing the primary feeding means to operate continuously when primary and secondary records correspond, means controlled by the second comparing means for interrupting the feeding of primary records and initiating feeding of the secondary record feeding means when there is a change in the designations of the primary records, means controlled by the comparing means for controlling the distributing means in accordance with the relationship between the compared records whereby corresponding records of both sets are distributed to a predetermined station and non-corresponding records in either of the sets are distributed to separate and different stations, and presettable means for causing the corresponding records of one set to become distributed to the predetermined station and the remaining corresponding records to become distributed to a station separate from the predetermined station and from the stations for the non-corresponding records.

60. In a machine of the class described, the combination of a plurality of converging record feeding mechanisms for feeding a plurality of separate and independent batches of records to a common distribution point at which the ultimate distribution of the records from the respective batches is to be determined, a series of record receiving stations including at least one station for each record feeding mechanism and one or more stations common to all the record feeding mechanisms, means for conveying records from the common distribution point to said stations; record distributing mechanism including a series of guide blades leading from the common distribution point to said stations and means for selectively operating the blades whereby the records from the respective batches may be caused to become merged in a single station, divided among the stations common to said record feeding mechanisms, or diverted to the stations associated with the respective feed mechanisms according to numerical relationships between records from the respective batches; means to successively sense data designations representing control numbers in the records prior to their arrival at the common distribution point; record comparing means controlled by the sensing means, said record comparing means having means settable under control of the records to three positions to indicate two kinds of inequality relationships and equality relationships between a pair of compared records including a record from each of a plurality of batches; and manually settable means for predetermining the distribution of the records to said stations in accordance with predetermined numerical relationships between the compared records, said manually settable means being positionable to cause records from each batch having predetermined relationships to records of other batches to become deposited in common stations or in separate stations at the will of the operator and under control of the comparing means.

61. In a machine of the class described, the combination of a pair of record receiving stations, means to feed to said stations a batch of records arranged in groups, record sensing means for successively sensing the records fed by the feeding mechanism, record comparing means controlled by the sensing means and comprising two series of settable elements, each series being settable under control of the designations on one of two successive records, each element being settable to a position denoting the actual value of a designation, and means operated by said elements for denoting the relationship of all of the designations on one said record to all of the designations on the other record, and means controlled by last-named means for causing the first of two compared records which differ in designations to become deposited in one of said stations and the remainder of the records to become deposited in a different station whereby to remove the last record of a group and segregate it from the remaining records.

62. In a machine of the class described, means to feed a plurality of batches of records having control number designations, each batch having records which correspond, in respect to the control number designations, with records in another batch; means for sensing data designations in the records of the respective batches; means to compare the control designations on a record from one batch with the control number designations on a record from another batch, said comparing means having a plurality of groups of settable elements, each group corresponding to the designations in one record, each element of a group being settable to a position to denote the actual value of a designation; record distributing mechanism for receiving the records of all of said batches and operable to determine a plurality of different destinations for the records, and means controlled by all the elements of the comparing means for controlling the distributing mechanism to cause the corresponding records of one batch to replace the corresponding records of the other batch, said last-named means being operative to determine a destination for the replaced record different from the record replacing it.

63. In a machine of the class described, a plurality of separate feeding mechanisms each for feeding a separate batch of records, said feeding mechanisms conveying the records of all the batches to a common distribution point, each batch of records having groups of records which may correspond to records or groups of records present in another batch, a common record distributing mechanism for receiving all the records from all the batches; a plurality of record sensing means for sensing, respectively, designations in a record from one batch and designations in two successive records of another of said batches prior to their delivery at the common distribution point, means controlled by the sensing means for comparing the records of one batch with the records of another batch and for comparing two successive records of one of said batches, and means controlled by the comparing means for controlling the distributing means to cause a group of records in one batch which correspond to a group of records in another batch to replace the corresponding group of records in the second batch, said last-named means further controlling the distributing means to segregate the replaced groups of records from the batch of records receiving the substituted records.

64. In a machine of the class described, a plurality of record receiving stations, means to feed a file of records to a station assigned to the file records, means to feed to said station a series of records to be filed with the file records in proper file sequence, means to compare data designations on the file records with designations on the records to be filed, means to compare the designations on each file record with the designations on a succeeding file record to detect a change in designations, means for controlling the operation of the feeding means and a device insertible in the machine and including a plurality of manually operable devices settable according to a prearranged plan to place the controlling means under control of the comparing means when said device is inserted in the machine so as to cause a group of similarly designated records to be filed to be fed into said station in proper sequence.

65. In a machine of the class described, a series of record receiving stations, means to distribute records to said stations, means to feed two separate sets of records to the distributing means, a pair of record comparing devices, one for comparing the records from one set with the records of the other set, the other for comparing each record of one set with the succeeding record of the same set, means to selectively control the operation of the distributing and feeding means, and a device manually insertible in the machine for placing the last-named means under control of the record comparing devices including a series of manually settable elements for determining the mode of operation of the distributing means and the feeding means and the type of numerical relationship which governs said mode of operation.

66. In a machine of the class described, the combination of a series comprising at least three record receiving stations, a plurality of record feeding mechanisms for feeding a plurality of separate batches of records to a common distribution point, record distributing mechanism common to said stations for receiving the records from said feeding mechanisms; a plurality of record sensing devices at least one of said devices being associated with one of the feeding means whereby to sense each record fed by the associated feeding means prior to the reception of the record by the distributing means, another of said feeding means having associated therewith a plurality of sensing devices for sensing two successive records; a plurality of record comparing devices, said record comparing devices each comprising a plurality of series of elements, each element being capable of being set to any one of a whole series of numerical values according to the values of designations in a single column of a record, and means jointly controlled by the elements of each comparing device for denoting the numerical relationship between two compared records; and a device manually insertible in the machine and including manually settable elements for cooperatively relating the comparing means, the distributing means, and the feeding means according to a predetermined plan to determine distribution of records to said pockets according to predetermined numerical relationships in the records.

67. In a machine of the class described, a series of record receiving stations, record distributing mechanism common to said stations including a plurality of control circuits; a plurality of record feeding mechanisms for feeding a plurality of separate batches of records to the record distributing mechanism; a plurality of record sensing devices, each record sensing device comprising a series of electrical sensing elements each of which is associated with a single column of a record, at least two of said record sensing devices being associated with one of said mechanisms so as to sense together two successive records fed thereby; a plurality of circuits for controlling the feeding means, each circuit being associated with one of the feeding means; a plurality of record comparing devices, each comparing device including two sets of variably selectively settable members, each member having associated therewith a magnet for controlling the setting of its associated member according to a scale of numerical values; and a switching device settable by said elements to denote whether one of two values compared is exactly equal to or numerically greater than or less than the other; and a device freely manually insertible in the machine and including manually pre-settable switching elements according to a predetermined plan to operatively connect the circuits for the distributing mechanism to the switching device and for connecting said magnets to said sensing devices to control the distribution of said records to said pockets according to the predetermined plan, said insertible device including manually pre-settable switching elements for determining the type of numerical relationship which is to govern the distribution of the records from the several feed mechanisms to said stations.

RALPH E. PAGE.